(12) United States Patent
Kim et al.

(10) Patent No.: US 10,504,481 B2
(45) Date of Patent: Dec. 10, 2019

(54) MOBILE TERMINAL AND METHOD FOR CONTROLLING THE SAME

(71) Applicant: LG ELECTRONICS INC., Seoul (KR)

(72) Inventors: Eunhye Kim, Seoul (KR); Minkyoung Shin, Seoul (KR); Juha Hyun, Seoul (KR); Arim Kwon, Seoul (KR); Juhye Lee, Seoul (KR); Taehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/705,092

(22) Filed: Sep. 14, 2017

(65) Prior Publication Data

US 2018/0268777 A1 Sep. 20, 2018

(30) Foreign Application Priority Data

Mar. 17, 2017 (KR) .......................... 10-2017-0033620

(51) Int. Cl.
*G09G 5/00* (2006.01)
*G06F 1/3234* (2019.01)
(Continued)

(52) U.S. Cl.
CPC .............. *G09G 5/006* (2013.01); *G06F 1/32* (2013.01); *G06F 1/3206* (2013.01);
(Continued)

(58) Field of Classification Search
CPC .... G09G 5/006; G09G 5/10; G09G 2330/021; G06F 1/32; G06F 1/3206; G06F 1/3262;
(Continued)

(56) References Cited

U.S. PATENT DOCUMENTS

2003/0193472 A1 10/2003 Powell
2008/0111833 A1 5/2008 Thorn et al.
(Continued)

FOREIGN PATENT DOCUMENTS

EP 2372988 10/2011

OTHER PUBLICATIONS

European Patent Office Application Serial No. 17001380.9, Search Report dated Feb. 21, 2018, 21 pages.
(Continued)

*Primary Examiner* — Stephen G Sherman
(74) *Attorney, Agent, or Firm* — Lee, Hong, Degerman, Kang & Waimey

(57) ABSTRACT

Disclosed are a mobile terminal and method for controlling the same. The present invention provides a mobile terminal including a sensing unit, a display unit, a processor, wherein the processor is configured to execute an Always on Display (AOD) mode for enabling the display unit to be always turned on at low power while executing at least one application in a background state, display the at least one application or at least one controller corresponding to the at least one application on the display unit in the AOD mode after executing the AOD mode, and perform a quick-operation after sensing an input signal for controlling the application or the controller.

20 Claims, 42 Drawing Sheets

(51) Int. Cl.
*G06F 3/0488* (2013.01)
*G06F 1/3206* (2019.01)
*H04M 1/725* (2006.01)
*G06F 1/32* (2019.01)
*G09G 5/10* (2006.01)
*H04M 1/67* (2006.01)

(52) U.S. Cl.
CPC .......... *G06F 1/3262* (2013.01); *G06F 1/3265* (2013.01); *G06F 3/04883* (2013.01); *G06F 3/04886* (2013.01); *G09G 5/10* (2013.01); *H04M 1/72522* (2013.01); *G06F 2203/04803* (2013.01); *G09G 2330/021* (2013.01); *H04M 1/67* (2013.01); *H04M 2250/22* (2013.01); *Y02D 10/153* (2018.01); *Y02D 70/10* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/20* (2018.01); *Y02D 70/26* (2018.01)

(58) Field of Classification Search
CPC ............... G06F 1/3265; G06F 3/04883; G06F 3/04886; G06F 2203/04803; H04M 1/72522; H04M 1/67; H04M 2250/22; Y02D 70/1264; Y02D 70/168; Y02D 70/20; Y02D 70/26; Y02D 70/142; Y02D 70/146; Y02D 70/1262; Y02D 70/144; Y02D 70/1244; Y02D 70/164; Y02D 70/1246; Y02D 70/162; Y02D 70/10; Y02D 70/166; Y02D 10/153; H04L 51/24
See application file for complete search history.

(56) References Cited

U.S. PATENT DOCUMENTS

| | | | |
|---|---|---|---|
| 2010/0269040 A1* | 10/2010 | Lee | G06F 3/04817 715/702 |
| 2013/0111415 A1 | 5/2013 | Newman et al. | |
| 2013/0111579 A1* | 5/2013 | Newman | G06F 3/0488 726/17 |
| 2013/0283215 A1 | 10/2013 | Sundaramurthy et al. | |
| 2014/0118272 A1* | 5/2014 | Gunn | G06F 3/0488 345/173 |
| 2015/0082255 A1 | 3/2015 | DeVries et al. | |
| 2016/0188363 A1 | 6/2016 | Sun et al. | |
| 2017/0068447 A1 | 3/2017 | Hong et al. | |
| 2017/0075316 A1 | 3/2017 | Berdinis et al. | |

OTHER PUBLICATIONS

European Patent Office Application Serial No. 17001380.9, Search Report dated May 3, 2018, 22 pages.

* cited by examiner

FIG. 30
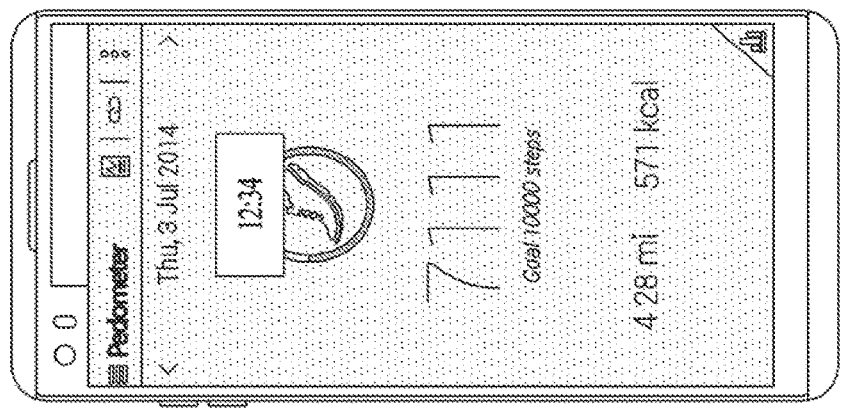
(c)
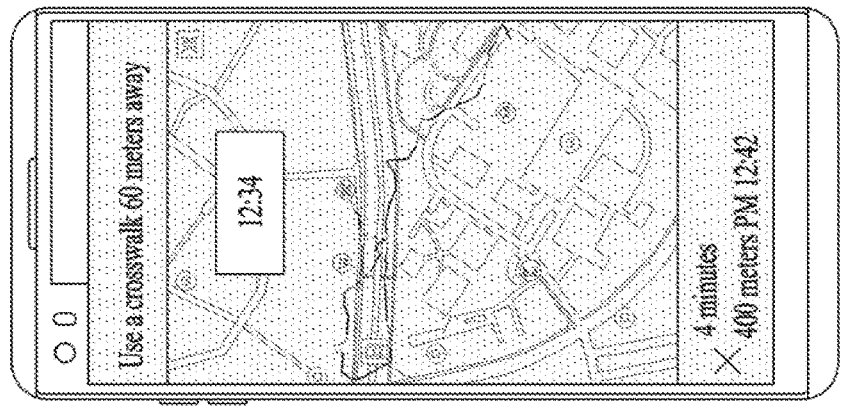
(b)
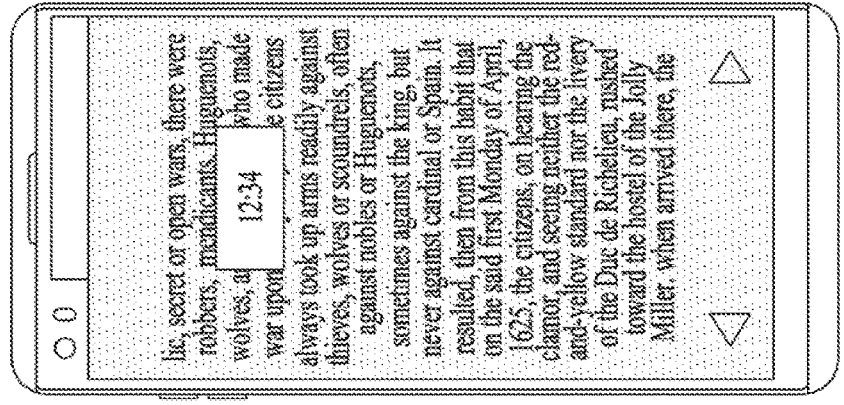
(a)

FIG. 31
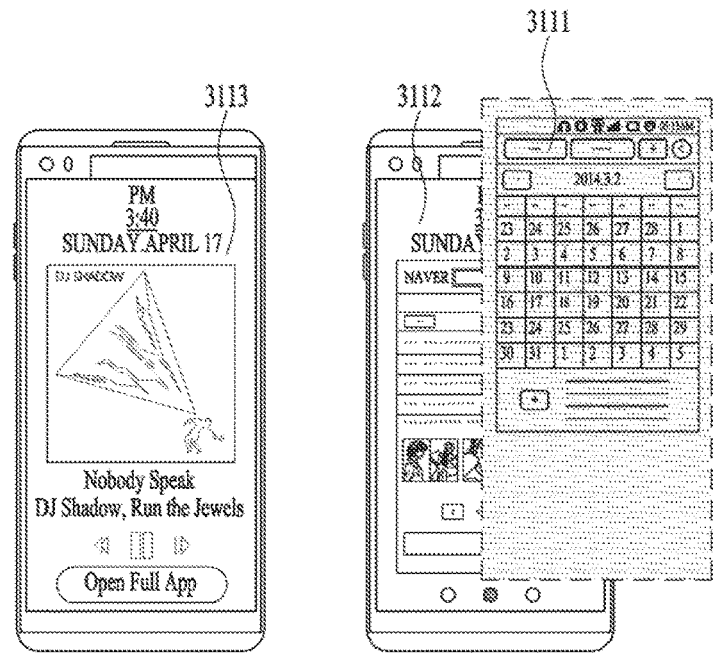
(a)
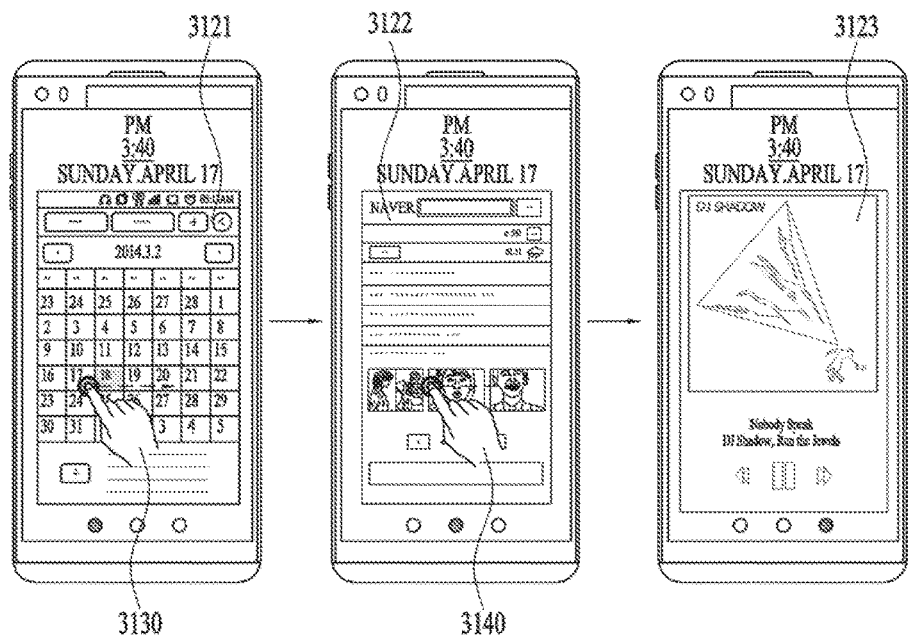
(b)

MOBILE TERMINAL AND METHOD FOR CONTROLLING THE SAME

Pursuant to 35 U.S.C. § 119(a), this application claims the benefit of earlier filing date and right of priority to Korean Application No. 10-2017-0033620, filed on Mar. 17, 2017, the contents of which are all hereby incorporated by reference herein in its entirety.

BACKGROUND OF THE INVENTION

Field of the Invention

The present invention relates to a mobile terminal and method for controlling the same, and more particularly, to a mobile terminal for controlling at least one application or at least one controller corresponding to the at least one application while executing an Always on Display (AOD) mode, which can be driven at low power, and method for controlling the same.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In addition, although the user desires to use an application installed in the mobile terminal in a state in which a display of the mobile terminal is turned on, the user needs to turn off power of the display while not using the display due to significant power consumption of the display.

Recently, a display panel included in the mobile terminal has been researched in various ways in order to reduce power consumption of the display. Therefore, it is necessary to develop UI/UX for supporting various applications that can be driven in low power display mode.

SUMMARY OF THE INVENTION

Accordingly, an object of the present invention is to address the above-noted and other problems.

Another object of the present invention is to provide a mobile terminal for executing an Always on Display (AOD) mode for enabling a display unit to be always turned on at low power while executing at least one application in a background state, displaying the at least one application or at least one controller corresponding to the at least one application in the AOD mode after executing the AOD mode, and performing a quick-operation based on an input signal for controlling the controller and method for controlling the same.

It will be appreciated by persons skilled in the art that the objects that could be achieved with the present invention are not limited to what has been particularly described hereinabove and the above and other objects that the present invention could achieve will be more clearly understood from the following detailed description.

To achieve these objects and other advantages and in accordance with the purpose of the invention, as embodied and broadly described herein, a mobile terminal according to the present invention may include a sensing unit, a display unit, and a processor. In this case, the processor may be configured to execute an Always on Display (AOD) mode for enabling the display unit to be always turned on at low power while executing at least one application in a background state, display the at least one application or at least one controller corresponding to the at least one application on the display unit in the AOD mode after executing the AOD mode, and perform a quick-operation after sensing an input signal for controlling the application or the controller.

Preferably, the processor may be configured to execute a first application and a second application in the background state, wherein the first application and the second application may belong to an identical application group, display a first controller corresponding to the first application after executing the AOD mode, and change the first controller to a second controller after sensing a first input signal for selecting the first controller, wherein the second controller may have an interface identical to that of the first controller.

Preferably, the processor may be configured to execute a third application and a fourth application in the background state, wherein the third application and the fourth application may belong to different application groups, display a third controller corresponding to the third application after executing the AOD mode, and change the third controller to a fourth controller after sensing a second input signal for selecting the third controller, wherein the fourth controller may have an interface different from that of the third controller.

Preferably, the processor may be configured to display a fifth controller corresponding to a fifth application after executing the AOD mode, wherein the fifth application may be an application that is most recently changed to the background state among the at least one application running in the background state.

Preferably, the processor may be configured to display a sixth controller corresponding to a sixth application after executing the AOD mode, wherein the sixth application may be an application that was displayed on the display unit before the AOD mode is executed.

Preferably, the processor may be configured to display a seventh controller corresponding to a seventh application after executing the AOD mode, wherein the seventh application may be an application running in the background state and an on-going state.

Preferably, the processor may be configured to display a multitasking application list on the display unit, wherein the multitasking application list comprises at least one multitasking window corresponding to the at least one application running in the background state.

More preferably, the processor may be configured to sense a third input signal for selecting an AOD icon displayed on a first multitasking window corresponding to an eighth application, identify the AOD icon after sensing the third input signal, and display an eighth controller corresponding to the eighth application after executing the AOD mode.

More preferably, when the processor senses a fourth input signal for selecting a first icon included in the first controller while displaying the first controller, the processor may be configured to display the first application corresponding to the first controller on the display unit in the AOD mode.

Further preferably, when the processor senses the fourth input signal, the processor may be configured to change the first controller to the second controller.

Further preferably, when the processor senses a fifth input signal for selecting a second icon included in the second controller, the processor may be configured to display the second application corresponding to the second controller on the display unit in the AOD mode.

Preferably, the mobile terminal may further include a communication unit configured to transmit and receive data with an external device. In this case, the processor may be configured to display a ninth controller corresponding a ninth application after executing the AOD mode, wherein the ninth application may be an application interconnected to a tenth application installed in the external device, and change the ninth controller to a tenth controller after sensing a sixth input signal for selecting the ninth controller, wherein the tenth controller may correspond to the tenth application.

More preferably, when the processor displays the tenth controller, the processor may be configured to transmit, to the external device, a signal for controlling the external device to activate the tenth application.

Preferably, when the processor senses an input signal for executing the AOD mode while displaying an eleventh application on the display unit, the processor may be configured to execute the eleventh application in the AOD mode, wherein the AOD mode may include at least one detail mode.

More preferably, the mobile terminal may further include an audio output unit. In this case, the processor may be configured to control the audio output unit to output sound through the eleventh application when the eleventh application is executed in a first AOD mode and change an area on which the eleventh application is displayed into a state capable of sensing a touch input signal when the eleventh application is executed in a second AOD mode.

Further preferably, the processor may be configured to determine the at least one detail mode based on a predetermined touch input signal.

Preferably, the processor may be configured to sense a predetermined touch input signal for activating the displayed application or the displayed controller.

Preferably, when the processor senses an input signal for maximizing brightness of the display unit while executing a twelfth application in the AOD mode, the processor may be configured to terminate the AOD mode of the twelfth application.

In another aspect of the present invention, a method for controlling a mobile terminal with a display unit may include: executing an Always on Display (AOD) mode for enabling the display unit to be always turned on at low power while at least one application is running in a background state; displaying the at least one application or at least one controller corresponding to the at least one application on the display unit in the AOD mode after execution of the AOD mode; and performing a quick-operation after sensing of an input signal for controlling the application or the controller.

Accordingly, the mobile terminal and method for controlling the same according to the present invention provide the following effects and/or advantages.

According to at least one embodiment of the present invention, a user can use a predetermined application or a controller corresponding to the predetermined application in the AOD mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 30 is a diagram illustrating examples of applications that can be executed in the mobile terminal operating in the AOD mode according to an embodiment of the present invention;

FIG. 31 is a diagram illustrating an example in which the mobile terminal executes multi-AOD mode according to an embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
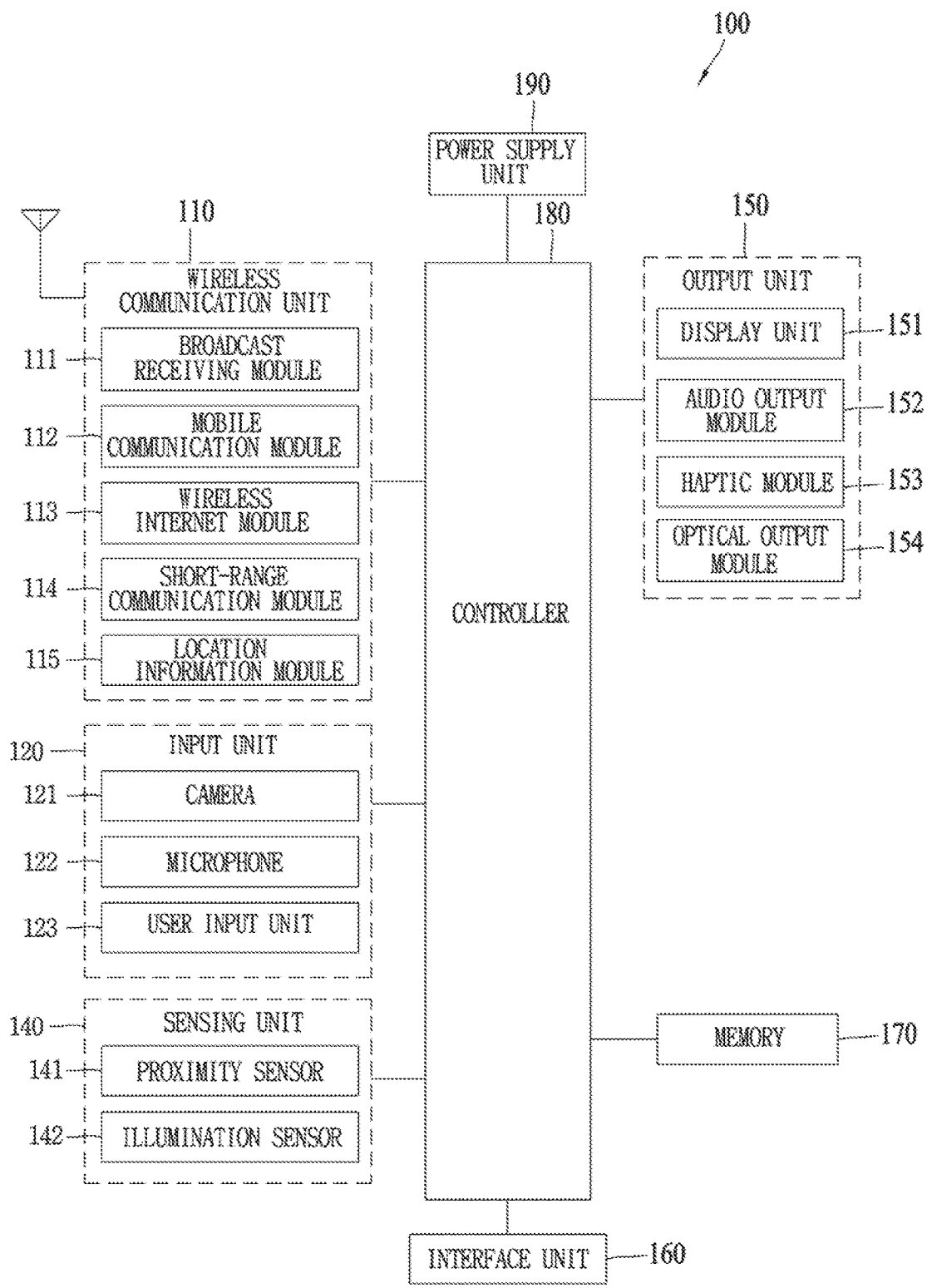
FIG. 1A is a block diagram of a mobile terminal in accordance with the present disclosure.
Figure 1B:
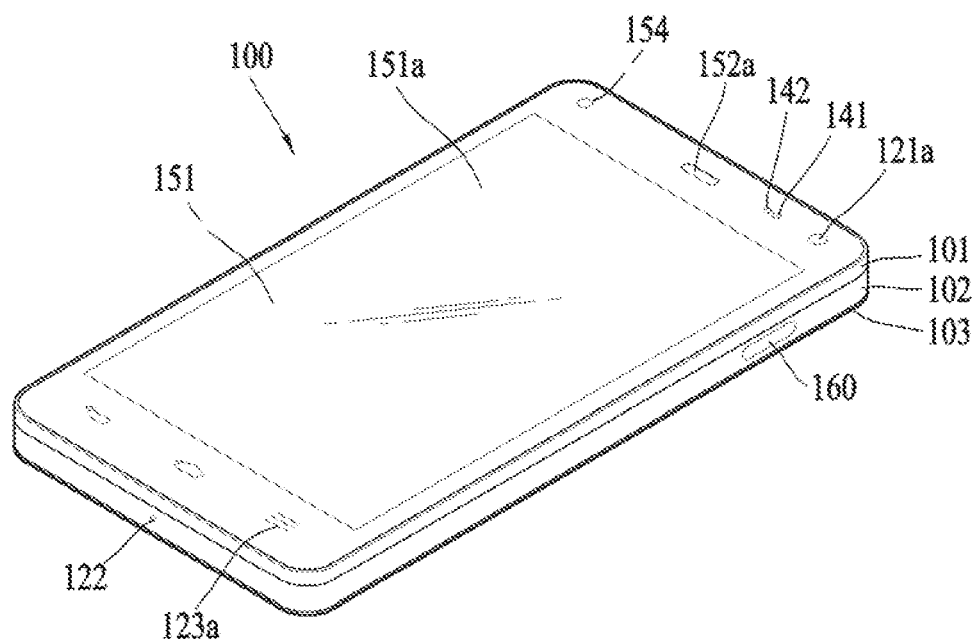
FIGS. 1B and 1C are conceptual views of one example of the mobile terminal, viewed from different directions.
Figure 1C:
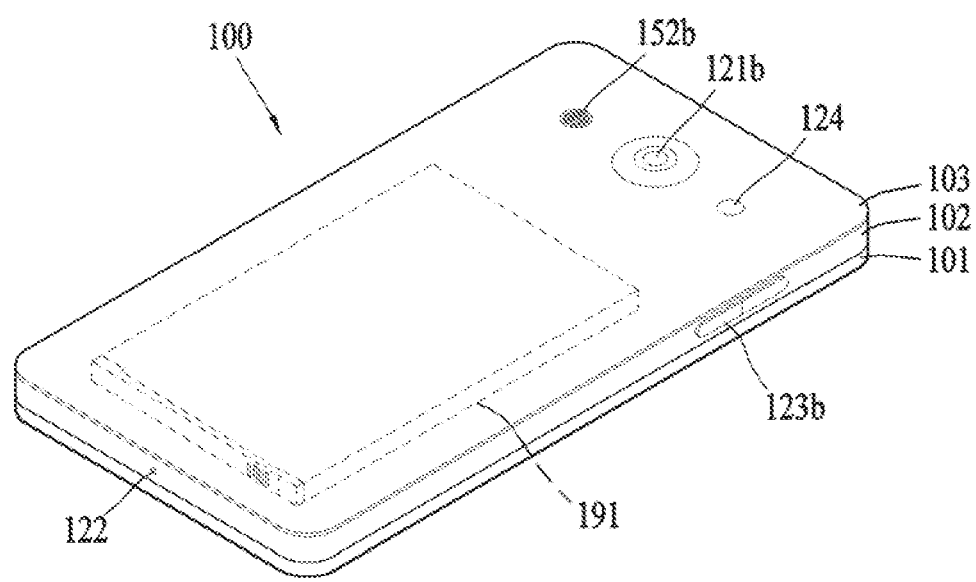

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
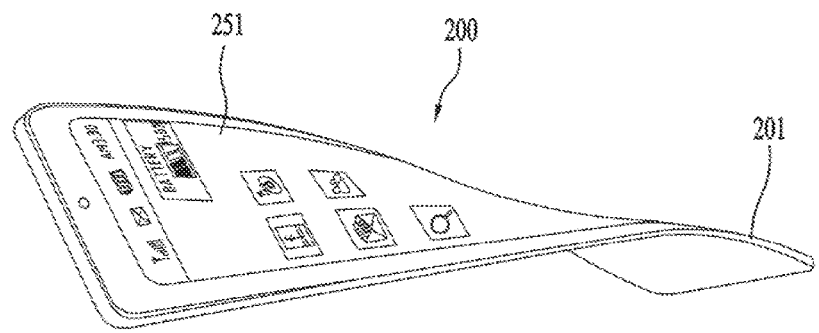
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
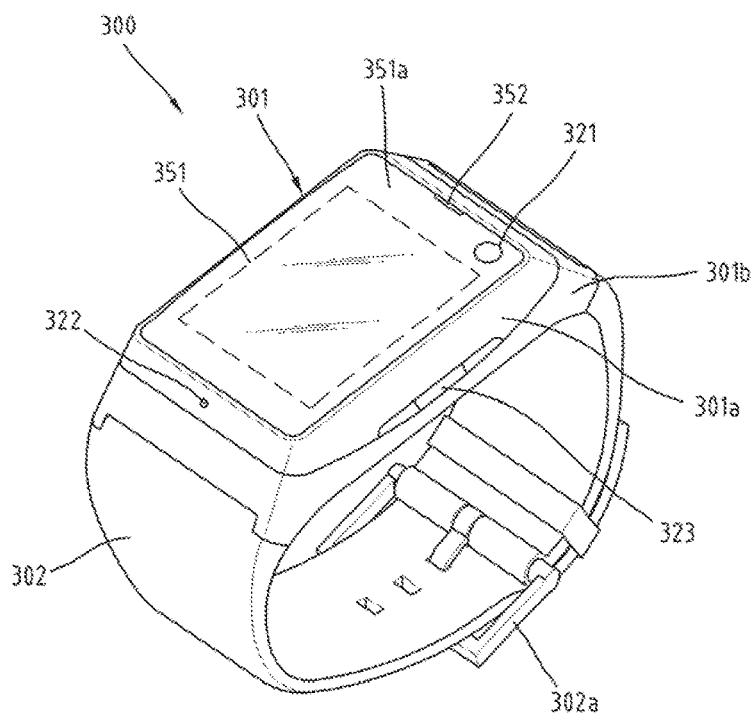
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302*a* is implemented using a buckle.

Hereinafter, embodiments related to methods for controlling the above-mentioned mobile terminal will be described with accompanying drawings. It will be apparent to those skilled in the art that the present invention may be embodied in other specific forms without departing from the spirit and essential characteristics of the invention.

The mobile terminal, which will be described with reference to FIGS. 4 to 42, can be implemented using one of the mobile terminals 100, 200, and 300 illustrated in FIGS. 1 to 3.

In the following description, the embodiments of the present invention will be explained with reference to FIGS. 4 to 42. In addition, the foregoing description with reference to FIGS. 1 to 3 is provided for ease in description and understanding of the embodiments of the present invention.

Figure 4:
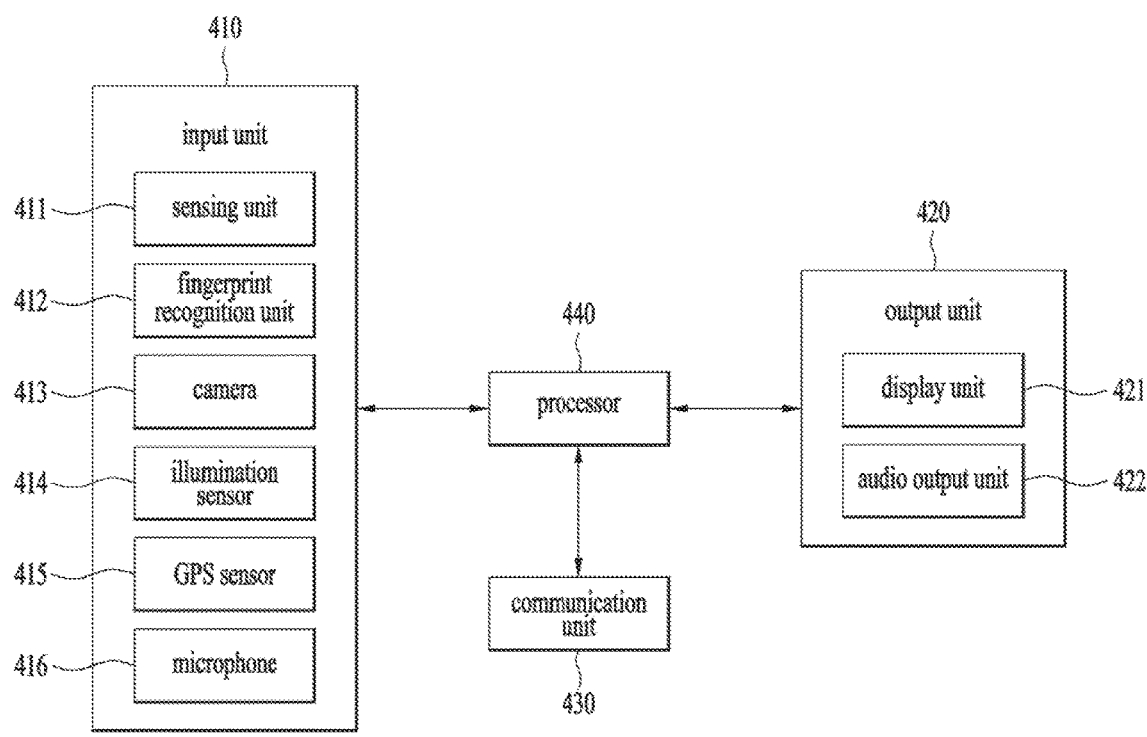
FIG. 4 is a diagram illustrating configuration modules of a mobile terminal according to one embodiment of the present invention.

FIG. 4 is a diagram illustrating configuration modules of the mobile terminal according to one embodiment of the present invention.

Referring to FIG. 4, the mobile terminal according to an embodiment of the present invention can include an input unit 410, an output unit 420, a communication unit 430, and a processor 440. In addition, the input unit 410 can include a sensing unit 411, a fingerprint recognition unit 412, a camera 413, an illumination sensor 414, a GPS sensor 415, and a microphone 416. Moreover, the output unit 420 can include a display unit 421 and an audio output unit 422.

The sensing unit 411 may be configured to sense not only various user inputs inputted into the mobile terminal but also an environment of the mobile terminal and deliver a sensing result to enable the processor 440 to perform operation based on the sensing result. In the present invention, the sensing unit 411 may be disposed on the display unit so as to be implemented as a touch screen. In addition, to implement the sensing unit 411, the sensing unit 140 of FIG. 1A may be used.

In an embodiment of the present invention, the sensing unit 411 may sense a touch input signal from a user. In this case, the sensing unit 411 may sense a point at which the touch input signal is sensed or a touched area. That is, the sensing unit 411 may be configured to distinguish between a point and an area where the touch input signal is sensed.

In addition, the sensing unit 411 may sense a multi-touch input signal. In detail, the sensing unit 411 may sense a touch input signal of touching more than two points during a predetermined time. Moreover, the sensing unit 411 may sense a predetermined touch input signal. In detail, the sensing unit 411 may distinguish between a touch input signal sensed during a predetermined time and a touch input signal touched at a predetermined pressure.

The fingerprint recognition unit 412 may extract fingerprint information from a touch input signal from the user. Here, the fingerprint recognition unit 412 may be disposed on the display unit 421 or the front or back surface of the mobile terminal. In addition, the fingerprint recognition unit 412 may use the extracted information for the purpose of security, authentication, or verification. The fingerprint recognition unit 412 may be implemented using the method illustrated in FIG. 1A.

In an embodiment of the present invention, the fingerprint recognition unit 412 may recognize a fingerprint and then determine whether the recognized fingerprint matches a predetermined fingerprint.

The camera 413 may process image frames such as still or moving images obtained by an image sensor. The processed image frames may be displayed on the display unit 421 or stored in the mobile terminal. In some cases, a plurality of cameras may be provided in various forms such as a matrix structure, a stereo structure, etc. and thus, the mobile terminal may obtain information on a plurality of image frames having various angles or focal points. The camera 413 may be implemented using the camera 121 shown in FIG. 1A.

In an embodiment of the present invention, the camera 413 may display a captured preview image on the display unit 421.

The illumination sensor 414 may sense a change in brightness within a predetermined range. In an embodiment of the present invention, the illumination sensor 414 may sense change in brightness within a predetermined range from the mobile terminal. In addition, the illumination sensor 414 may be implemented using the illumination sensor 142 shown in FIG. 1A.

The GPS (global positioning system) sensor 415 included as a part of the location information module 115 may obtain a position of the mobile terminal based on a signal transmitted from a GPS satellite. In an embodiment of the present invention, the GPS sensor 415 may receive the GPS signal containing the position of the mobile terminal. In addition, the GPS sensor may be implemented using the GPS module shown in FIG. 1A.

The microphone 416 may convert covert an external acoustic signal into electric audio data. The converted audio data can be variously utilized according to various application programs executed in the mobile terminal. In an embodiment of the present invention, the microphone 416 may recognize and analyze voice inputted by the user. In addition, the microphone 416 may be implemented using the microphone 122 shown in FIG. 1A.

The display unit 421 may display visual information. In this case, the visual information may include a text, an indicator, an icon, a content, an application, an image, a video, etc. In addition, the display unit 421 may display the visual information on a screen based on a control command from the processor 440. Moreover, the display unit 421 may be implemented using the display unit 151 in FIG. 1A or the display unit 351 in FIG. 3A.

In an embodiment of the present invention, when the AOD mode is executed, the mobile terminal may turn on a partial area of the display unit 421 at low power even though the display unit 421 is turned off. Details will be described later.

The audio output unit 422 may output an audio signal related to a function executed in the mobile terminal. In an embodiment of the present invention, the audio output unit 422 may output an audio signal generated by an application executed in the mobile terminal. In addition, the audio output unit 422 may be implemented using the audio output module 152 in FIG. 1A.

The communication unit 430 may include at least one module for enabling the mobile terminal to communicate with an external device. Here, the external device may include all types of electronics device. For example, the mobile terminal may communicate with a wearable device. In addition, although the communication unit 430 may be implemented using the wireless communication unit 110 in FIG. 1A, all functions of the wireless communication unit 110 may also be performed using a wired cable.

The processor 440 may perform processing on data, control the aforementioned individual units of the mobile terminal, and control data transmission/reception between the units. In the present invention, the processor 440 may be implemented using the controller 180 in FIG. 1A.

In an embodiment of the present invention, the processor 440 may control operations of the mobile terminal. However, for convenience of description, it is assumed that such operations are performed/controlled by the mobile terminal.

Hereinafter, operations performed in the AOD mode by the mobile terminal according to an embodiment of the present invention will be described with reference to various embodiments. Here, the AOD mode may correspond to a mode for maintaining a state in which the display unit is always turned on at low power.

In detail, the display unit may be in one of an on-state, a dimming state, and an off-state. The mobile terminal may switch a state of the display unit to the on-state based on an input signal from the user. The on-state may mean an active state capable of displaying information on the entirety of the display unit and receiving an input signal through the entirety of the display unit.

In addition, if no input signal from the user is sensed while the display unit is in the on-state, the mobile terminal may switch the state of the display unit to the dimming state to reduce power consumption. The dimming state may mean a state in which although the display unit is activated, it has low brightness.

Moreover, if no input signal from the user is sensed while the display unit is in the dimming state, the mobile terminal may switch the state of the display unit to the off-state to reduce power consumption. The off-state may mean an inactive state in which information is not displayed on the entirety of the display unit and any signals cannot be received through the entirety of the display unit.

In an embodiment of the present invention, the AOD mode may mean a mode for maintaining a part or all of the display unit as the on-state or dimming state when the display unit is switched to the off-state according to a command for switching the display unit to the off-state. In addition, the AOD mode may be executed when the display unit is switched to the off-state due to no input signal from the user during a predetermined time or more.

In addition, in an embodiment of the present invention, the AOD mode may mean a mode capable of receiving only a predetermined input signal and displaying only a predetermined output signal in spite of displaying visual information on a part or all of the display unit when the display unit is switched to the off-state according to a command for switching the display unit to the off-state.

Figure 5:
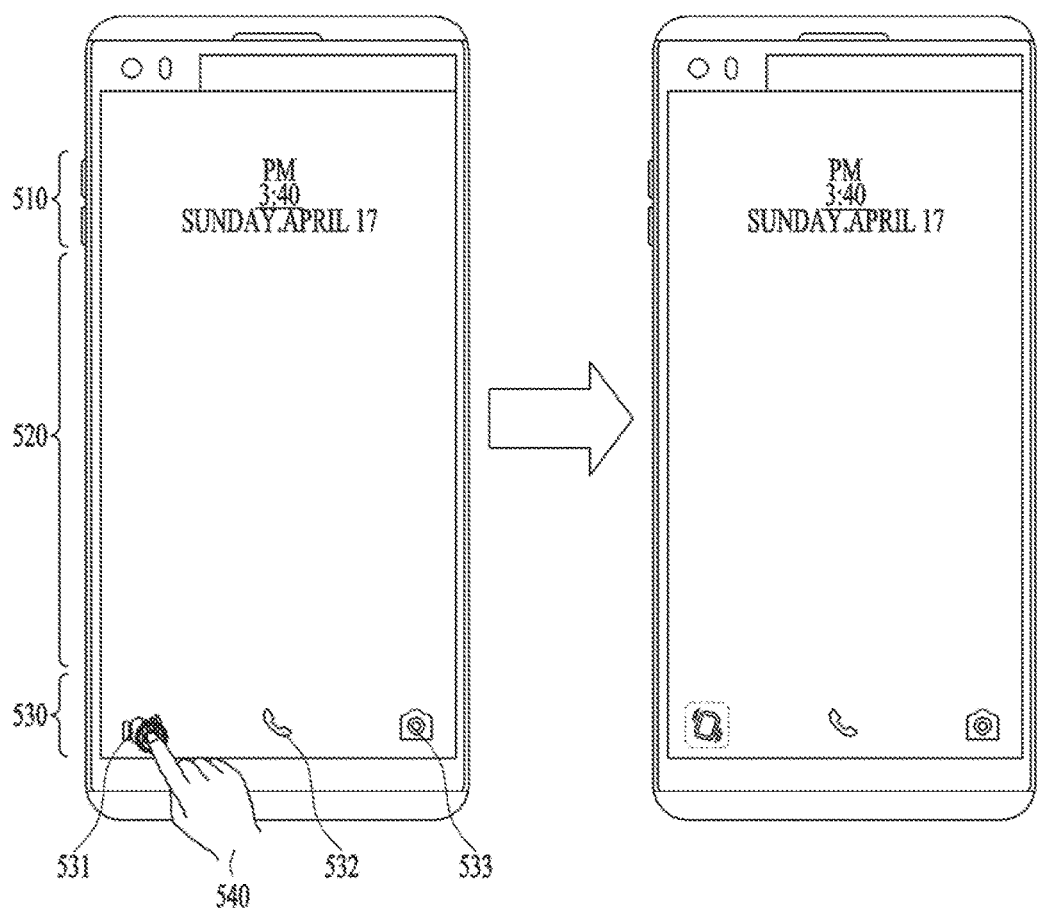
FIG. 5 is a diagram illustrating an example in which a mobile terminal performs a quick-operation in an AOD mode according to one embodiment of the present invention.

FIG. 5 is a diagram illustrating an example in which the mobile terminal performs a quick-operation in the AOD mode according to one embodiment of the present invention. To avoid redundant description, the features already mentioned in FIG. 4 are omitted in the embodiment of FIG. 5.

Referring to the first drawing of FIG. 5, if there is a command for turning off the display unit, the mobile terminal can execute the AOD mode. In this case, the command for turning off the display unit may include a user command, a predetermined event (e.g., no input signal during a predetermined time), etc.

When the AOD mode is executed, the mobile terminal may maintain a first area 510, a second area 520, and a third area 530 as an active (activate) state and the remaining area as an inactive (inactivate) state. On the other hand, when the mobile terminal receives an off-command while not executing the AOD mode, it is a matter of course that the mobile terminal may maintain all areas as the inactive state.

In an embodiment of the present invention, when the AOD mode is executed, the mobile terminal can display current time information on the first area 510. That is, the mobile terminal may display time related information on the first area 510.

In addition, when the AOD mode is executed, the mobile terminal can display a content on the second area 520. For example, the mobile terminal may display information on a controller corresponding to an application, a widget, or a notification on the second area 520.

Moreover, the mobile terminal can display an icon on the third area 530. For example, the mobile terminal may display an icon capable of performing a quick-operation on the third area 530. That is, the mobile terminal may display a mode change icon 531, a call icon 532, and a camera icon 533 on the third area 530. In this case, each of the displayed icons may perform a function mapped to a predetermined application.

In an embodiment of the present invention, the mobile terminal may sense a predetermined input signal 540 while executing the AOD mode. In this case, the predetermined input signal 540 may correspond to a touch input signal satisfying at least one of the following conditions: a touch input signal is touched during a time equal to or greater than a predetermined time; a touch input signal is touched over an area equal to or greater than a predetermined area; and a touch input signal is touched with pressure equal to or greater than predetermined pressure. For instance, the predetermined input signal 540 may correspond to a touch input signal touched with pressure equal to or greater than the predetermined pressure.

In other words, if the display unit senses all touch input signals while the mobile terminal executes the AOD mode, there may be no benefit that can be obtained by maintaining the AOD mode due to unnecessary power consumption. Therefore, the mobile terminal may be configured to sense only a predetermined touch input signal without sensing a normal touch input signal.

Referring to the first drawing of FIG. 5 again, the mobile terminal may sense the input signal 540 touched with pressure equal to or greater than the predetermined pressure. For example, while the mobile terminal turns off the display unit but executes the AOD mode, the user may touch the mode change icon 531 displayed on the third area 530 with a certain amount of pressure.

Referring to the second drawing of FIG. 5, when sensing the input signal 540, the mobile terminal may immediately perform a function mapped to the mode change icon 531. For example, if the function mapped to the mode change icon 531 is a function of switching between a vibration mode and a sound mode, the mobile terminal may switch from the vibration mode to the sound mode or from the sound mode to the vibration mode after sensing the input signal 540.

Further, the mobile terminal may change a shape of the displayed mode change icon 531 after switching its mode.

Figure 6:
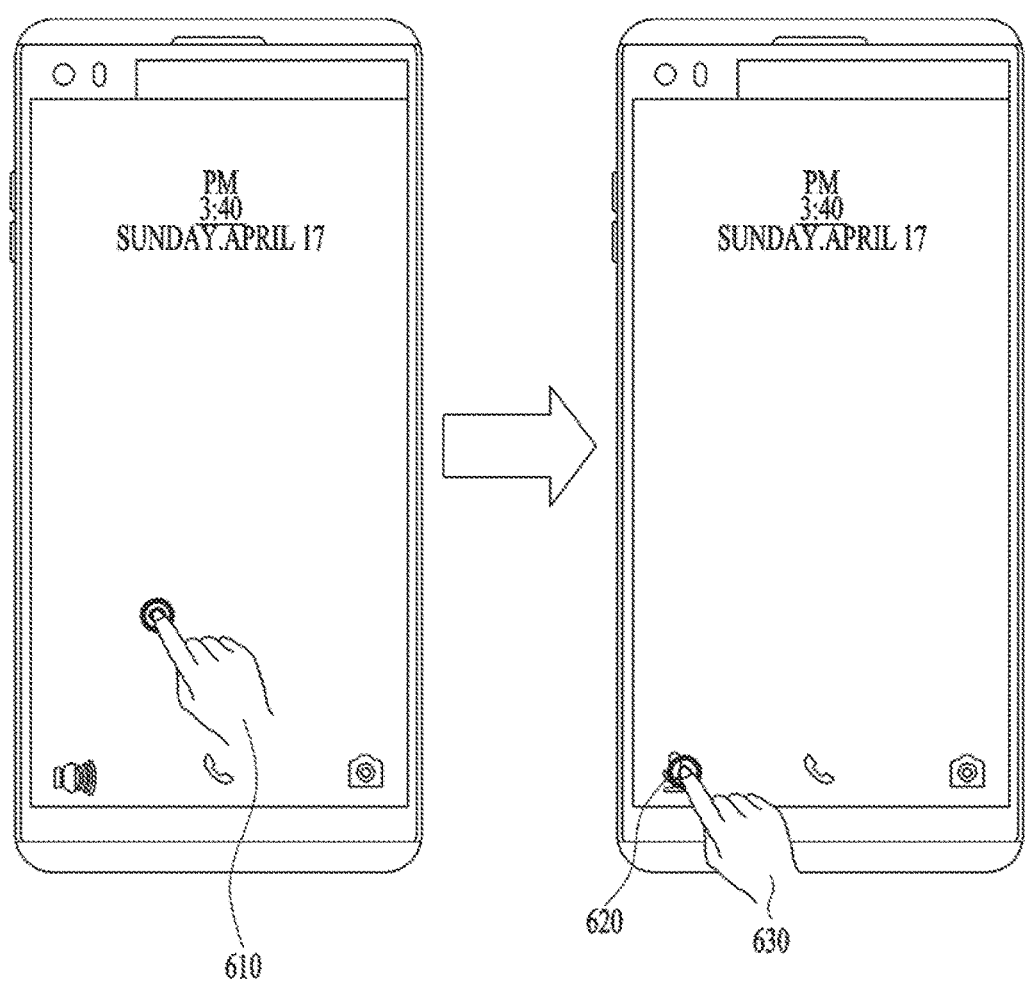
FIG. 6 is a diagram illustrating another example in which the mobile terminal performs a quick-operation in the AOD mode according to one embodiment of the present invention.

FIG. 6 is a diagram illustrating another example in which the mobile terminal performs a quick-operation in the AOD mode according to one embodiment of the present invention. To avoid redundant description, the features already mentioned in FIGS. 4 and 5 are omitted in the embodiment of FIG. 6.

Referring to the first drawing of FIG. 6, if there is a command for turning off the display unit, the mobile terminal can execute the AOD mode. While executing the AOD mode, the mobile terminal may display information on a predetermined area.

In an embodiment of the present invention, while executing the AOD mode, the mobile terminal may allow the display unit to sense only a predetermined input signal. That is, the mobile terminal may maintain the display unit as the inactive state until a predetermined input signal is inputted.

In an embodiment of the present invention, while executing the AOD mode, the mobile terminal may sense a predetermined input signal 610 for selecting a point of the display unit. In this case, the predetermined input signal 610 may correspond to a touch input signal satisfying at least one of the following: a signal is sensed during a time equal to or greater than a predetermined time; a signal is inputted through an area equal to or greater than a predetermined area; and a signal is touched with pressure equal to or greater than predetermined pressure. For instance, the mobile terminal may sense only a touch input signal touched with pressure equal to or greater than the predetermined pressure.

Referring to the second drawing of FIG. 6, the mobile terminal can activate a predetermined area of the display unit after sensing the predetermined input signal 610.

In detail, the mobile terminal can display information on the predetermined area but cannot sense a normal touch input signal until the mobile terminal senses the predetermined input signal 610. According to the embodiment of the present invention, the mobile terminal can sense the normal touch input signal through the area where the information is displayed after sensing the predetermined input signal 610.

Thereafter, the mobile terminal may sense a touch input signal 630 for selecting an icon 620. That is, unlike the embodiment of FIG. 5, according to the embodiment of FIG. 6, while executing the AOD mode, the mobile terminal may switch an area where the icon 620 is displayed as the active state after sensing the predetermined input signal 610.

After sensing the touch input signal 630, the mobile terminal may perform a function mapped to the icon 620. For instance, if the function mapped to the icon 620 is the function of switching between the vibration mode and the sound mode, the mobile terminal may switch from the vibration mode to the sound mode or from the sound mode to the vibration mode after sensing the touch input signal 630.

Figure 7:
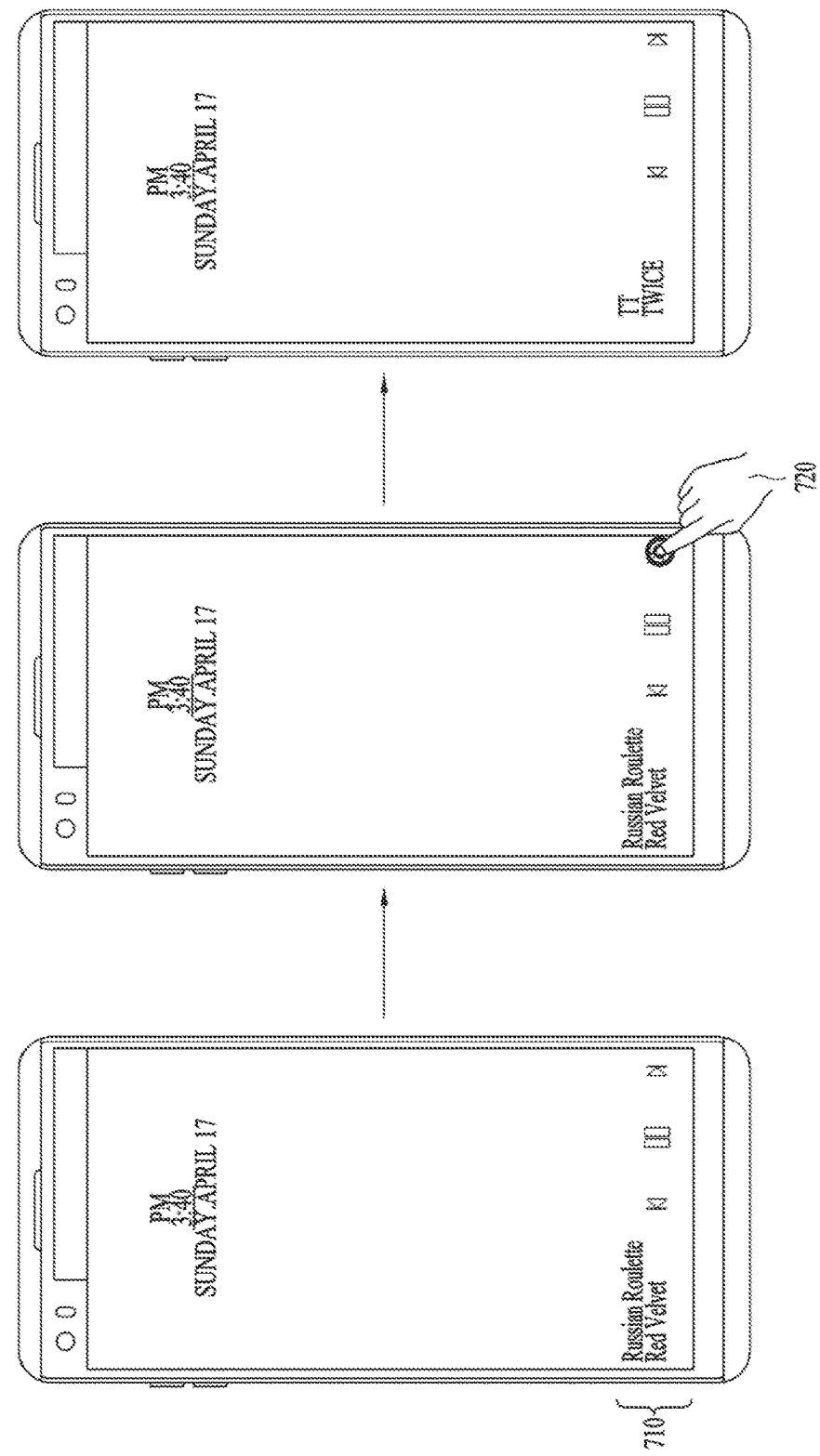
FIG. 7 is a diagram illustrating still another example in which the mobile terminal performs a quick-operation in the AOD mode according to one embodiment of the present invention.

FIG. 7 is a diagram illustrating still another example in which the mobile terminal performs a quick-operation in the AOD mode according to one embodiment of the present invention. To avoid redundant description, the features already mentioned in FIGS. 4 to 6 are omitted in the embodiment of FIG. 7.

Referring to the first drawing of FIG. 7, the mobile terminal can execute the AOD mode. While executing the AOD mode, the mobile terminal may maintain a predetermined area 710 of the display unit as the active state. In this case, the mobile terminal may display a controller corresponding to a predetermined application on the predetermined area 710.

For example, if the predetermined application is a music playback application, the controller may include information on the current music, a playback icon, a pause icon, a previous music playback icon, a next music playback icon, etc.

Referring to the second drawing of FIG. 7, the mobile terminal can sense an input signal 720 for controlling the displayed controller. For example, the mobile terminal may sense the input signal 720 for selecting the next music playback icon.

In this case, the input signal 720 may correspond to a predetermined input signal from the user. For example, the user may set only an input signal satisfying at least one of the following conditions: an input signal is touched during a predetermined time; an input signal is touched over a predetermined area; and an input signal is touched with predetermined pressure, as the input signal 720 that can be sensed by the display unit.

Referring to the third drawing of the FIG. 7, after sensing the input signal 720, the mobile terminal can perform a function mapped to the selected icon. Referring to the above-mentioned example, when sensing the input signal 720, the mobile terminal may play next music after stopping playback of the current music.

As described above, even when the display unit is turned off, the mobile terminal may perform a simple function by receiving the predetermined input signal from the user while executing the AOD mode.

Figure 8:
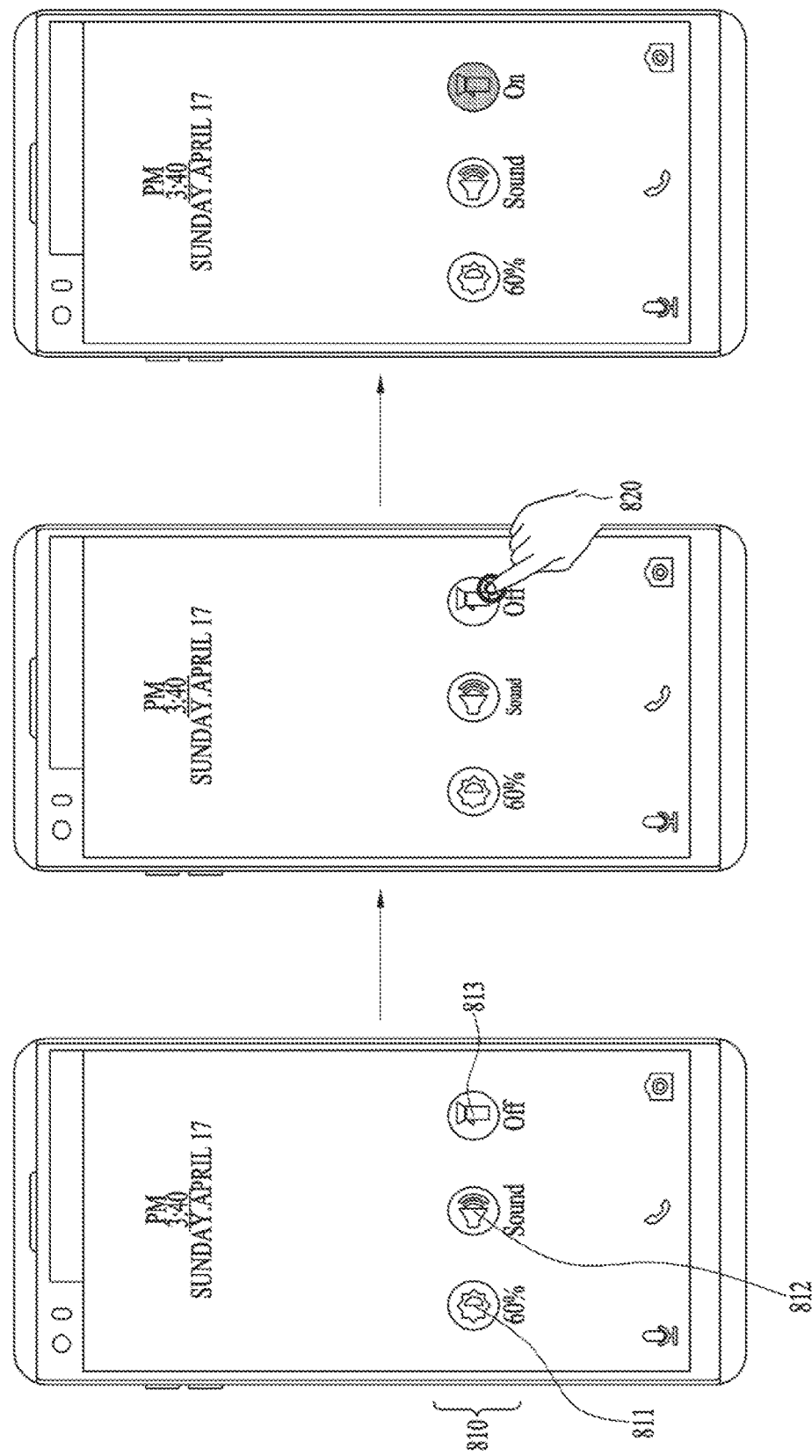
FIG. 8 is a diagram illustrating a further example in which the mobile terminal performs a quick-operation in the AOD mode according to one embodiment of the present invention.

FIG. 8 is a diagram illustrating a further example in which the mobile terminal performs a quick-operation in the AOD mode according to one embodiment of the present invention. To avoid redundant description, the features already mentioned in FIGS. 4 to 7 are omitted in the embodiment of FIG. 8.

Referring to the first drawing of FIG. 8, while executing the AOD mode, the mobile terminal can maintain a predetermined area 810 of the display unit as the active state. In this case, the mobile terminal may display an icon mapped to a predetermined function on the predetermined area 810. For example, the mobile terminal may display a brightness icon 811, a volume icon 812, a flashlight icon 813, and a power-saving icon (not shown in the drawing) on the predetermined area 810.

In this case, the brightness icon 811 may be an icon mapped to a function of adjusting brightness of the AOD mode. In addition, the volume icon 812 may be an icon mapped to a function of adjusting volume of sound output from the mobile terminal. Moreover, the flashlight icon 813 may be an icon mapped to a function of turning on/off a flashlight. Furthermore, the power-saving icon may be an icon mapped to a function of displaying the remaining amount of a battery and turning on/off a power-saving mode.

Referring to the second drawing of the FIG. 8, the mobile terminal can sense an input signal 820 for selecting the displayed icon. For example, the mobile terminal may sense the input signal 820 for selecting the flashlight icon 813.

In this case, the input signal 820 may correspond to a predetermined input signal from the user. That is, only when the user touches the flashlight icon with pressure equal to or greater than the predetermined pressure, the mobile terminal may sense the input signal 820.

Referring to the third drawing of FIG. 8, after sensing the input signal 820, the mobile terminal can perform the function mapped to the selected icon. Referring to the above-mentioned example, after sensing the input signal 820, the mobile terminal may turn on the flashlight.

In the case of the brightness icon 811 or the volume icon 812 capable of adjusting brightness or volume (although not shown in the drawing), the mobile terminal may display an adjustment button or an adjustment bar on the bottom or top of the icon during a predetermined time after sensing the input signal 820.

In detail, in the case of the brightness icon 811, the mobile terminal may display a bar indicating brightness of the AOD mode from 0 (minimum) to 100 (maximum) percent to adjust the brightness of the AOD mode. This may be applied to the volume icon 812.

Figure 9:
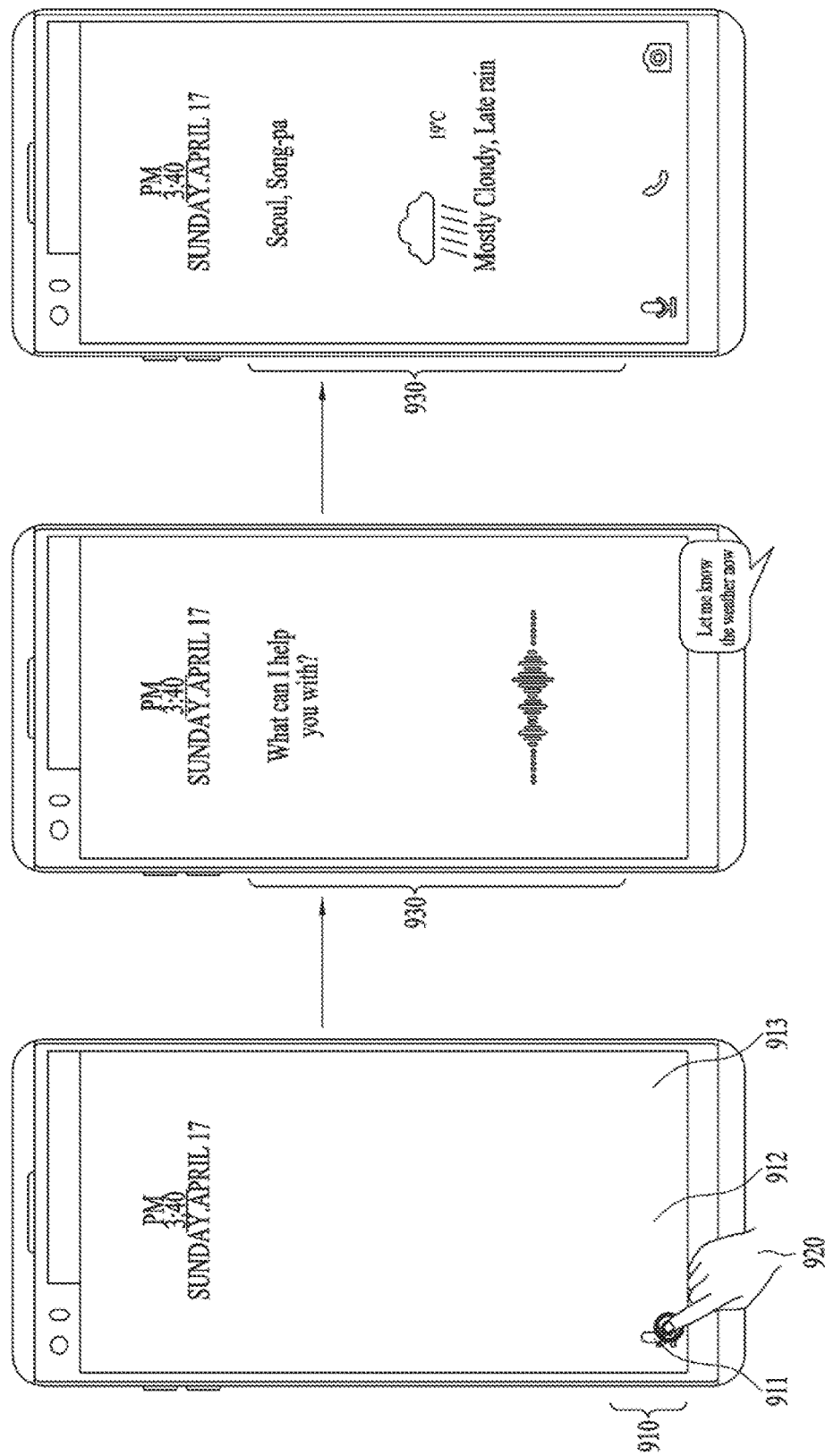
FIG. 9 is a diagram illustrating an example in which the mobile terminal recognizes voice in the AOD mode according to one embodiment of the present invention.

FIG. 9 is a diagram illustrating an example in which the mobile terminal recognizes voice in the AOD mode according to one embodiment of the present invention. To avoid redundant description, the features already mentioned in FIGS. 4 to 8 are omitted in the embodiment of FIG. 9.

Referring to the first drawing of FIG. 9, while executing the AOD mode, the mobile terminal can maintain a first area 910 of the display unit as the active state. In this case, the mobile terminal can display an icon mapped to a predetermined function on the first area 910. For example, the mobile terminal may display a voice recognition icon 911, a call icon 912, and a camera icon 913.

In this case, the voice recognition icon 911 may be an icon mapped to a function of receiving a voice signal from outside, analyzing the received voice signal, and displaying the analyzed result. In addition, the call icon 912 may be an icon mapped to a function of connecting a call to the most recently called person. Moreover, the camera icon 913 may be an icon mapped to a function of activating a camera application in the AOD mode.

In an embodiment of the present invention, the mobile terminal may sense a predetermined touch input signal 920 for selecting the voice recognition icon 911.

Referring to the second drawing of FIG. 2, the mobile terminal can receive a voice signal from the outside based on the predetermined touch input signal 920. For example, the mobile terminal may receive a voice signal, for example, "Let me know the current weather" from the user.

In addition, the mobile terminal may display information associated with the voice recognition icon 911 on a second area 930 according to the predetermined touch input signal 920. For example, the mobile terminal may display a sentence of "What can I help you with?" on the second area 930. In addition, the mobile terminal may read out loud the sentence displayed on the second area 930 according to the predetermined touch input signal 920.

Referring to the third drawing of FIG. 9, after receiving the voice signal, the mobile terminal can display a result of the received voice signal on the second area 930.

In detail, after receiving the voice signal, the mobile terminal may recognize and analyze the received voice signal. Referring to the above-mentioned example, the mobile terminal may recognize two words "current" and "weather" in the received voice signal and then obtain the current position of the mobile terminal and the current weather at the position. In this case, the mobile terminal may use an external server or an included application to obtain the weather. Thereafter, the mobile terminal may display the obtained current position and weather through a weather indicator on the second area 930.

In other words, the mobile terminal can perform the voice recognition function in the AOD mode without switching the display unit to the on-state.

Figure 10:
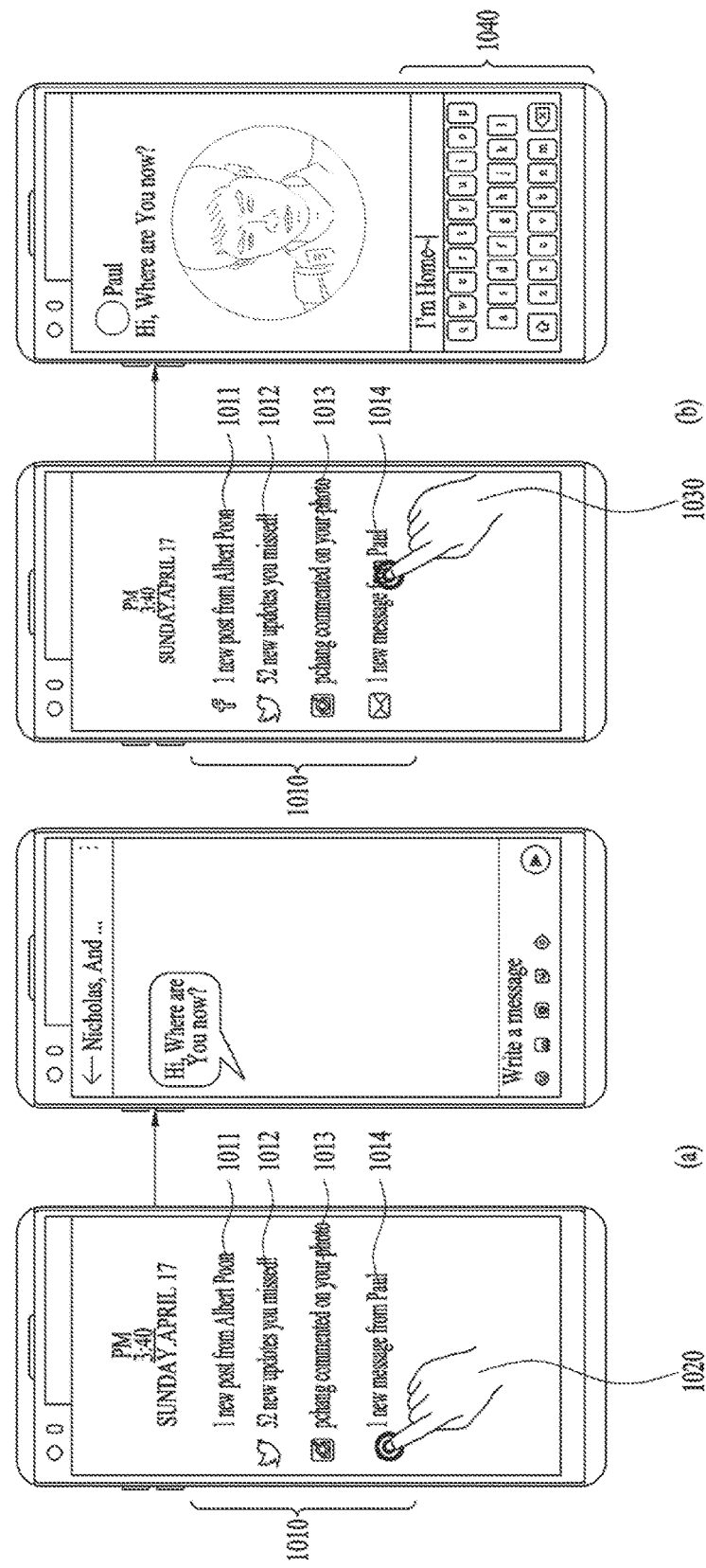
FIG. 10 is a diagram illustrating an example in which the mobile terminal performs different functions depending on selected points in the AOD mode according to an embodiment of the present invention.

FIG. 10 is a diagram illustrating an example in which the mobile terminal performs different functions depending on selected points in the AOD mode according to an embodiment of the present invention. To avoid redundant description, the features already mentioned in FIGS. 4 to 9 are omitted in the embodiment of FIG. 10.

Referring to FIG. 10, while executing the AOD mode, the mobile terminal can display notification information on a first area 1010. In this case, the notification information may include at least one piece of alarm information received by at least one application.

In detail, the mobile terminal may display first alarm information 1011 received by a first application, second alarm information 1012 received by a second application, third alarm information 1013 received by a third application, and fourth alarm information 1014 received by a fourth application on the first area 1010. In addition, the alarm information may include an icon of the application that receives the alarm and an alarm content.

FIG. 10 (a) is a diagram illustrating an embodiment of sensing a first input signal 1020 for selecting the icon of the application that receives the alarm and FIG. 10 (b) is a diagram illustrating an embodiment of sensing a second input signal 1030 for selecting the alarm content. Hereinafter, a description will be given of an embodiment in which the mobile terminal performs different functions in the AOD mode depending on selected points.

Referring to the first drawing of FIG. 10 (a), the mobile terminal can sense the first input signal 1020 for selecting an icon of the fourth application. In this case, the first input signal 1020 may be a predetermined touch input signal. That is, the mobile terminal can execute the AOD mode and display the notification in the AOD mode while the display unit is turned off. However, the mobile terminal needs to sense the predetermined touch input signal to activate the notification information in the AOD mode.

Referring to the second drawing of FIG. 10 (a), after sensing the first input signal 1020, the mobile terminal can execute the fourth application. In detail, the mobile terminal may temporarily execute the fourth application while executing the AOD mode. However, according to another embodiment of the present invention, the mobile terminal may execute the fourth application after terminating the AOD mode and switching the display unit to the on-state. Moreover, the mobile terminal may execute the fourth application while displaying the fourth alarm information.

Referring to the first drawing of FIG. 10 (b), the mobile terminal can sense the second input signal 1030 for selecting a content of the fourth alarm received by the fourth application. In this case, the second input signal 1030 may be a predetermined touch input signal.

Referring to the second drawing of FIG. 10 (b), after sensing the second input signal 1030, the mobile terminal can perform a predetermined function for the fourth application while executing the AOD mode. In this case, the predetermined function may correspond to a function of responding to the received alarm.

In detail, after sensing the second input signal 1030, the mobile terminal may display a detailed content and a sender of the fourth alarm. In addition, after sensing the second input signal 1030, the mobile terminal may display a pop-up window for responding to the sender of the fourth alarm.

Figure 11:
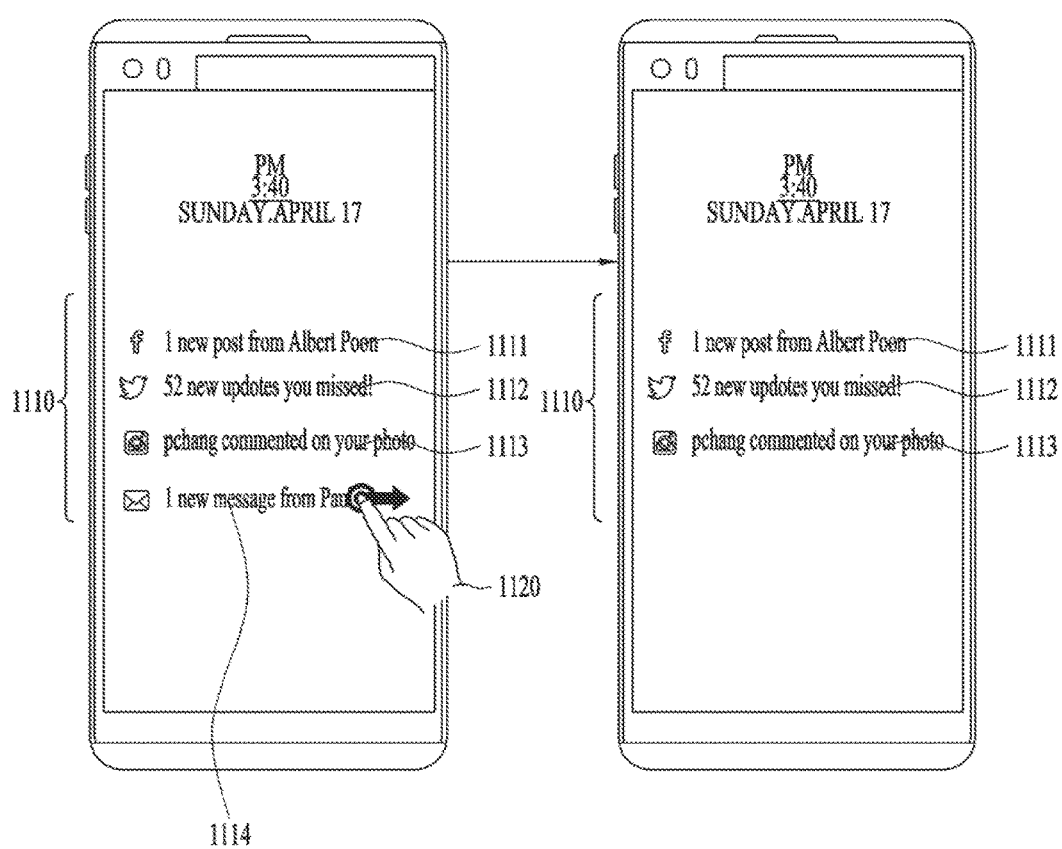
FIG. 11 is a diagram illustrating an example in which the mobile terminal performs different functions depending on input signals in the AOD mode according to an embodiment of the present invention.

FIG. 11 is a diagram illustrating an example in which the mobile terminal performs different functions depending on input signals in the AOD mode according to an embodiment of the present invention. To avoid redundant description, the features already mentioned in FIGS. 4 to 10 are omitted in the embodiment of FIG. 11.

Referring to the first drawing of FIG. 11, while executing the AOD mode, the mobile terminal can display notification information on a first area 1110. In this case, the notification information may include at least one piece of alarm information received by at least one application.

In detail, the mobile terminal may display first alarm information 1111 received by a first application, second alarm information 1112 received by a second application, third alarm information 1113 received by a third application, and fourth alarm information 1114 received by a fourth application on the first area 1110. In addition, the alarm information may include an icon of the application that receives the alarm and an alarm content.

In an embodiment of the present invention, the mobile terminal may sense an input signal 1120 for selecting the alarm information. In this case, the input signal 1120 may be a touch input signal of touching the alarm information with predetermined pressure and then dragging the touch in a predetermined direction. For example, the user may touch the fourth alarm information 1114 with a certain amount of pressure and then drag the touch to the right while maintaining the touch.

Referring to the second drawing of FIG. 11, after sensing the input signal 1120, the mobile terminal may stop display of the alarm information. In addition, after sensing the input signal 1120, the mobile terminal may consider alarm information of the application, which corresponds to the selected alarm information, to be already read (i.e., the mobile terminal may mark the alarm information as already read). In addition, the mobile terminal may perform the operations of stopping display of the selected alarm information and marking the alarm information of the application as already read while executing the AOD mode.

Referring to the above-mentioned example, the mobile terminal may stop display of the fourth alarm information 1114, which is selected by the input signal 1120 from among the first alarm information 1111, the second alarm information 1112, the third alarm information 1113, and the fourth alarm information 1114 displayed in the first area 1110 of the display unit.

In addition, the mobile terminal may stop display of the fourth alarm information 1114 based on the input signal 1120 of touching the point with the predetermined pressure and dragging the touch to the predetermined direction such that the fourth alarm information 1114 disappears toward the drag direction of the input signal 1120.

That is, the mobile terminal may display only the first alarm information 1111, the second alarm information 1112, and the third alarm information 1113 after sensing the input signal 1120.

Figure 12:
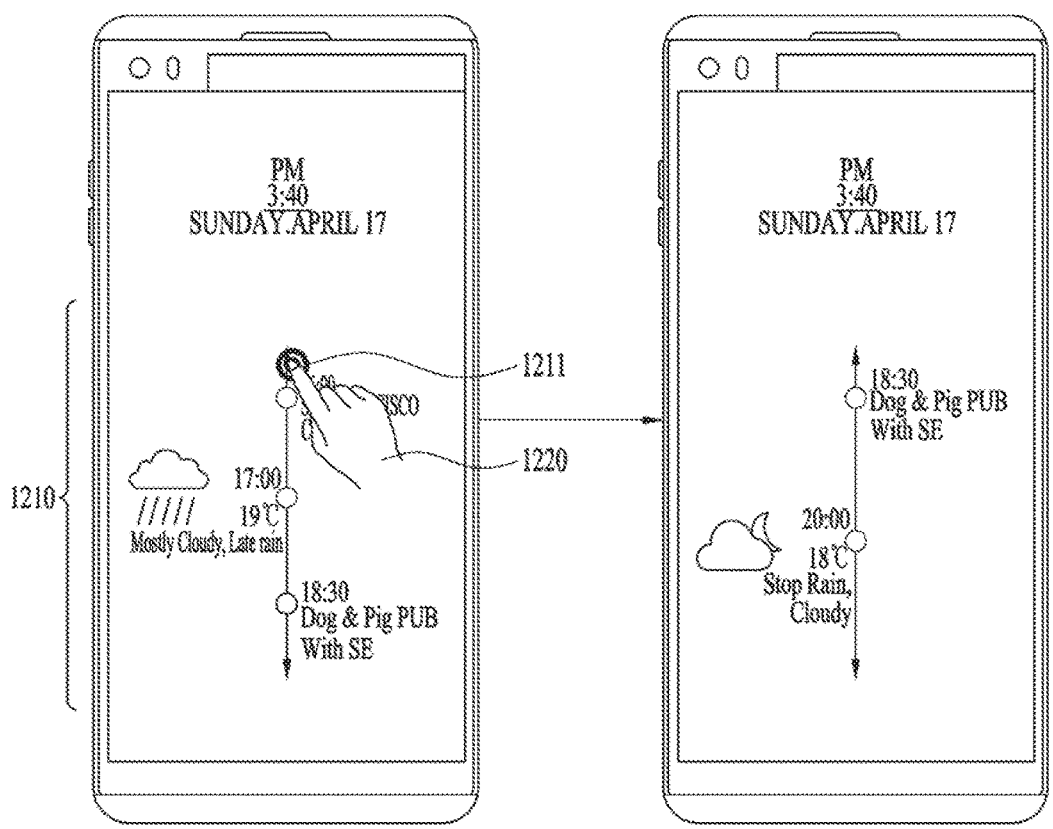
FIG. 12 is a diagram illustrating an example in which the mobile terminal executes an application that contains time information in the AOD mode according to an embodiment of the present invention.

FIG. 12 is a diagram illustrating an example in which the mobile terminal executes an application that contains time information in the AOD mode according to an embodiment of the present invention. To avoid redundant description, the features already mentioned in FIGS. 4 to 11 are omitted in the embodiment of FIG. 12.

Referring to the first drawing of FIG. 12, while executing the AOD mode, the mobile terminal can display a widget corresponding to a predetermined application on a first area 1210. In the embodiment of FIG. 12, the predetermined application may be an application that contains time information. For example, the application that contains the time information may include a weather application, a calendar application, and an alarm application. In the embodiment of FIG. 12, assume that the weather application is used.

In an embodiment of the present invention, the mobile terminal can sense a first input signal 1220 for controlling the widget. In this case, the first input signal 1220 may correspond to a touch input signal of touching a first point 1211 of the widget with predetermined pressure and dragging the touch in a predetermined direction. For example, the user may touch the first point 1211 with a certain amount of the pressure and then drag the touch to the bottom while maintaining the touch. Such a gesture may be intuitively interpreted as that the user desires to check data in the future from the current time.

Referring to the second drawing of FIG. 12, after sensing the first input signal 1220, the mobile terminal may sequentially display data corresponding to the time information. In addition, the mobile terminal may perform the operation of sequentially displaying the data corresponding to the time information while executing the AOD mode.

Referring to the above-mentioned example, the mobile terminal may display a widget corresponding to the application that displays weather conditions depending on time on the first area 1210. The mobile terminal may sequentially display information on the current weather conditions and information on future weather conditions based on the first input signal 1220 for selecting the first point 1211 of the displayed widget. That is, since the weather application contains time information, the weather conditions may be considered as data corresponding to the time information.

In addition, when intending to sequentially displaying the data based on the first input signal 1220, the mobile terminal may display the data such that the data appears toward the drag direction of the first input signal 1220.

Thus, the user may check the weather in the future through the gesture of moving the user's hand from the first point 1211 to the bottom, thereby recognizing changes in the weather intuitively.

Although the present embodiment is described based on the weather application, it can be also applied to the calendar application and the alarm application because they include time information.

If the mobile terminal senses no input signal sensed during a predetermined time (e.g., three seconds) after displaying the data corresponding to the future time information, the mobile terminal may stop display of the data corresponding to the future time information and then display the data corresponding to the current time information (not shown in the drawing). Referring to the above-mentioned example, if the mobile terminal senses no input signal during three seconds after displaying the future weather, the mobile terminal may stop display of the future weather and then display the current weather.

In addition, if the mobile terminal senses a second input signal (not shown in the drawing) in an area except the displayed widget or the first area 1210 while displaying the data corresponding to the future time information based on the first input signal 1220 (not shown in the drawing), the mobile terminal may stop display of the future weather and then display the current weather again.

Figure 13:
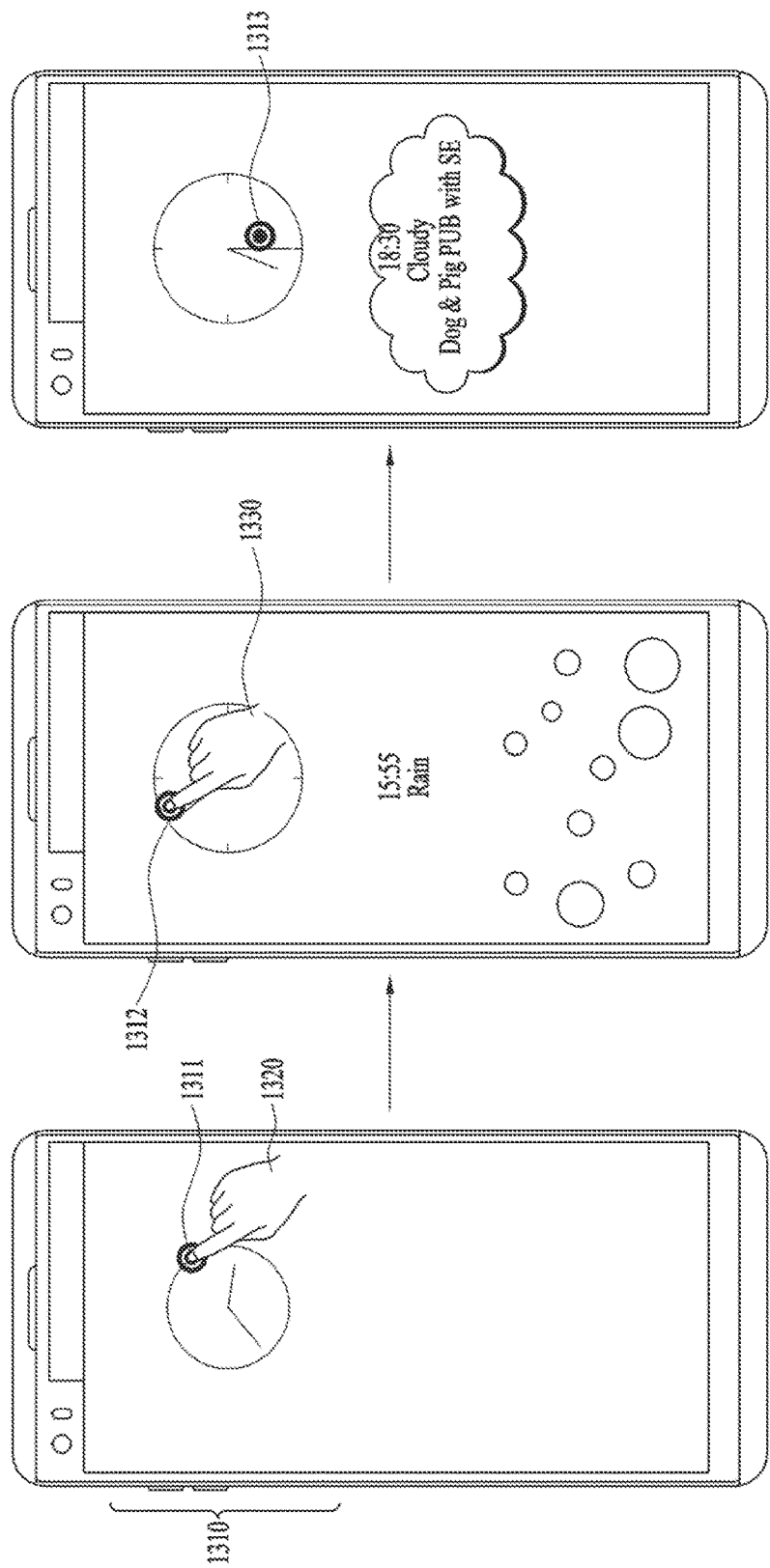
FIG. 13 is a diagram illustrating another example in which the mobile terminal executes an application that contains time information in the AOD mode according to an embodiment of the present invention.

FIG. 13 is a diagram illustrating another example in which the mobile terminal executes an application that contains time information in the AOD mode according to an embodiment of the present invention. To avoid redundant description, the features already mentioned in FIGS. 4 to 12 are omitted in the embodiment of FIG. 13.

Referring to the first drawing of FIG. 13, while executing the AOD mode, the mobile terminal can display a widget corresponding to the application that contains the time information on a first area 1310. For example, the mobile terminal may display a widget in the form of an analog watch on the first area 1310. In addition, the widget shown in the embodiment of FIG. 13 may correspond to a widget corresponding to the application that contains information on the weather and calendar.

In addition, in the embodiment of FIG. 13, the first area 1310 may be different from the first area 1210 of FIG. 12. For example, the first area 1310 of FIG. 13 may be an area used by the mobile terminal to display the current time in the AOD mode.

In an embodiment of the present invention, the mobile terminal can sense a first input signal 1320 for controlling the widget. In this case, the first input signal 1320 may correspond to a touch input signal of touching a first point 1311 of the widget with predetermined pressure and dragging the touch in a predetermined direction. For example, the user may touch the first point 1311 with a certain amount of the pressure and then drag the touch from the first point 1311 to a second point 1312 clockwise while maintaining the touch. Such a gesture may be intuitively interpreted as that the user desires to check data in the future from the current time.

Referring to the second drawing of FIG. 13, after sensing the first input signal 1320, the mobile terminal may enlarge a size of the displayed widget. For example, the mobile terminal may enlarge a size of the displayed analog watch.

In addition, the mobile terminal may move a minute hand of the analog watch to the second point 1312 based on the drag touch of the first input signal 1320. In this case, the mobile terminal may display at least one of time information, weather information, and calendar information of the second point 1312. For example, if the minute hand of the analog watch moves to the second point 1312 based on the first input signal 1320, the mobile terminal may display the time information of the second point 1312, 15:55 and the weather information of the second point 1312, 'Rain'.

Moreover, when the mobile terminal obtains the weather information of the second point 1312 based on the first input signal 1320, the mobile terminal may automatically display a background screen corresponding to the weather information on the display unit. Referring to the above-mentioned example, the mobile terminal may display a background screen corresponding to the weather information of the second point 1312, 'Rain'.

In an embodiment of the present invention, the mobile terminal can sense a second input signal 1330 for controlling the widget. In this case, the second input signal 1330 may correspond to a touch input signal of touching a second point 1312 of the widget with predetermined pressure and dragging the touch to a third point 1313 in a predetermined direction.

In addition, unlike the first input signal 1320, even if the second input signal 1330 is not touched with the predetermined pressure, it can be sensed. In other words, to activate the AOD mode, the mobile terminal may require the user to input a touch input signal with pressure equal to or greater than the predetermined pressure only in the case of an initial input signal. For example, the user may touch the second point 1312 with a certain amount of the pressure and then drag the touch to a third point 1313 clockwise while maintaining the touch.

Referring to the third drawing of FIG. 13, the mobile terminal may move the minute hand of the analog watch to the third point 1313 based on the drag touch of the second input signal 1330. In this case, the mobile terminal may display at least one of time information, weather information, and calendar information of the third point 1313. For example, if the minute hand of the analog watch moves to the third point 1313 based on the second input signal 1330, the mobile terminal may display the time information of the third point 1313, 18:30, the weather information of the third point 1313, 'Cloudy', and the calendar information of the third point 1313, 'Dog & Pig PUB with SE'.

Moreover, when the mobile terminal obtains the weather information of the third point 1313 based on the second input signal 1330, the mobile terminal may automatically display a background screen corresponding to the weather information on the display unit. Referring to the above-mentioned example, the mobile terminal may display a background screen corresponding to the weather information of the third point 1313, 'Cloudy'.

In an embodiment of the present invention, if the mobile terminal terminates sensing of the second input signal 1330 after moving the minute hand of the displayed analog watch to the third point 1313 based on the second input signal 1330, the mobile terminal may return to the state shown in the first drawing of FIG. 13.

In detail, after touching the first point 1311, the user may release the touch after dragging the touch over the second point 1312 and the third point 1313. When the first input signal 1320 and the second input signal 1330 are not sensed any more, the mobile terminal may stop display of the time information, the weather information and the calendar information and then display the initial analog watch before enlargement.

Although not shown in the drawing, it is apparent that the mobile terminal can display previous time information, previous weather information, and previous calendar information based on an input signal dragged counterclockwise.

Figure 14:
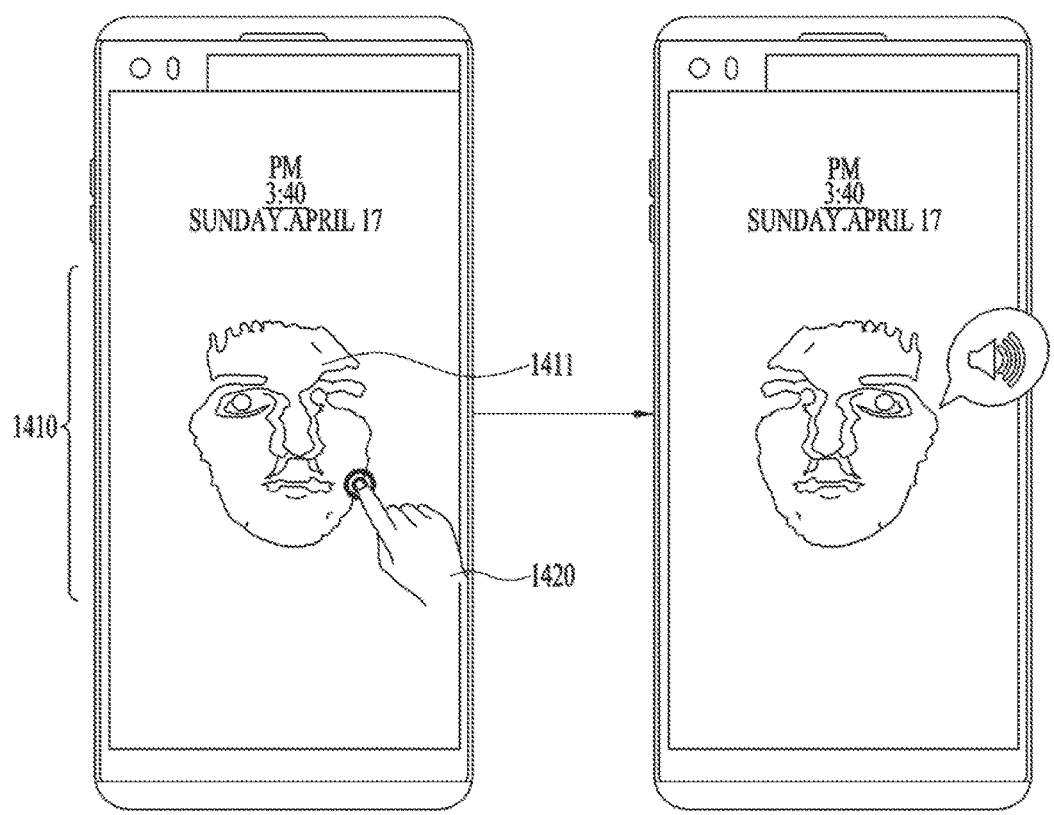
FIG. 14 is a diagram illustrating an example in which the mobile terminal moves a displayed image in the AOD mode according to an embodiment of the present invention.

FIG. 14 is a diagram illustrating an example in which the mobile terminal moves a displayed image in the AOD mode according to an embodiment of the present invention. To avoid redundant description, the features already mentioned in FIGS. 4 to 13 are omitted in the embodiment of FIG. 14.

Referring to the first drawing of FIG. 14, while executing the AOD mode, the mobile terminal can display a content 1411 on a first area 1410. In this case, the content 1411 may include audio data, video data, image data, etc. In addition, when the content 1411 containing audio data is displayed in the AOD mode, the content 1411 may be displayed without sound. Moreover, when the content 1411 containing video data is displayed in the AOD mode, the content 1411 may be displayed as a still image.

In an embodiment of the present invention, while displaying the still content 1411, the mobile terminal can sense an input signal 1420 for selecting a point of the content 1411. In this case, the input signal 1420 may correspond to a touch input signal satisfying at least one of the following conditions: a touch input signal is touched with the content 1411 during a predetermined time; a touch input signal is touched with the content 1411 over a predetermined area; and a touch input signal is touched with the content 1411 at predetermined pressure.

Referring to the second drawing of FIG. 14, after sensing the input signal 1420, the mobile terminal can move the content 1411 or output sound stored in the content 1411. In detail, the content 1411 may be displayed without movement and sound in the AOD mode even though the content 1411 contains video data or audio data. However, when the mobile terminal senses the input signal 1420, the mobile terminal may output the video data or the audio data contained in the content 1411.

Figure 15:
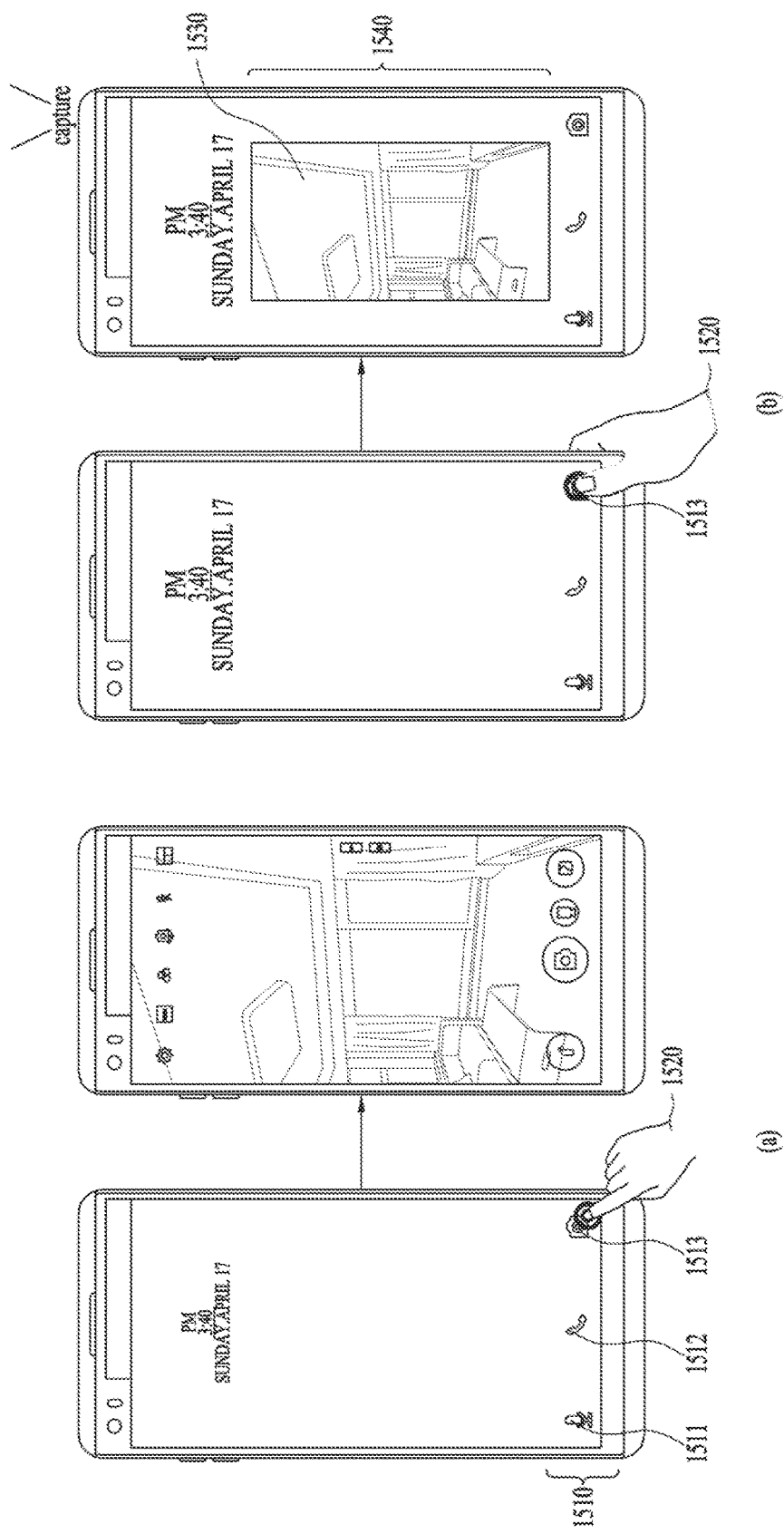
FIG. 15 is a diagram illustrating an example in which the mobile terminal captures an image in the AOD mode according to an embodiment of the present invention.
Figure 16:
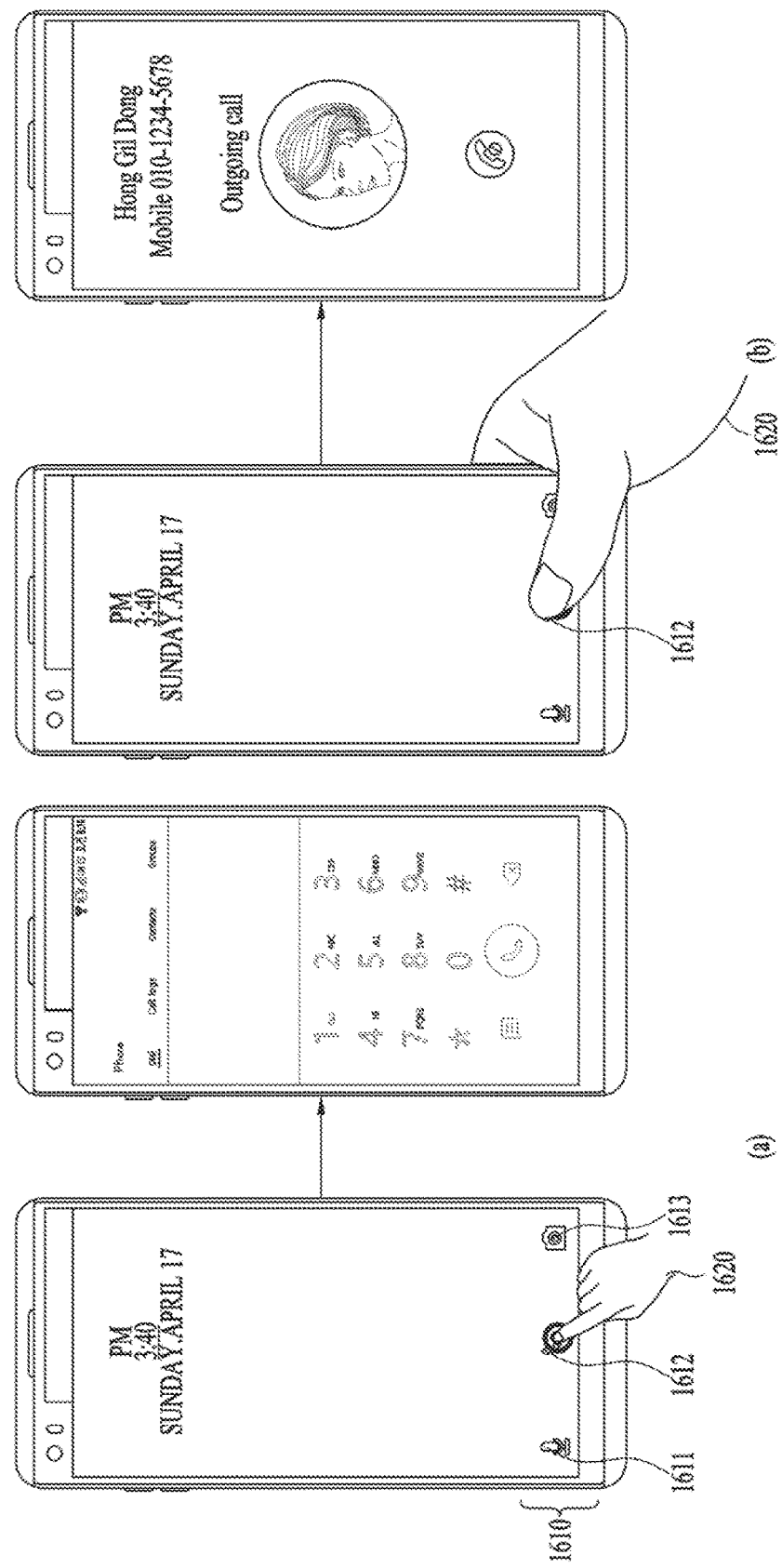
FIG. 16 is a diagram illustrating an example in which the mobile terminal makes a call in the AOD mode according to an embodiment of the present invention.
Figure 17:
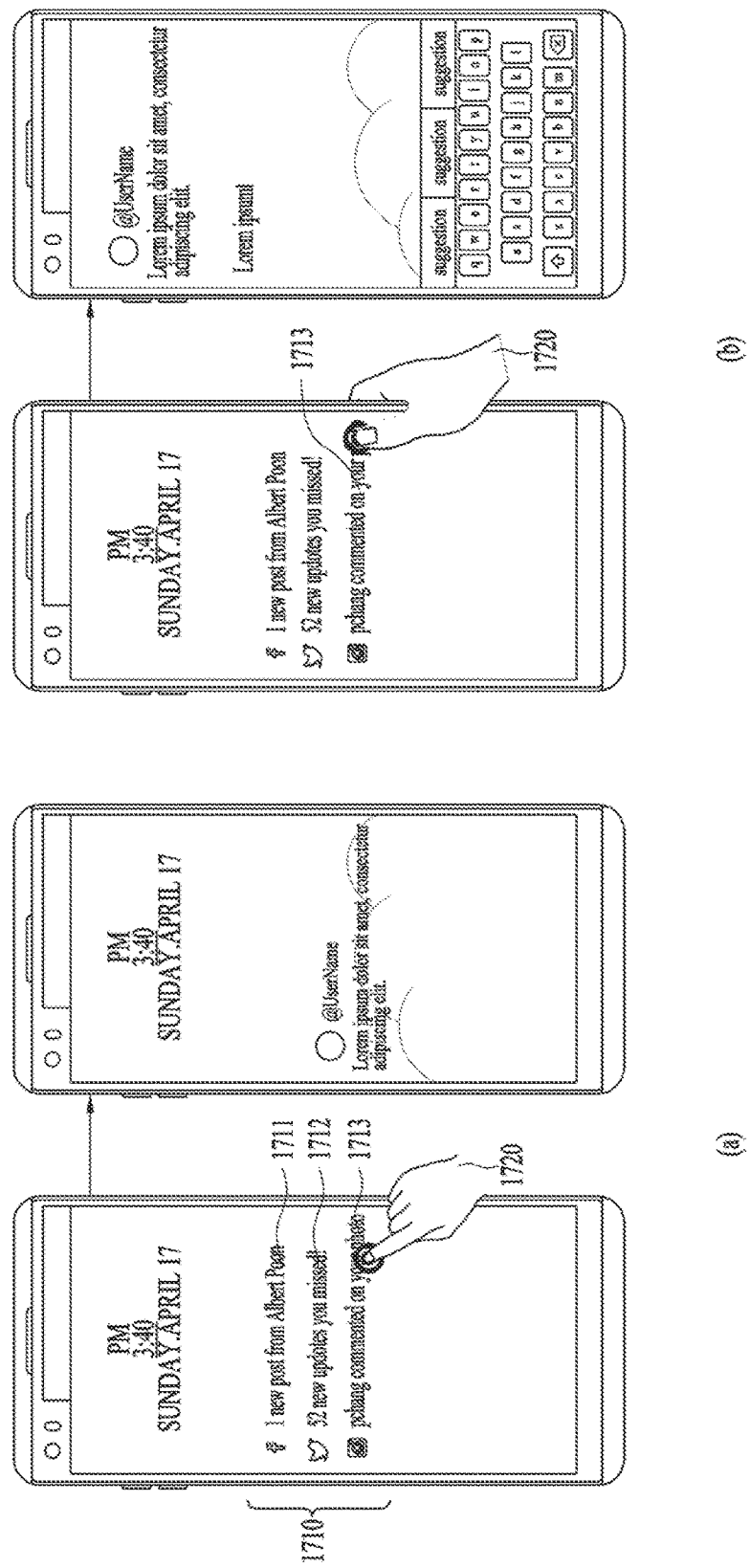
FIG. 17 is a diagram illustrating an example in which the mobile terminal receives a message in the AOD mode according to an embodiment of the present invention.

FIGS. 15 to 17 are diagrams illustrating embodiments in which the mobile terminal performs a different function according to a state of the mobile terminal when executing a predetermined application.

FIG. 15 is a diagram illustrating an example in which the mobile terminal captures an image in the AOD mode according to an embodiment of the present invention. To avoid redundant description, the features already mentioned in FIGS. 4 to 14 are omitted in the embodiment of FIG. 15.

FIG. 15 (a) shows a case in which the mobile terminal is placed on a floor and FIG. 15 (b) shows a case in which the mobile is placed on a user's hand.

Referring to the first drawing of FIG. 15 (a), while executing the AOD mode, the mobile terminal can maintain a first area 1510 of the display unit as the active state and display an icon mapped to a predetermined application on the first area 1510. For example, the mobile terminal may display a voice recognition icon 1511, a call icon 1512, and a camera icon 1513 on the first area 1510.

In an embodiment of the present invention, the mobile terminal may sense a predetermined input signal 1520 for selecting the camera icon 1513. In this case, the predetermined input signal 1520 may correspond to a touch input signal satisfying at least one of the following conditions: a touch input signal is touched during a predetermined time; a touch input signal is touched over a predetermined area; and a touch input signal is touched with predetermined pressure.

Referring to the second drawing of FIG. 15 (*a*), after sensing the predetermined input signal 1520 for selecting the camera icon 1513, the mobile terminal can sense a slope of the mobile terminal. In this case, the mobile terminal may determine whether the mobile terminal is placed on the floor or the user's hand, through the slope of the mobile terminal.

In an embodiment of the present invention, when the mobile terminal senses the predetermined input signal 1520 while being placed on the floor, the mobile terminal may execute a camera application corresponding to the camera icon 1513. In this case, the mobile terminal may execute the camera application in the AOD mode or after releasing the AOD mode.

That is, if the user touches the camera icon 1513 in a predetermined manner while the mobile terminal is placed on the floor, it could be interpreted as that the user desires to execute the camera application and thus, the mobile terminal can execute the camera application.

Referring to the first drawing of FIG. 15 (*b*), the mobile terminal may also sense the predetermined input signal 1520 for selecting the camera icon 1513. Here, the predetermined input signal 1520 may be the same as the input signal of FIG. 15 (*a*).

Referring to the second drawing of FIG. 15 (*b*), after sensing the predetermined input signal 1520 for selecting the camera icon 1513, the mobile terminal can sense a slope of the mobile terminal.

Unlike the embodiment of FIG. 15 (*a*), the mobile terminal is placed on the user's hand in the embodiment of FIG. 15 (*b*). Thus, when sensing the predetermined input signal 1520, the mobile terminal can capture a preview image 1530 through a camera.

That is, if the user touches the camera icon 1513 in a predetermined manner while the mobile terminal is placed on the user's hand, it could be interpreted as that the user desires to capture the preview image 1530 through the camera and thus, the mobile terminal may immediately capture the preview image 1530.

In addition, after capturing the preview image 1530, the mobile terminal can display the captured preview image 1530 on a second area 1540 during a predetermined time while executing the AOD mode.

FIG. 16 is a diagram illustrating an example in which the mobile terminal makes a call in the AOD mode according to an embodiment of the present invention. To avoid redundant description, the features already mentioned in FIGS. 4 to 15 are omitted in the embodiment of FIG. 16.

FIG. 16 (*a*) shows a case in which the mobile terminal is placed on the floor and FIG. 16 (*b*) shows a case in which the mobile is placed on the user's hand.

Referring to the first drawing of FIG. 16 (*a*), while executing the AOD mode, the mobile terminal can maintain a predetermined area 1610 of the display unit as the active state and display an icon mapped to a predetermined application on the predetermined area 1610. For example, the mobile terminal may display a voice recognition icon 1611, a call icon 1612, and a camera icon 1613 on the predetermined area 1510.

In an embodiment of the present invention, the mobile terminal may sense a predetermined input signal 1620 for selecting the call icon 1612.

Referring to the second drawing of FIG. 16 (*a*), after sensing the predetermined input signal 1620 for selecting the call icon 1612, the mobile terminal can sense a slope of the mobile terminal.

In an embodiment of the present invention, when the mobile terminal senses the predetermined input signal 1620 while being placed on the floor, the mobile terminal may execute a call application corresponding to the call icon 1612. In this case, the mobile terminal may execute the call application in the AOD mode or after releasing the AOD mode.

That is, if the user touches the call icon 1612 in a predetermined manner while the mobile terminal is placed on the floor, it could be interpreted as that the user desires to execute the call application and thus, the mobile terminal can execute the call application.

Referring to the first drawing of FIG. 16 (*b*), the mobile terminal may also sense the predetermined input signal 1620 for selecting the call icon 1612. Here, the predetermined input signal 1620 may be the same as the input signal of FIG. 16 (*a*).

Referring to the second drawing of FIG. 16 (*b*), after sensing the predetermined input signal 1620 for selecting the call icon 1612, the mobile terminal can sense a slope of the mobile terminal.

Unlike the embodiment of FIG. 16 (*a*), the mobile terminal is placed on the user's hand in the embodiment of FIG. 16 (*b*). Thus, when sensing the predetermined input signal 1620, the mobile terminal can make a call to a first person corresponding to the most recently called person.

That is, if the user touches the call icon 1612 in a predetermined manner while the mobile terminal is placed on the user's hand, it may be interpreted as that the user desires to dial to the most recently called person and thus, the mobile terminal may immediately make a call to the first person.

FIG. 17 is a diagram illustrating an example in which the mobile terminal receives a message in the AOD mode according to an embodiment of the present invention. To avoid redundant description, the features already mentioned in FIGS. 4 to 16 are omitted in the embodiment of FIG. 17.

FIG. 17 (*a*) shows a case in which the mobile terminal is placed on the floor and FIG. 17 (*b*) shows a case in which the mobile is placed on the user's hand.

Referring to the first drawing of FIG. 17 (*a*), while executing the AOD mode, the mobile terminal can maintain a predetermined area 1710 of the display unit as the active state and display notification information on the predetermined area 1710.

In detail, the mobile terminal may display first alarm information 1711 received by a first application, second alarm information 1712 received by a second application, and third alarm information 1713 received by a third application on the first area 1710.

In an embodiment of the present invention, the mobile terminal may sense a predetermined input signal 1720 for selecting the third alarm information 1713.

Referring to the second drawing of FIG. 17 (*a*), after sensing the predetermined input signal 1720 for selecting the third alarm information 1713, the mobile terminal can sense a slope of the mobile terminal.

In an embodiment of the present invention, when the mobile terminal senses the predetermined input signal 1720 while being placed on the floor, the mobile terminal can display all contents of the third alarm information 1713. In detail, the mobile terminal may display an alarm content, a sender, and an attached file included in the third alarm information 1713.

That is, if the user touches the third alarm information 1713 in a predetermined manner while the mobile terminal is placed on the floor, it could be interpreted as that the user desires to check details of the third alarm information 1713 and thus, the mobile terminal can display all contents of the third alarm information 1713.

Referring to the first drawing of FIG. 17 (*b*), the mobile terminal may also sense the predetermined input signal 1720 for selecting the third alarm information 1713. Here, the predetermined input signal 1720 may be the same as the input signal of FIG. 17 (*a*).

Referring to the second drawing of FIG. 17 (*b*), after sensing the predetermined input signal 1720 for selecting the third alarm information 1713, the mobile terminal can sense a slope of the mobile terminal.

Unlike the embodiment of FIG. 17 (*a*), the mobile terminal is placed on the user's hand in the embodiment of FIG. 17 (*b*). Thus, when sensing the predetermined input signal 1720, the mobile terminal can execute a response mode.

In detail, after sensing the predetermined input signal 1720, the mobile terminal can display a pop-up window for responding to the sender of the third alarm information 1713. In this case, the mobile terminal may execute the response mode while executing the AOD mode.

That is, if the user touches the third alarm information 1713 in a predetermined manner while the mobile terminal is placed on the user's hand, it may be interpreted as that the user desires to respond to the sender who transmits the third alarm information 1713 and thus, the mobile terminal may immediately respond to the sender of the third alarm information 1713.

Figure 18:
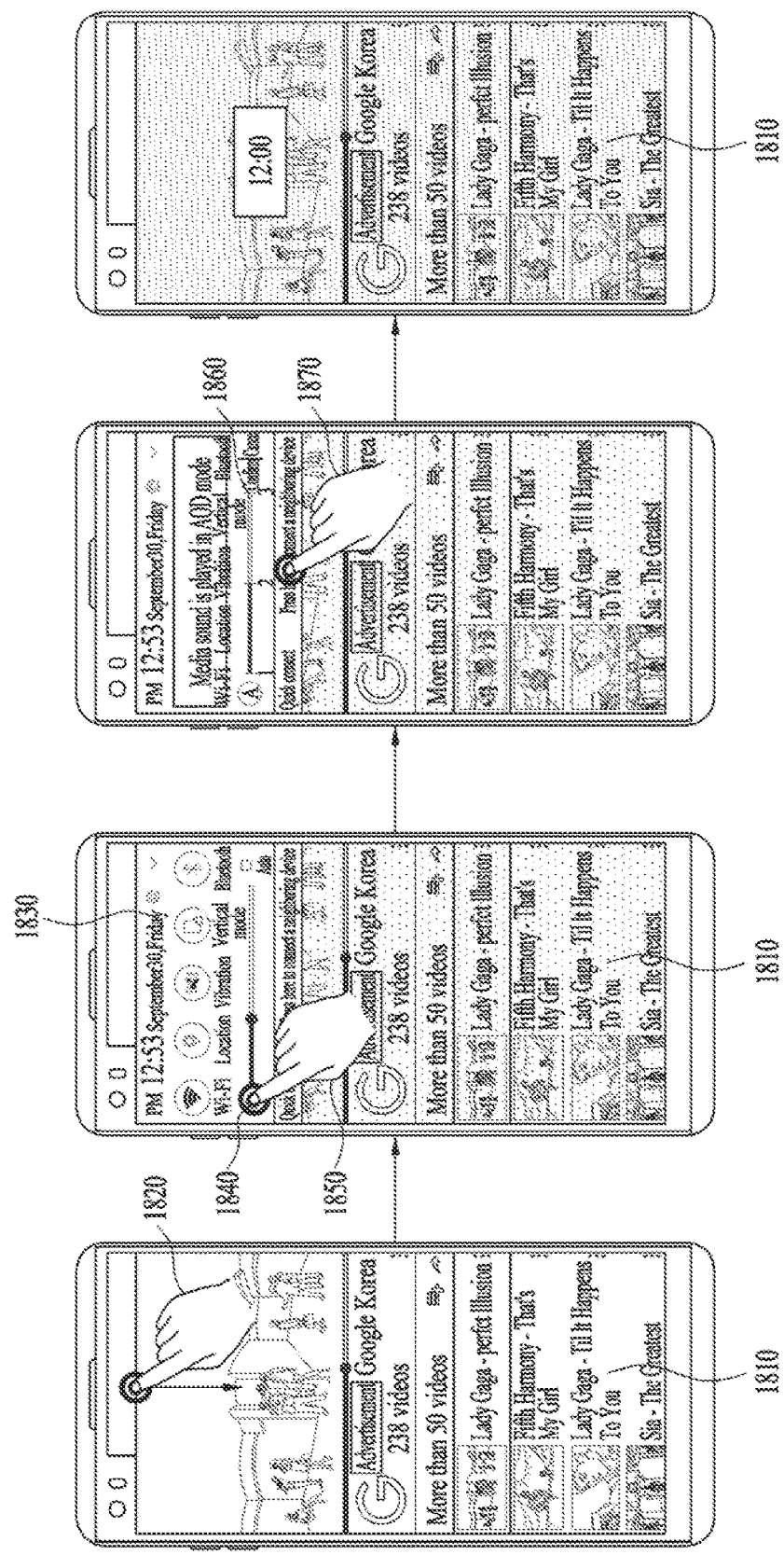
FIG. 18 is a diagram illustrating an example in which the mobile terminal executes an application in the AOD mode according to an embodiment of the present invention.

FIG. 18 is a diagram illustrating an example in which the mobile terminal executes an application in the AOD mode according to an embodiment of the present invention. To avoid redundant description, the features already mentioned in FIGS. 4 to 17 are omitted in the embodiment of FIG. 18.

Referring to the first drawing of FIG. 18, the mobile terminal can display an application 1810 on the display unit.

In an embodiment of the present invention, the mobile terminal can sense a first input signal 1820 for displaying a control window 1830. In this case, the control window 1830 may include various menus. For example, the control window 1830 may include various menus for controlling the mobile terminal such as WiFi activation, GPS activation, switching between vibration/sound modes, switching between vertical/horizontal modes, Bluetooth activation, brightness adjustment, etc.

In addition, the first input signal may correspond to an input signal of touch-dragging a bezel part of the mobile terminal in a predetermined direction. For example, the first input signal 1820 may be correspond to an input signal of dragging the bezel part of the mobile terminal from the top to the bottom.

Referring to the second drawing of FIG. 18, after sensing the first input signal 1820, the mobile terminal can display the control window 1830 while executing the application 1810 in a background state. For example, the mobile terminal may blurredly display the application 1810 and then display the control window 1830 on the application 1810 in an overlaid manner.

While displaying the control window 1830, the mobile terminal can sense a second input signal 1850 that selects an icon 1840 for executing the application 1810 in the AOD mode. In this case, the icon 1840 for executing the application 1810 in the AOD mode may be included in the control window 1830. In addition, the icon 1840 may be interchangeably used with a brightness adjustment icon included in the control window 1830. Details will be described with reference to FIG. 19.

In detail, the mobile terminal can display the control window 1830 that includes a brightness adjustment icon and a brightness adjustment bar. In this case, the mobile terminal can sense the second input signal 1850 for selecting the brightness adjustment icon.

Referring to the third drawing of FIG. 18, after sensing the second input signal 1850, the mobile terminal can change the brightness adjustment icon to an AOD mode activation icon. In addition, the mobile terminal can change the brightness adjustment bar to an AOD mode adjustment bar 1860. In this case, the AOD mode adjustment bar may correspond to an indicator that shows arranged AOD modes to allow the user to select at least one of the arranged AOD modes.

That is, the AOD mode may include at least one detail mode (sub-mode) and the user may select a single AOD mode through the AOD mode adjustment bar 1860. For example, the AOD mode may include a first AOD mode, a second AOD mode, and a third AOD mode. Details of each mode will be described with reference to FIG. 23.

In an embodiment of the present invention, while displaying the AOD mode adjustment bar 1860, the mobile terminal can sense a third input signal 1860 for selecting the second AOD mode.

Referring to the fourth drawing of FIG. 18, after sensing the third input signal 1850, the mobile terminal can execute the application in the second AOD mode. For example, while executing the second AOD mode, the mobile terminal may sense a predetermined input signal through the application 1810. Thereafter, the mobile terminal may display the application 1810 in the dimming state and also output audio data included in the application 1810.

Figure 19:
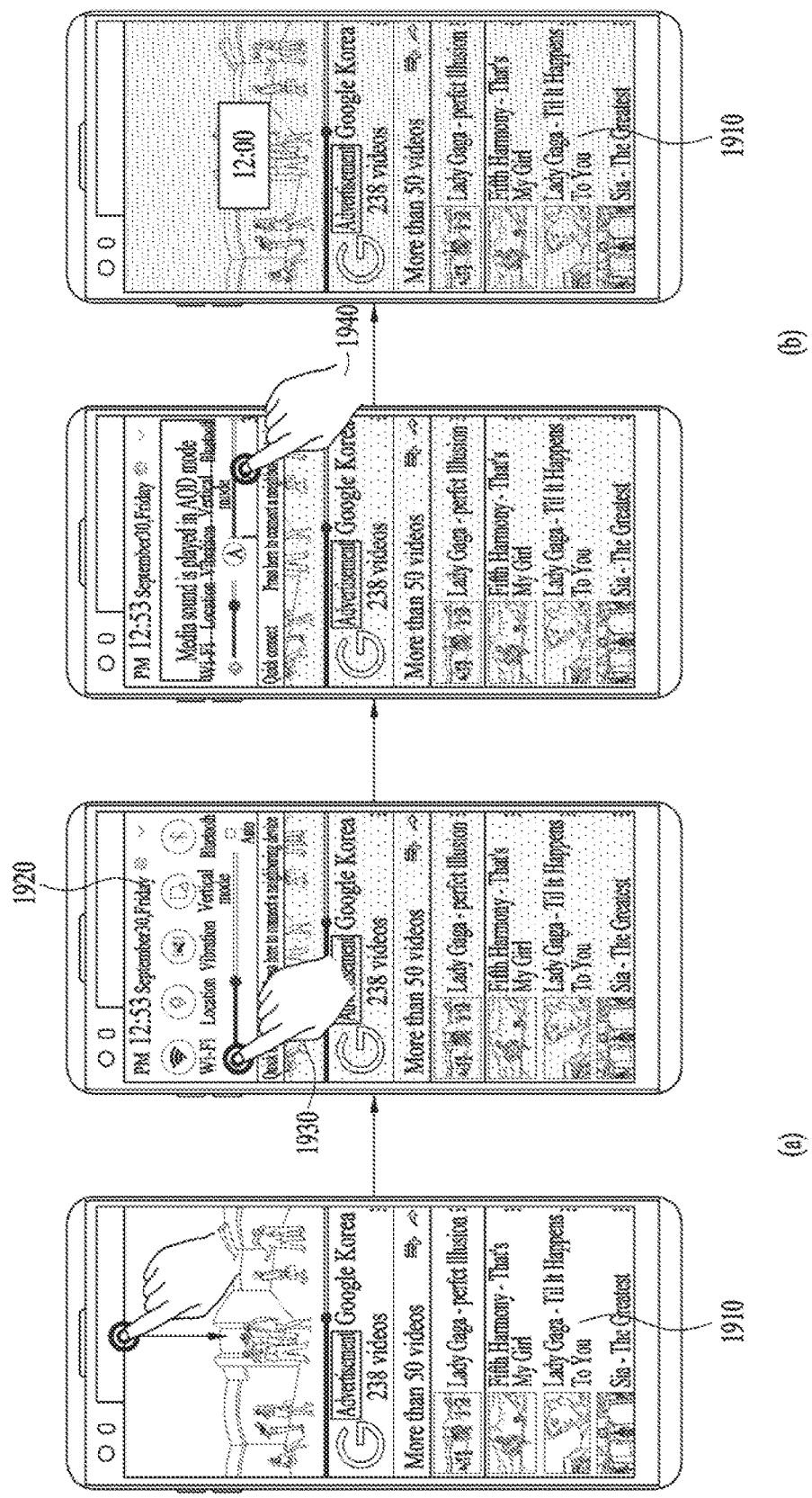
FIG. 19 is a diagram illustrating another example in which the mobile terminal executes an application in the AOD mode according to an embodiment of the present invention.

FIG. 19 is a diagram illustrating another example in which the mobile terminal executes an application in the AOD mode according to an embodiment of the present invention. To avoid redundant description, the features already mentioned in FIGS. 4 to 18 are omitted in the embodiment of FIG. 19.

The first and second drawings of FIG. 19 match the first and second drawings of FIG. 18. That is, the mobile terminal can display an application 1910 on the display unit and display a control window 1920 based on a first input signal. In addition, the mobile terminal can sense a second input signal 1930 for selecting a brightness adjustment icon displayed on the control window 1920.

Referring to the third drawing of FIG. 19, unlike the embodiment of FIG. 18, after sensing the second input signal 1930, the mobile terminal can display an AOD mode activation icon and an AOD mode adjustment bar together with the brightness adjustment icon and a brightness adjustment bar.

That is, after sensing the second input signal 1930, the mobile terminal may display the AOD mode activation icon and the AOD mode adjustment bar together with the brightness adjustment icon and the brightness adjustment bar, instead of replacing the brightness adjustment icon and the brightness adjustment bar with the AOD mode activation icon and the AOD mode adjustment bar, respectively.

In an embodiment of the present invention, while displaying the AOD mode adjustment bar, the mobile terminal can sense a third input signal 1940 for selecting the second AOD mode.

Referring to the fourth drawing of FIG. 19, after sensing the third input signal 1940, the mobile terminal can display the application 1910 in the second AOD mode.

Figure 20:
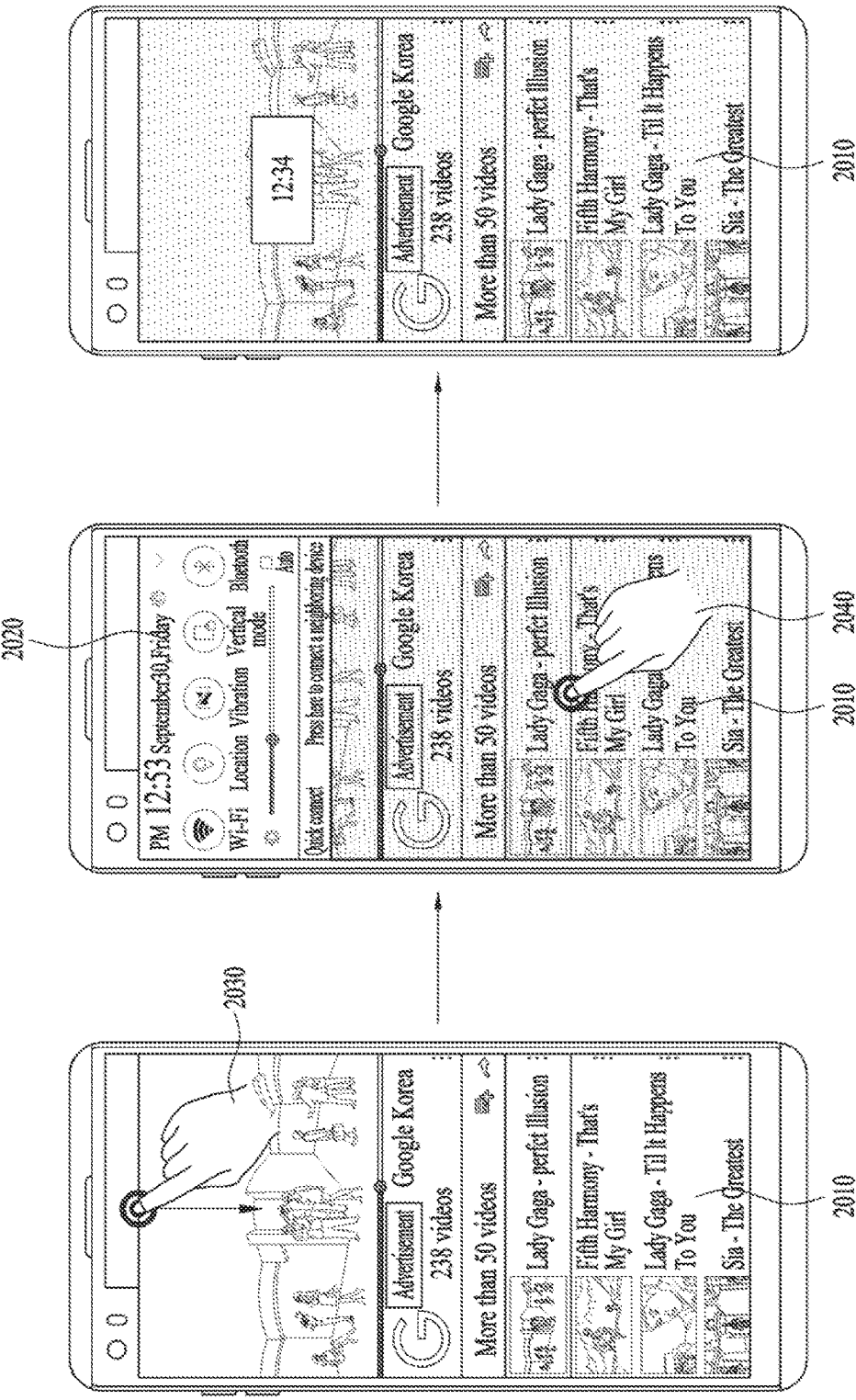
FIG. 20 is a diagram illustrating still another example in which the mobile terminal executes an application in the AOD mode according to an embodiment of the present invention.

FIG. 20 is a diagram illustrating still another example in which the mobile terminal executes an application in the AOD mode according to an embodiment of the present invention. To avoid redundant description, the features already mentioned in FIGS. 4 to 19 are omitted in the embodiment of FIG. 20.

The first drawing of FIG. 20 matches the first drawing of FIG. 18. That is, the mobile terminal can display an application 2010 on the display unit and sense a first input signal 2030 for displaying a control window 2020.

Referring the second drawing of FIG. 20, after sensing the first input signal 2030, the mobile terminal can display the control window 2020 while displaying the application 2010 on the background.

Unlike the embodiments of FIGS. 18 and 19, while displaying the control window 2020, the mobile terminal can sense a second input signal 2040 of touching the application 2010 displayed on the background. In this case, the second input signal 2040 may correspond to a touch input signal satisfying at least one of the following conditions: a touch input signal is touched during a predetermined time; a touch input signal is touched over a predetermined area; and a touch input signal is touched with predetermined pressure.

For example, while the mobile terminal displays the control window 2020 on the foreground of the application 2010 based on the first input signal 2030, the user may touch a point of the application 2010 displayed on the background with a certain amount of pressure.

Referring to the third drawing of FIG. 20, after sensing the second input signal 2040, the mobile terminal can display the application 2010 in the AOD mode. In other words, according to the embodiment of FIG. 20, the mobile terminal may execute the application 2010 in the AOD mode using the application 2010 displayed on the background instead of using a brightness adjustment icon displayed on the control window 2020, unlike the embodiments of FIGS. 18 and 19.

In addition, a detail mode (sub-mode) of the AOD mode may have a default value. For example, if the user sets the default value of the AOD mode to the first AOD mode, the mobile terminal may execute the application 2010 in the first AOD mode after sensing the second input signal 2040.

Figure 21:
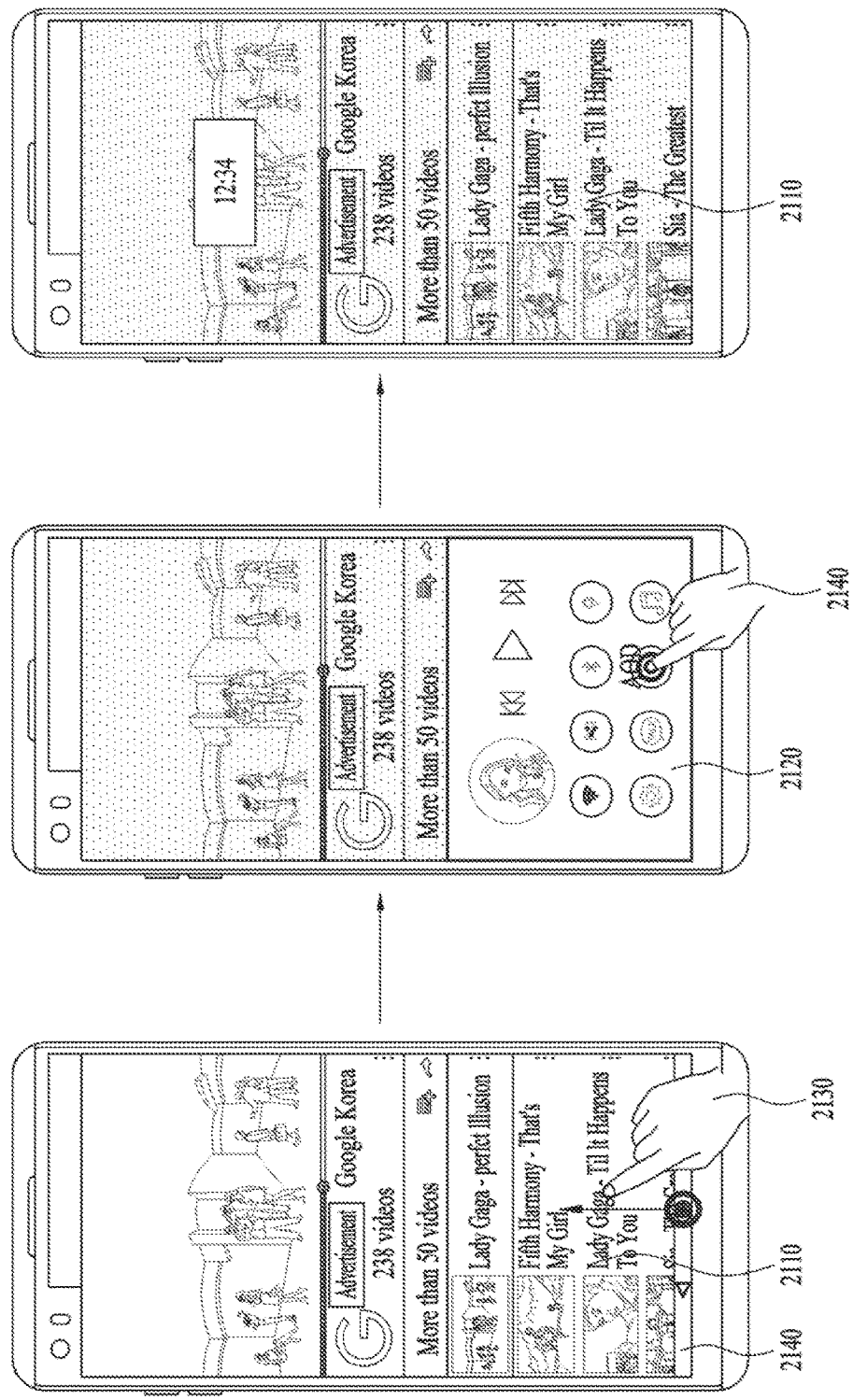
FIG. 21 is a diagram illustrating a further example in which the mobile terminal executes an application in the AOD mode according to an embodiment of the present invention.

FIG. 21 is a diagram illustrating a further example in which the mobile terminal executes an application in the AOD mode according to an embodiment of the present invention. To avoid redundant description, the features already mentioned in FIGS. 4 to 20 are omitted in the embodiment of FIG. 21.

The first drawing of FIG. 21 matches the first drawing of FIG. 18. That is, the mobile terminal can display an application 2110 on the display unit and sense a first input signal 2130 for displaying a control window 2120.

However, unlike the aforementioned embodiments, the first input signal 2130 may correspond to an input signal of touch-dragging a soft key 2140 of the mobile terminal in a predetermined direction. For instance, the mobile terminal may display the soft key 2140 composed of a back key, a home key, and a recent key on the bottom of the display unit depending on the setting. In this case, the first input signal 2130 may correspond to an input signal of touching a point of the soft key 2140 and dragging the point from the bottom to the top.

Referring to the second drawing of FIG. 21, after sensing the first input signal 2130, the mobile terminal can display the control window 2120 while displaying the application 2110 on the background.

In an embodiment of the present invention, the control window 2120 may include an AOD mode activation icon unlike the embodiments of FIGS. 18 and 19.

The mobile terminal can sense a second input signal 2140 for selecting the AOD mode activation icon. For example, while the mobile terminal displays the control window 2120 on the foreground of the application 2110 based on the first input signal 2130, the user may touch the AOD mode activation icon.

Referring to the third drawing of FIG. 21, after sensing the second input signal 2140, the mobile terminal can display the application 2110 in the AOD mode.

Figure 22:
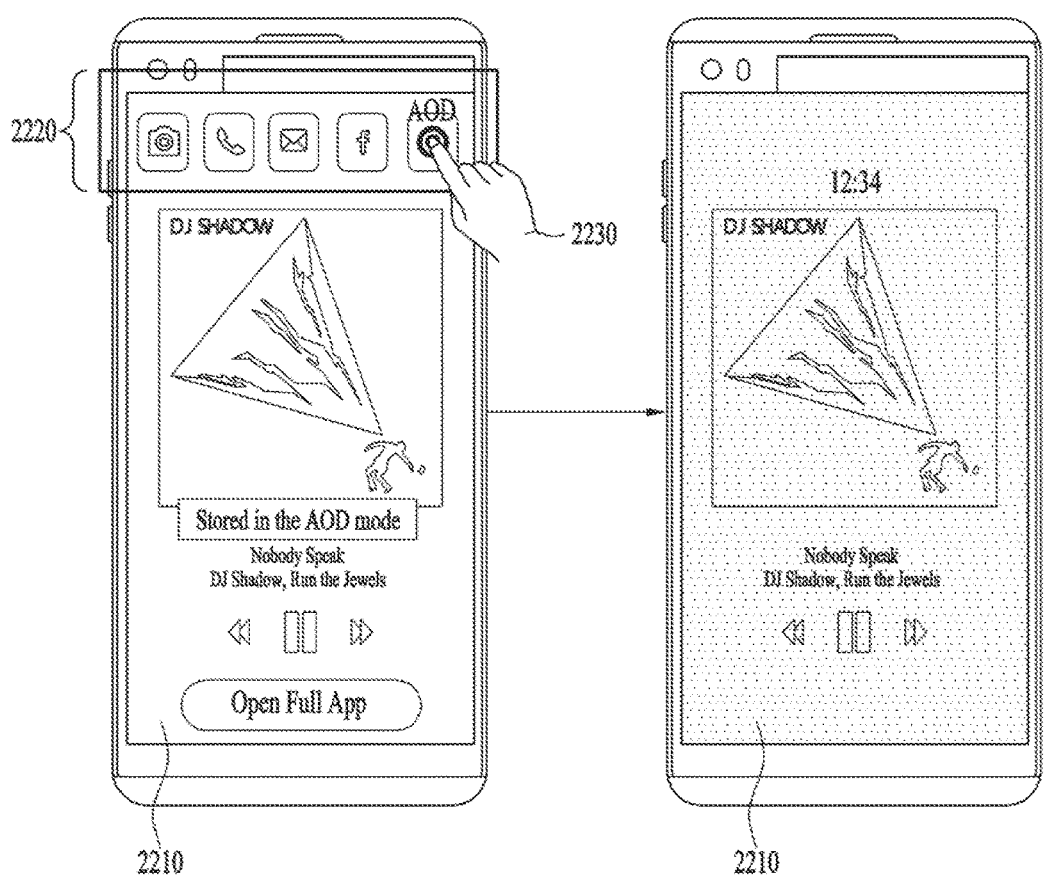
FIG. 22 is a diagram illustrating a still further example in which the mobile terminal executes an application in the AOD mode according to an embodiment of the present invention.

FIG. 22 is a diagram illustrating a still further example in which the mobile terminal executes an application in the AOD mode according to an embodiment of the present invention. To avoid redundant description, the features already mentioned in FIGS. 4 to 21 are omitted in the embodiment of FIG. 22.

Referring to the first drawing of FIG. 22, the mobile terminal can display an application 2210 on the display unit. In an embodiment of the present invention, while displaying the application 2210, the mobile terminal can display a second screen 2220 on the top of the display unit and a soft key on the bottom of the display unit. In this case, the second screen 2220 and the soft key may not overlap with the application 2210.

In other words, considering that a current mobile terminal has an aspect ratio of 18:9 and thus, its vertical length is much longer than that of the conventional mobile terminal, it is possible to arrange the second screen 2220 and the soft key at the top and bottom of the display unit.

In an embodiment of the present invention, the mobile terminal can sense an input signal 2230 for selecting an AOD mode activation icon included in the second screen 2220.

Referring to the second drawing of FIG. 22, unlike the aforementioned embodiments, the mobile terminal can immediately execute the application 2210 in the AOD mode through the AOD mode activation icon included in the second screen 2220 without running the application 2210 in the background state.

Figure 23:
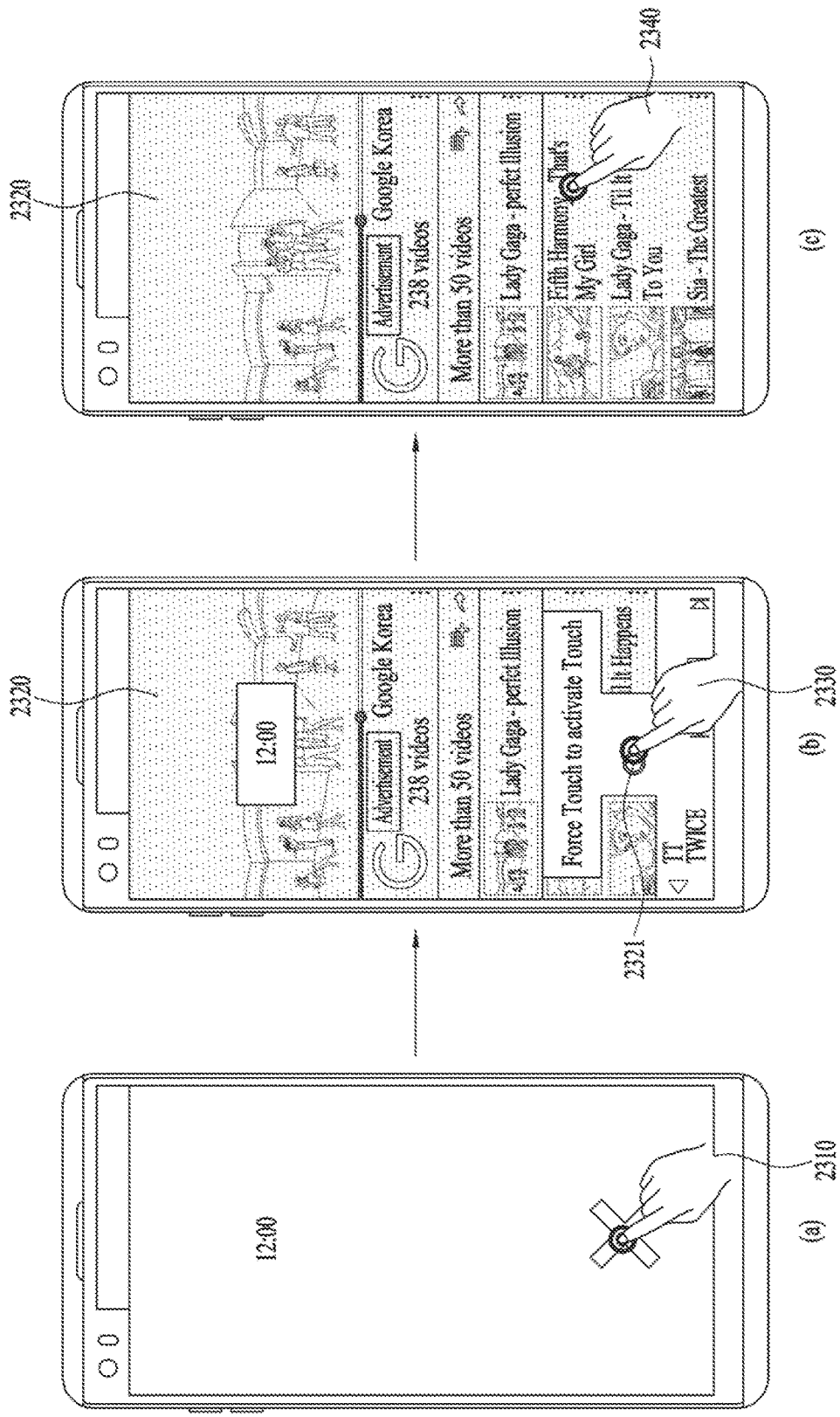
FIG. 23 is a diagram illustrating an example in which the mobile terminal switches the AOD mode according to an embodiment of the present invention.

FIG. 23 is a diagram illustrating an example in which the mobile terminal switches the AOD mode according to an embodiment of the present invention. To avoid redundant description, the features already mentioned in FIGS. 4 to 22 are omitted in the embodiment of FIG. 23.

Referring to FIG. 23 (a), the mobile terminal can execute the first AOD mode on the display unit. In this case, the first AOD mode may be a state in which no sound is outputted and a first input signal 2310 cannot be sensed. In addition, the first input signal 2310 may be a normal touch input signal. That is, while executing the first AOD mode, the mobile terminal can ignore the normal touch input signal.

Referring to FIG. 23 (b), the mobile terminal can execute an application 2320 in the second AOD mode. In this case, the second AOD mode may be a state in which sound is outputted through the application 2320 and a predetermined input signal can be sensed. For example, while executing the second AOD mode, the mobile terminal may sense only a touch input signal touched with pressure equal to or greater than predetermined pressure. In addition, the application 2320 can be executed in the second AOD mode as described in FIGS. 18 and 19.

In an embodiment of the present invention, the mobile terminal can sense a predetermined input signal (not shown in the drawing) for controlling the application 2320 running in the second AOD mode. In detail, while executing the application 2320 in the second AOD mode, the mobile terminal may sense predetermined input signals for selecting various icons displayed on the application 2320. For example, when the user touches an icon of the application 2320 at pressure equal to or greater than the predetermined pressure instead of a general touch gesture, the mobile terminal may sense the touch in the second AOD mode and the application 2320 may perform a corresponding function.

Moreover, in an embodiment of the present invention, the mobile terminal can sense a second input signal 2330 for executing the third AOD mode. In this case, the second input signal 2330 may be an input signal of touching a point 2321 of the application 2320 with pressure equal to or greater than the predetermined pressure. In addition, the mobile terminal may separately display the point 2321 to sense the second input signal 2330.

Referring to FIG. 23 (c), after sensing the second input signal 2330, the mobile terminal can execute the third AOD mode. In this case, the third AOD mode may be a state in which a normal touch input signal 2340 can be sensed. That is, after sensing the second input signal 2330, the mobile terminal can sense the normal touch input signal 2340 for controlling the application 2320. For example, if the user touches the icon displayed on the application 2320 while the application 2320 is running in the third AOD mode, the mobile terminal may execute the function mapped to the selected icon.

In an embodiment of the present invention, if there is no signal sensed during a predetermined time while the application 2320 is running in the third AOD mode, the mobile terminal can switch from the third mode to the second mode to execute the application 2320 in the second AOD mode. For example, if the mobile terminal senses no input signal during five seconds after executing the application 2320 in the third AOD mode based on the second input signal 2320, the mobile terminal may execute the application 2320 in the second AOD mode again.

In other words, the mobile terminal can control the application 2320 to sense the normal touch input signal only if necessary. In addition, if there is no input signal sensed during the predetermined time, the mobile terminal may determine that the application 2320 does not require general control. Thus, the mobile terminal can switch the AOD mode to allow the application 2320 to sense only the predetermined touch input signal.

Figure 24:
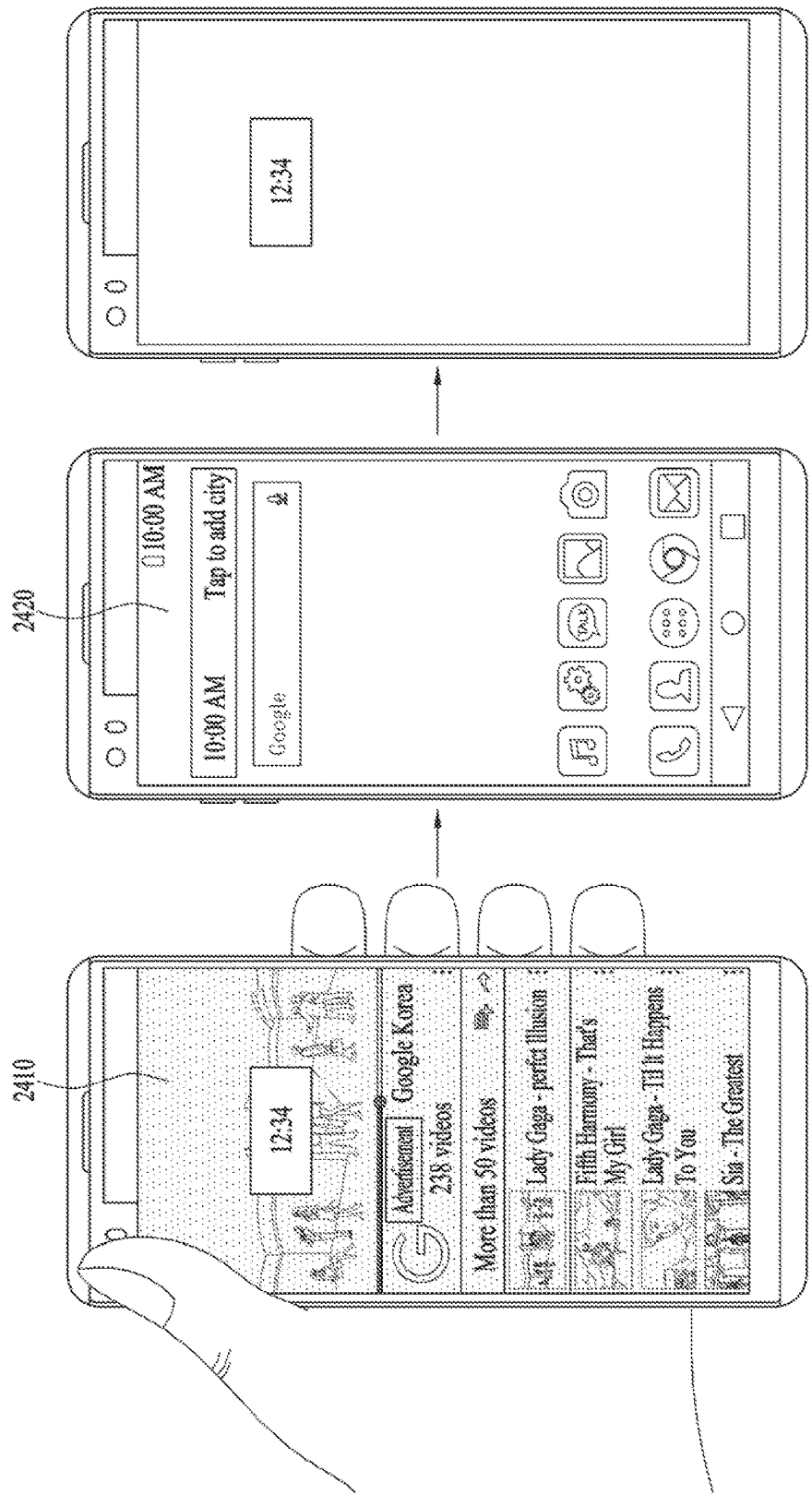
FIG. 24 is a diagram illustrating an example in which the mobile terminal terminates the AOD mode according to an embodiment of the present invention.

FIG. 24 is a diagram illustrating an example in which the mobile terminal terminates the AOD mode according to an embodiment of the present invention. To avoid redundant description, the features already mentioned in FIGS. 4 to 23 are omitted in the embodiment of FIG. 24.

Referring to the first drawing of FIG. 24, the mobile terminal can execute an application 2410 in the AOD mode.

In an embodiment of the present invention, since the mobile terminal executes the application 2410 in the AOD mode after receiving a command of turning off the display unit, the mobile terminal needs to be unlocked to display a home screen 2420.

In addition, in an embodiment of the present invention, the mobile terminal may be unlocked by sensing a fingerprint recognition input signal, a knock code input signal, a knock pattern input signal, an iris recognition input signal, a voice recognition input signal, etc. Moreover, the mobile terminal may also be unlocked using the conventional technique for unlocking.

Referring to the second drawing of FIG. 24, when the mobile terminal is unlocked while the application 2410 is running in the AOD mode, the mobile terminal can deactivate the AOD mode of the application 2410 and then display the home screen 2420 on the display unit.

Referring to the third drawing of FIG. 24, when the mobile terminal receives the command of turning off the display unit again after performing a different operation on the home screen 2420, the mobile terminal can execute the AOD mode again. In this case, the mobile terminal may execute a default AOD mode for displaying the current time information instead of executing the application 2410 in the AOD mode.

That is, in an embodiment of the present invention, when the mobile terminal displays the home screen 2420 after executing the application 2410 in the AOD mode, the mobile terminal can execute only the default AOD mode without executing the application 2410 in the AOD mode again.

Figure 25:
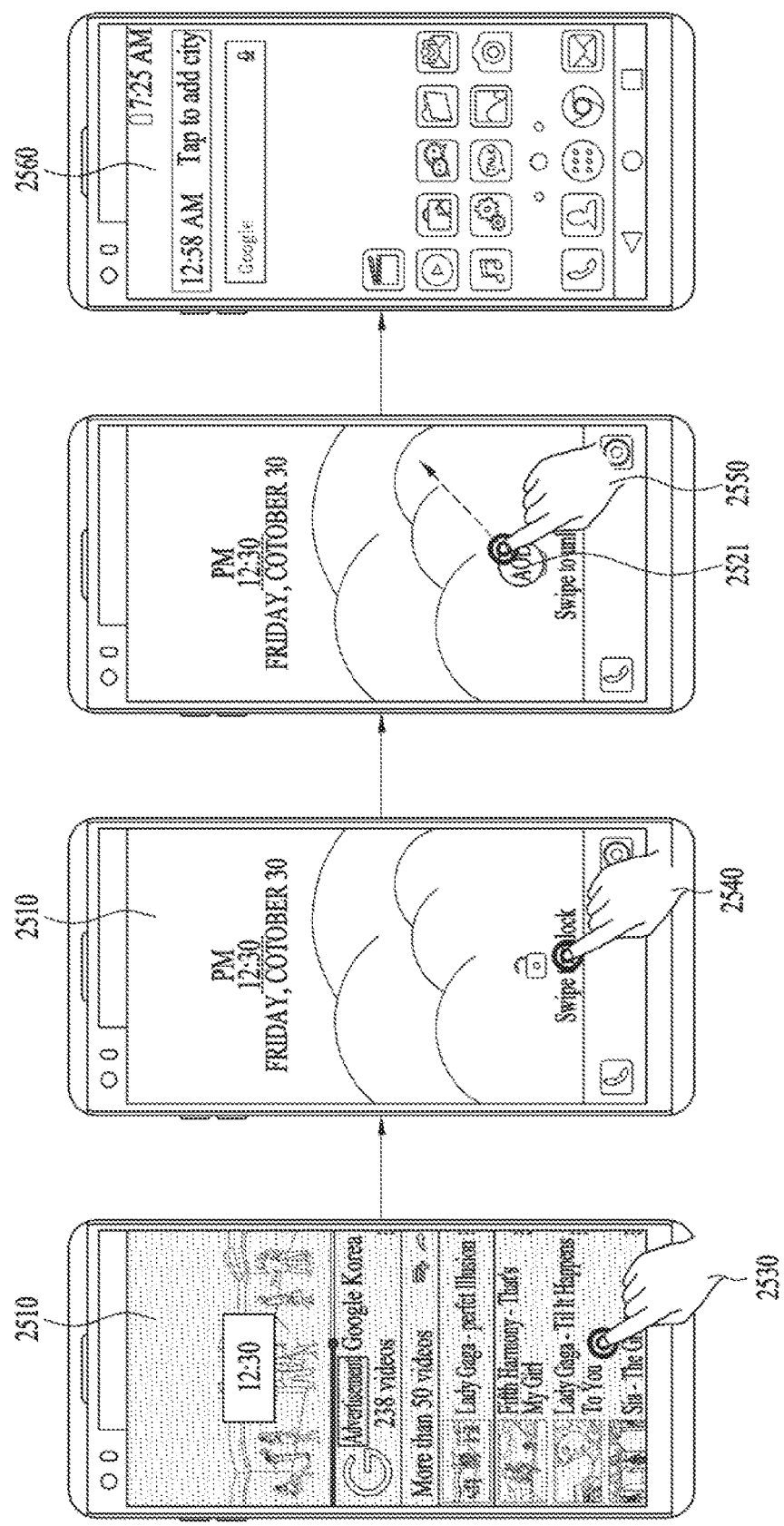
FIG. 25 is a diagram illustrating another example in which the mobile terminal terminates the AOD mode according to an embodiment of the present invention.

FIG. 25 is a diagram illustrating another example in which the mobile terminal terminates the AOD mode according to an embodiment of the present invention. To avoid redundant description, the features already mentioned in FIGS. 4 to 24 are omitted in the embodiment of FIG. 25.

Referring to the first drawing of FIG. 25, the mobile terminal can execute an application 2510 on the display unit in the AOD mode. While executing the application 2510 in the AOD mode, the mobile terminal can sense a first input signal 2530 for entering a lock screen 2520.

In this case, the first input signal 2530 may be a predetermined input signal. For example, the first input signal 2530 may be a signal of touching a point of the application 2510 running in the AOD mode with pressure equal to or greater than predetermined pressure.

Referring to the second drawing of FIG. 25, after sensing the first input signal 2530, the mobile terminal can display the lock screen 2520. In this case, the lock screen 2520 may be a default lock screen of the mobile terminal. That is, when the mobile terminal is locked, the mobile terminal may display the current time information, a background image of the lock screen, a simple control icon, etc. on the lock screen 2520.

In addition, the mobile terminal may execute the application 2510, which has been executed in the AOD mode, on the background of the lock screen 2520. That is, if the mobile terminal receives the command of turning off the display unit again while displaying the lock screen 2520, the mobile terminal can stop display of the lock screen 2520 and then execute the application 2510 in the AOD mode.

In an embodiment of the present invention, the mobile terminal can sense a second input signal 2540 for selecting a point of the lock screen 2520. In this case, the second input signal may be a predetermined input signal. For example, the second input signal 2540 may be a signal of touching a point of the application 2510 with pressure equal to or greater than the predetermined pressure.

Referring to the third drawing of FIG. 25, after sensing the second input signal 2540, the mobile terminal can display an AOD mode release icon 2521 on the lock screen 2520. In this case, the AOD mode release icon 2521 may be an icon for releasing the AOD mode of the application 2510 running in the background state.

In an embodiment of the present invention, the mobile terminal can sense a third input signal 2550 for selecting the AOD mode release icon 2521. In this case, the third input signal 2550 may correspond to a touch input signal of touching the AOD mode release icon 2521 and dragging the touch in a random direction.

Referring to the fourth drawing of FIG. 25, after sensing the third input signal 2550, the mobile terminal can stop display of the lock screen 2520 and then display a home screen 2560. In addition, the mobile terminal stops display of the lock screen 2520 and at the same time releases the AOD mode of the application 2510.

That is, in general, when the user touches a random point of the lock screen 2520 and drags the touch in a random direction without configuring an unlock pattern separately, the mobile terminal may stop display of the lock screen 2520 and then display the home screen 2560 without releasing the AOD mode of the application 2510.

On the other hand, when the user touches the AOD mode release icon 2521 displayed on the lock screen 2520 and then drags the touch in a random direction, the mobile terminal may release the AOD mode of the application 2510, stop display of the lock screen 2520, and display the home screen 2560 at the same time.

Further, if there are a plurality of applications running in the AOD mode (details will be described with the following embodiments), the mobile terminal may release the AOD mode of the most recently executed application.

Figure 26:
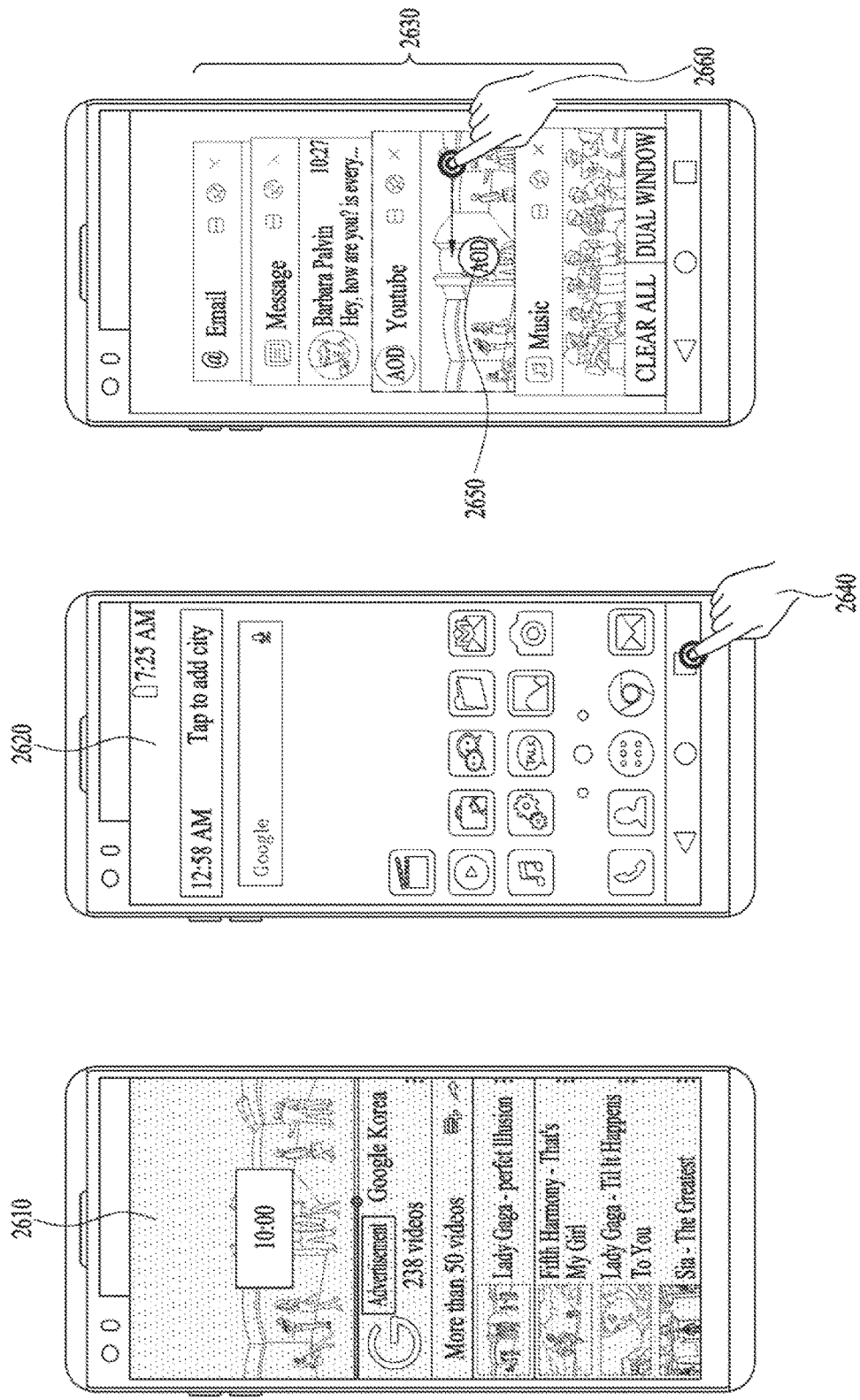
FIG. 26 is a diagram illustrating still another example in which the mobile terminal terminates the AOD mode according to an embodiment of the present invention.

FIG. 26 is a diagram illustrating still another example in which the mobile terminal terminates the AOD mode according to an embodiment of the present invention. To avoid redundant description, the features already mentioned in FIGS. 4 to 25 are omitted in the embodiment of FIG. 26.

The first drawing of FIG. 26 matches the first drawing of FIG. 24. That is, the mobile terminal can execute an application 2610 in the AOD mode.

Referring to the second drawing of FIG. 26, when sensing a signal for unlocking the mobile terminal, the mobile terminal can execute the application 2610, which is running in the AOD mode, in the background state and then display a home screen 2620 on the display unit.

In an embodiment of the present invention, the mobile terminal can sense a first input signal 2640 for displaying a multitasking application list 2630. In this case, the multitasking application list 2630 may be a list of applications running in the background state. In addition, for example, the first input signal 2640 may be an input signal of touching the recent key belonging to the soft key displayed on the bottom of the display unit of the mobile terminal.

Referring to the third drawing of FIG. 26, the mobile terminal can include the application 2610 running in the AOD mode in the multitasking application list 2630 and then display the multitasking application list 2630. That is, when the mobile terminal executes the application 2610, which is running in the AOD mode, in the background state, the mobile terminal may include the application 2610 in the multitasking application list 2630 and then display the multitasking application list 2630 similar to a normal application.

In addition, in an embodiment of the present invention, the mobile terminal can display an AOD icon 2650 on the application 2610 included in the multitasking application list 2630. In other words, the mobile terminal may display various applications running in the background state on the multitasking application list 2630. In this case, the mobile terminal may display the AOD icon 2650 on the application 2610 in order to inform that the application 2610 is running in the AOD mode.

Moreover, in an embodiment of the present invention, the mobile terminal can sense a second input signal 2660 that selects a point of the application 2610. In this case, the second input signal 2660 may be a touch input signal of touching the application 2610 and dragging, swiping, flicking the touch in a predetermined direction. For example, the user may touch the application 2610 and then flick the touch point from the right to the left.

Furthermore, in an embodiment of the present invention, after sensing the second input signal 2660, the mobile terminal can release the AOD mode of the application 2610 running in the background state and terminate the application 2610 at the same time. That is, it is possible to apply an embodiment of displaying the multitasking application list through the recent key and terminating the application running in the background state through the flick-touch to the application 2610 running in the AOD mode.

Figure 27:
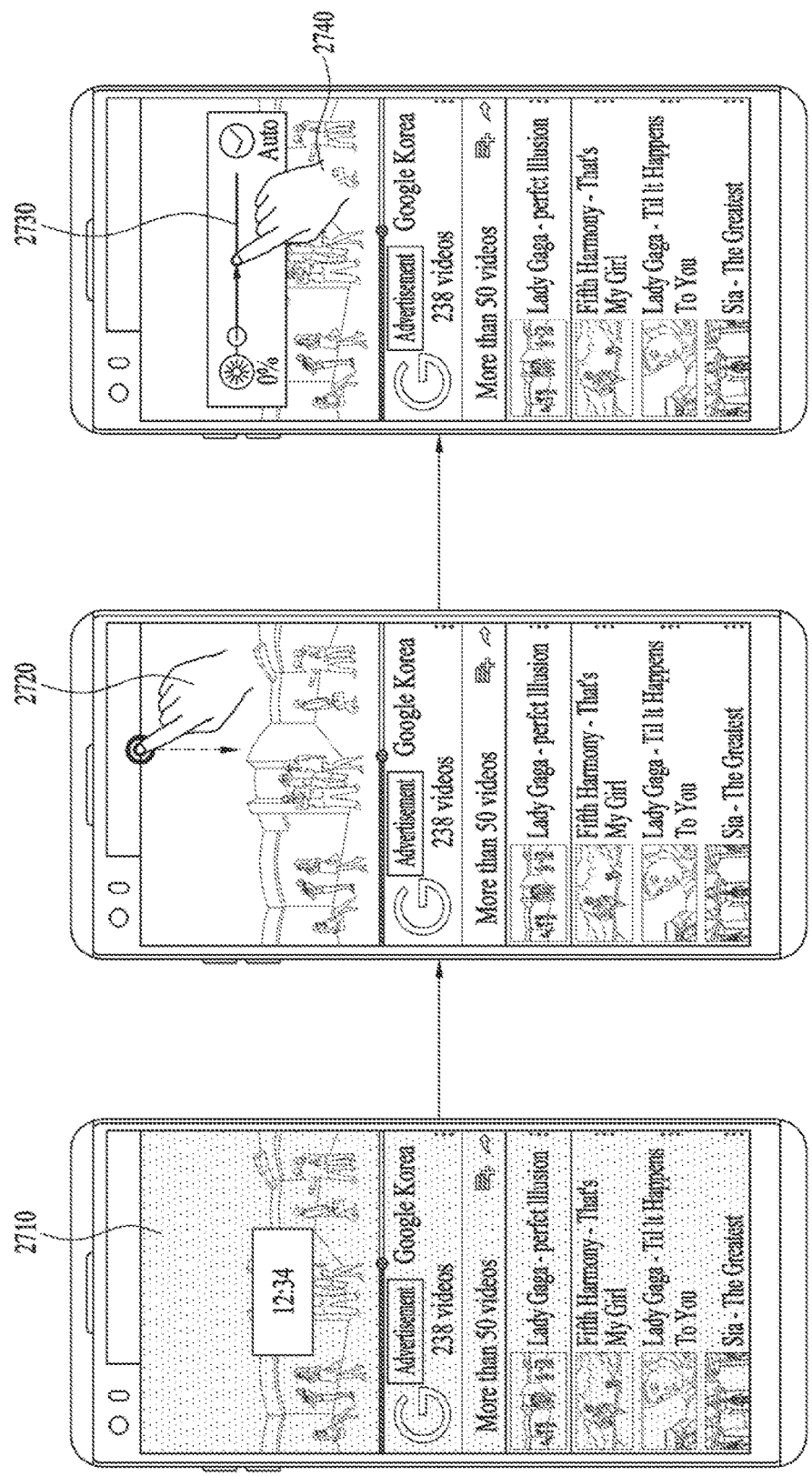
FIG. 27 is a diagram illustrating a further example in which the mobile terminal terminates the AOD mode according to an embodiment of the present invention.

FIG. 27 is a diagram illustrating a further example in which the mobile terminal terminates the AOD mode according to an embodiment of the present invention. To avoid redundant description, the features already mentioned in FIGS. 4 to 26 are omitted in the embodiment of FIG. 27.

Referring to the first drawing of FIG. 27, the mobile terminal can execute an application 2710 in the AOD mode. In addition, if the mobile terminal is unlocked by the user, the mobile terminal can execute the application 2710 that is running in the AOD mode in the background state.

Referring to the second drawing of FIG. 27, the mobile terminal can also run an application 2710. In this case, the running application 2710 may be different from the application 2710 running in the AOD mode. That is, the user may allow the application 2710 running in the AOD mode to be executed in the background state and then execute the application 2710 in the normal mode again.

In an embodiment of the present invention, while running the application 2710, the mobile terminal can sense a first input signal 2720. In this case, the first input signal 2720 may be an input signal of touching a status bar placed at the top of the display unit with predetermined pressure and dragging the touch to a predetermined point.

Referring to the third drawing of FIG. 27, after sensing the first input signal 2720, the mobile terminal can output a pop-up window 2730 for adjusting brightness of the display unit. In this case, the pop-up window 2730 for adjusting the brightness may include a brightness adjustment icon and a brightness adjustment bar.

In an embodiment of the present invention, after sensing a second input signal 2740 that maximize the brightness of the display unit through the pop-up window 2730, the mobile terminal can terminate the AOD mode of the application 2710.

That is, considering that the application 2710 executed in the AOD mode is in the dimming state, the user may intuitively know that if the user maximizes the brightness of the application 2710, the AOD will be released. When sensing the input signal for maximizing the brightness of the application 2710, the mobile terminal may release the AOD mode of the application 2710.

Although not shown in the drawing, the brightness adjustment icon and the brightness adjustment bar may be respectively changed to the AOD mode activation icon and the AOD mode adjustment bar similar to the embodiments of FIGS. 18 and 19. However, the present embodiment is different from the embodiments of FIGS. 18 and 19 in that the ADO mode of the application 2710 is terminated.

Figure 28:
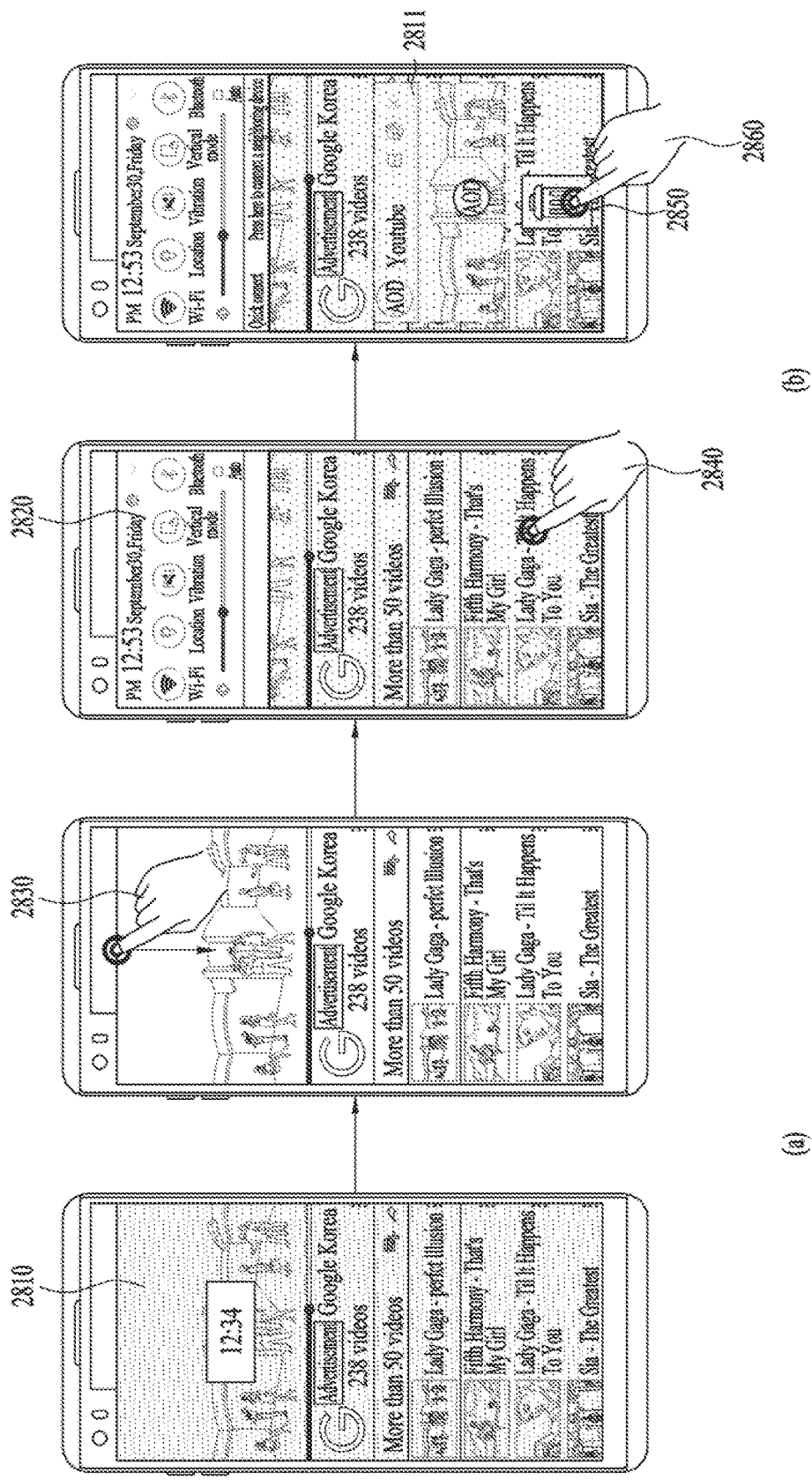
FIG. 28 is a diagram illustrating a still further example in which the mobile terminal terminates the AOD mode according to an embodiment of the present invention.

FIG. 28 is a diagram illustrating a still further example in which the mobile terminal terminates the AOD mode according to an embodiment of the present invention. To avoid redundant description, the features already mentioned in FIGS. 4 to 27 are omitted in the embodiment of FIG. 28.

FIG. 28 is a diagram showing an embodiment of terminating the executed AOD mode based on the embodiment of FIG. 20.

Referring to the first and second drawings, the mobile terminal can execute an application 2810 in the AOD mode and sense a first input signal 2830 for displaying a control window 2820. In this case, the control window 2820 may be displayed on a predetermined area. That is, the control window may be displayed on the application 2810 in an overlaid manner.

Referring to the third drawing of FIG. 28, while displaying the control window 2820, the mobile terminal can sense a second input signal 2840 of touching the application displayed below the control window 2820 in a predetermined manner. While displaying the control window 2820, the mobile terminal may display the application 2810 in the dimming state. In addition, the second input signal 2840 may be a touch input signal satisfying at least one of the following conditions: a touch input signal is touched during a predetermined time; a touch input signal is touched over a predetermined area; and a touch input signal is touched with predetermined pressure.

Referring to the fourth drawing of FIG. 28, after sensing the second input signal 2840, the mobile terminal can display an icon of the application running in the AOD mode on the application 2810 displayed in the dimming state. As shown in FIG. 28, since the application 2810 is running in the AOD mode, the mobile terminal can display an icon 2811 corresponding to the application 2810. In addition, if there are a plurality of applications running in the AOD mode, the mobile terminal may display a plurality of application icons on the application 2810, which is displayed in the dimming state based on the second input signal 2840.

In an embodiment of the present invention, after the displayed application icon 2811 is selected, the mobile terminal can terminate the AOD mode of the application based on a third input signal 2860 that selects a delete icon 2850.

In detail, the mobile terminal may display the icon 2811 corresponding to the application 2810 running in the AOD mode. When the user touches the delete icon 2850 after touching the icon 2811 corresponding to the application 2810, the mobile terminal may terminate the AOD mode of the application 2810.

Figure 29:
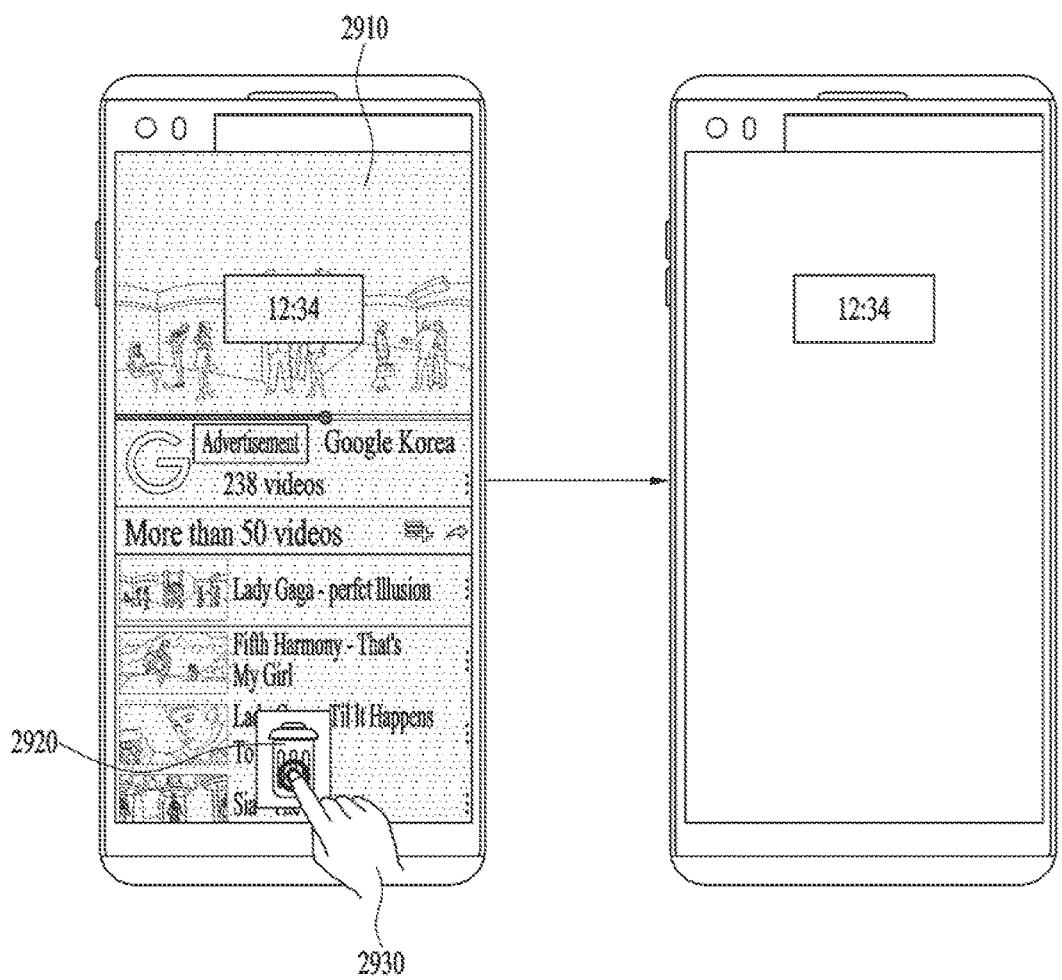
FIG. 29 is a diagram illustrating a still further example in which the mobile terminal terminates the AOD mode according to an embodiment of the present invention.

FIG. 29 is a diagram illustrating a still further example in which the mobile terminal terminates the AOD mode according to an embodiment of the present invention. To avoid redundant description, the features already mentioned in FIGS. 4 to 28 are omitted in the embodiment of FIG. 29.

Referring to the first drawing of FIG. 29, the mobile terminal can execute an application 2910 in the AOD mode. In an embodiment of the present invention, the mobile terminal can display a delete icon 2920 on the application 2910 executed in the AOD mode.

After sensing an input signal 2930 for selecting the delete icon 2920, the mobile terminal can terminate the AOD mode of the application 2910.

Referring the second drawing of FIG. 29, the mobile terminal can terminate the AOD mode of the application 2910 based on the input signal 2930 and then execute a general AOD mode. That is, when the user sets the AOD mode to display only the current time information, the mobile terminal may display only the current time information on a predetermined area after terminating the AOD mode of the application 2910 based on the input signal 2930.

Although FIG. 29 illustrates an embodiment of terminating the AOD mode of a single application, which is running in the AOD mode, a case in which there are a plurality of applications executed in the AOD mode will be described in detail with reference to FIG. 33.

FIG. 30 is a diagram illustrating examples of applications that can be executed in the mobile terminal operating in the AOD mode according to an embodiment of the present invention. To avoid redundant description, the features already mentioned in FIGS. 4 to 29 are omitted in the embodiment of FIG. 30.

FIG. 30 (a) to (c) are diagrams illustrating an embodiment in which the mobile terminal executes specific applications in the AOD mode using the GPS sensor and the illumination sensor, which are further included in the mobile terminal. Specifically, FIG. 30 (a) shows an exercise application, FIG. 30 (b) shows a map application, and FIG. 30 (c) shows an e-book application.

Referring to FIG. 30 (a), the mobile terminal can launch the exercise application in the AOD mode. In this case, the exercise application may change a displayed content according to movement of the user. For example, if a running application is executed, distance and time information may be updated based on user's running distance and time.

If the exercise application running in the AOD mode updates the displayed information whenever the user moves, the mobile terminal may consume a large amount of battery power. Thus, while running the exercise application in the AOD mode, the mobile terminal can update the content displayed on the exercise application only when sensing a predetermined gesture.

For example, while executing the running application in the AOD mode, the mobile terminal can update the user's running distance and time only when sensing a specific user's gesture such as a gesture of lifting the mobile terminal with the hand or a gesture of looking at the display unit of the mobile terminal. In other words, while running the exercise application in the AOD mode, the mobile terminal can update the content displayed on the exercise application only when the user desires to check the current state.

Referring to FIG. 30 (b), the mobile terminal can launch the map application in the AOD mode. In this case, the map application may change a displayed content based on a GPS signal. For example, if a navigation application is executed, a displayed map may be changed according to movement of a vehicle.

If the map application running in the AOD mode updates the displayed information whenever a GPS signal is received, the mobile terminal may consume a large amount of battery power. Thus, while running the map application in the AOD mode, the mobile terminal can update the content displayed on the map application only when sensing a predetermined GPS signal.

For example, while executing the navigation application in the AOD mode, the mobile terminal can update the map displayed on the navigation application only when sensing a specific GPS signal such as a GPS signal indicating direction change or a GPS signal indicating detection of a traffic light. In other words, only when the mobile terminal detects information that needs to be informed the user, the mobile terminal can update the navigation information.

Referring to FIG. 30 (c), the mobile terminal can launch the e-book application in the AOD mode. When the e-book application is executed in the AOD mode, the mobile terminal may measure brightness within a predetermined range.

In an embodiment of the present invention, the mobile terminal can automatically adjust brightness of the e-book application based on the brightness in the predetermined range. For example, if the brightness in the predetermined range is equal to or lower than a predetermined illumination level, the mobile terminal may increase the brightness of the display unit. On the contrary, if the brightness in the predetermined range is equal to or higher than the predetermined illumination level, the mobile terminal may decrease the brightness of the display unit.

In another embodiment of the present invention, while running the e-book application in the AOD mode, the mobile terminal can update a text displayed on the e-book application after elapse of a predetermined time or according to a notification. For example, if the user sets the e-book application to update a text every 30 seconds in the AOD mode, the mobile terminal can update the text displayed on the e-book application every 30 seconds.

FIG. 31 is a diagram illustrating an example in which the mobile terminal executes multi-AOD mode according to an embodiment of the present invention. To avoid redundant description, the features already mentioned in FIGS. 4 to 30 are omitted in the embodiment of FIG. 31.

Applications running in the mobile terminal will be described with reference to FIG. 31 (*a*). In an embodiment of the present invention, the mobile terminal can launch a first application 3111, a second application 3112, and a third application 3113. In detail, the first application 311 may be an application currently displayed on the display unit, the second application may be an application that is most recently changed to the background state, and the third application 3113 may be an on-going application. Here, the on-going application may mean an application that is not currently displayed on the display unit but running in the background state.

Hereinafter, order of displaying the above-mentioned applications in the AOD mode after switching them to the AOD mode will be described with reference to FIG. 31 (*b*).

Referring to the first daring of FIG. 31 (*b*), the mobile terminal can execute the AOD mode based on a command of turning off the display unit. After executing the AOD mode, the mobile terminal may display a predetermined application or a widget corresponding to the predetermined application on a predetermined area.

In an embodiment of the present invention, the mobile terminal can display a first application widget 3121 corresponding to the first application 3111 on the predetermined area. In this case, the mobile terminal can sense a first input signal 3130 for the first application widget 3121. In detail, the first input signal 3130 may correspond to an input signal of touching a point of the first application widget 3121 and dragging, swiping, or flicking the touch in a predetermined direction (e.g., from the left to the right or from the right to the left). For example, while a calendar application is displayed in the AOD mode, the user may touch a point of the calendar application and then flick the touch to the right.

Referring to the second drawing of FIG. 31 (*b*), after sensing the first input signal 3130, the mobile terminal can display a second application widget 3122 corresponding to the second application 3112 in the AOD mode on the predetermined area. In other words, while launching a plurality of applications, the mobile terminal can execute the AOD mode and also display an application running in the AOD mode on the predetermined area.

Similarly, the mobile terminal can sense a second input signal 3140 for the second application widget 3122. For example, while a memo application is displayed in the AOD mode, the user may touch a point of the memo application and then flick the touch to the right.

Referring to third drawing of FIG. 31 (*b*), after sensing the second input signal 3140, the mobile terminal can display a third application widget 3123 corresponding to the third application 3113 in the AOD mode on the predetermined area.

That is, the mobile terminal can determine the order of displaying the first to third applications 3111 to 3113 in the AOD mode depending on states of the first to third applications 3111 to 3113. As described above, the mobile terminal may first display the application, which is most recently displayed on the display unit before the AOD mode is executed, in the AOD mode. Next, the mobile terminal may display the application, which is most recently changed to the background state, in the AOD mode. Finally, the mobile terminal may display the on-going application in the AOD mode.

Figure 32:
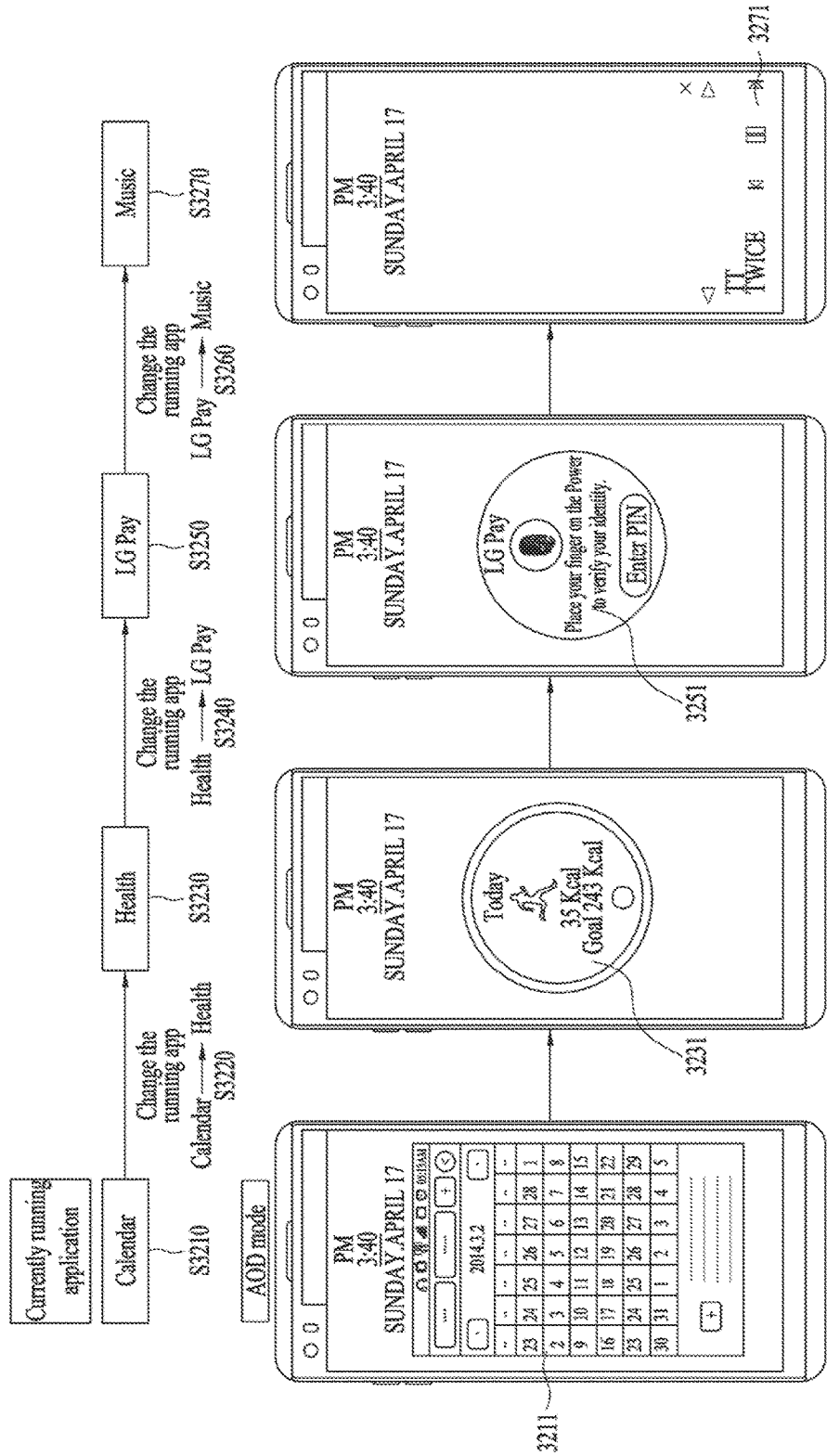
FIG. 32 is a diagram illustrating another example in which the mobile terminal executes the multi-AOD mode according to an embodiment of the present invention.

FIG. 32 is a diagram illustrating another example in which the mobile terminal executes the multi-AOD mode according to an embodiment of the present invention. To avoid redundant description, the features already mentioned in FIGS. 4 to 31 are omitted in the embodiment of FIG. 32.

FIG. 32 shows an embodiment in which the mobile terminal changes an application widget displayed in the AOD mode after an application running in a foreground state is changed. In this case, the foreground state may mean a state in which an application is displayed on the display unit of the mobile terminal and also running at the same time. In detail, the mobile terminal may launch at least one application in the background state except an application currently displayed on the display unit. In other words, the mobile terminal may display the application currently used by the user on the display unit except the at least one application running in the background state. In this case, the application currently displayed on the display unit means the application running in the foreground state.

In step S3210, the mobile terminal can launch a calendar application and then display it on the display unit. In an embodiment of the present invention, when the mobile terminal executes the AOD mode while displaying the calendar application on the display unit, the mobile terminal can display a calendar widget 3211 corresponding to the calendar application on the display unit using the AOD mode.

In step S3220, the mobile terminal can switch the current application from the calendar application to a health application. That is, the mobile terminal may display the health application on the display unit. In detail, the mobile terminal may terminate the running calendar application and then launch the health application. Alternatively, the mobile terminal can change the running calendar application in the background state and then launch the health application.

In step S3230, when the mobile terminal executes the AOD mode while displaying the health application on the display unit, the mobile terminal can display a health widget 3231 corresponding to the health application on the display unit using the AOD mode.

In step S3240, the mobile terminal can switch the current application from the health application to an LG pay application. That is, the mobile terminal may display the LG pay application on the display unit.

In step S3250, when the mobile terminal executes the AOD mode while displaying the LG pay application on the display unit, the mobile terminal can display an LG pay widget 3251 corresponding to the LG pay application on the display unit using the AOD mode.

In step S3260, the mobile terminal can switch the current application from the LG pay application to a music application. That is, the mobile terminal may display the music application on the display unit.

In step S3270, when the mobile terminal executes the AOD mode while displaying the music application on the display unit, the mobile terminal can display a music widget 3271 corresponding to the music application on the display unit using the AOD mode.

In other words, the mobile terminal may determine an application widget to be displayed in the AOD mode based on an application displayed before executing the AOD mode.

Figure 33:
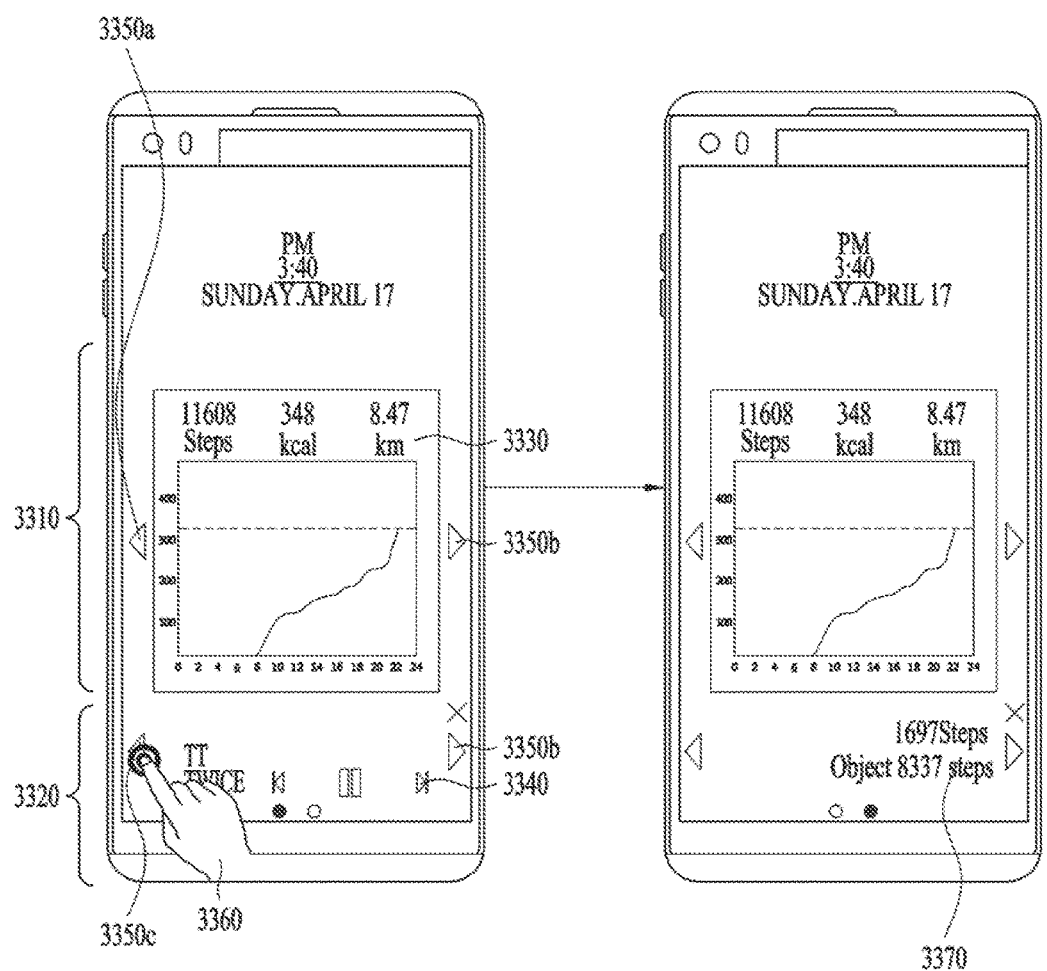
FIG. 33 is a diagram illustrating still another example in which the mobile terminal executes the multi-AOD mode according to an embodiment of the present invention.

FIG. 33 is a diagram illustrating still another example in which the mobile terminal executes the multi-AOD mode according to an embodiment of the present invention. To avoid redundant description, the features already mentioned in FIGS. 4 to 32 are omitted in the embodiment of FIG. 33.

Unlike FIG. 31, FIG. 33 shows an embodiment of displaying a plurality of applications running in the AOD mode on a first area 3310 and a second area 3320.

Referring to the first drawing of FIG. 33, when receiving a command of turning off the display unit, the mobile terminal can display a first application 3330 executed in the AOD mode on the first area 3310 and also display a second application inn 3340 executed in the AOD mode on the second area 3320. That is, the mobile terminal may launch an application in the first area 3310 or the second area 3320 using the AOD mode based on the feature of the application.

In detail, since the first application 3330 has a large amount of contents to be displayed in the AOD mode, the first application 3330 may be displayed on the first area 3310 greater than the second area 3320. In addition, since the second application 3340 has a small amount of contents to be displayed in the AOD mode, the second application 3340 may be displayed on the second area 3330 smaller than the first area 3310.

In an embodiment of the present invention, the mobile terminal can display icons 3350a, 3350b, 3350c, and 3350d for switching the application displayed on the first area 3310 or the second area 3320. Unlike the embodiment of FIG. 31, the mobile terminal can switch the application displayed on the first area 3310 or the second area 3320 based on an input signal for selecting one of the icons 3350a, 3350b, 3350c, and 3350d.

In detail, the mobile terminal can sense an input signal 3360 for selecting the icon 3350c displayed on the second area 3320. In this case, the input signal 3360 may be an input signal of touching the icon 3350c with pressure equal to or greater than predetermined pressure.

Referring to the second drawing of FIG. 33, after sensing the input signal 3360, the mobile terminal can switch the second application 3340 displayed on the second area 3320 to a third application 3370 running in the AOD mode.

Although not shown in the drawing, it is apparent that when sensing an input signal for selecting one of the icons 3350a and 3350b displayed on the first area 3310, the mobile terminal can switch the first application 3330 displayed in the first area 3310 to another application running in the AOD mode.

Figure 34:
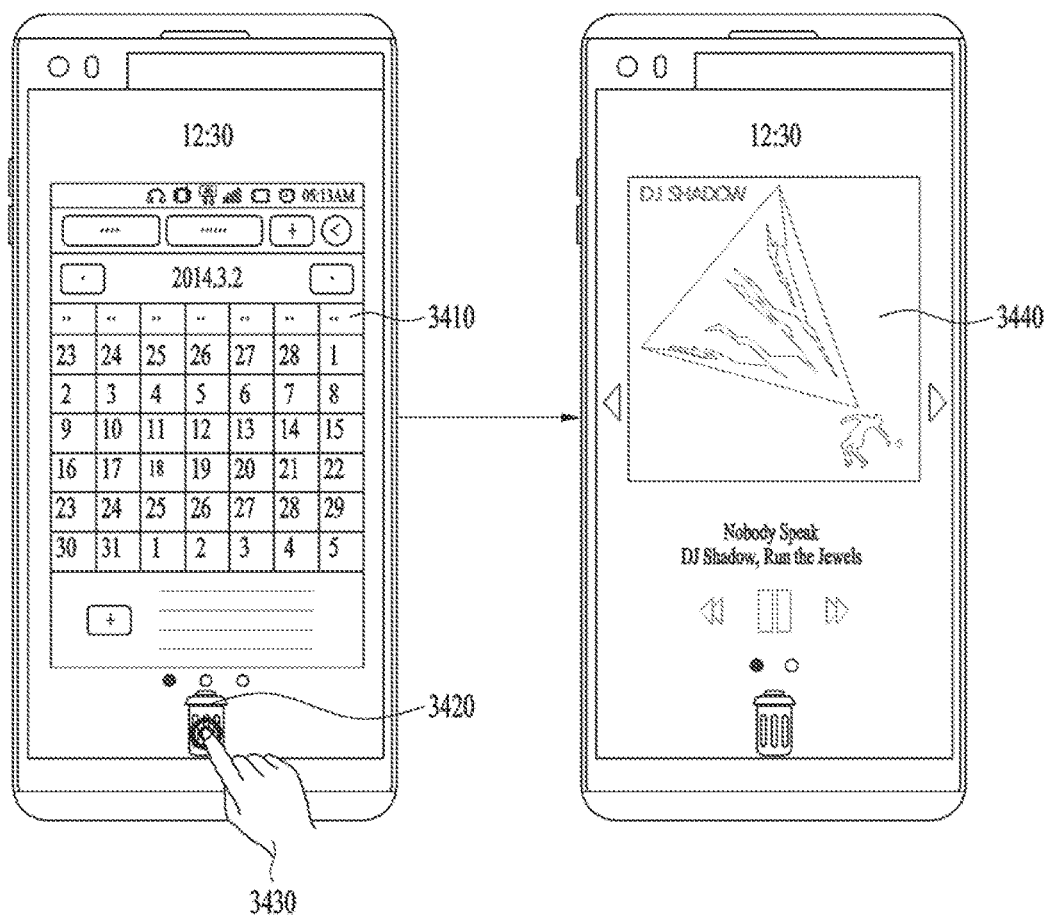
FIG. 34 is a diagram illustrating an example in which the mobile terminal terminates the AOD mode while executing the multi-AOD mode according to an embodiment of the present invention.

FIG. 34 is a diagram illustrating an example in which the mobile terminal terminates the AOD mode while executing the multi-AOD mode according to an embodiment of the present invention. To avoid redundant description, the features already mentioned in FIGS. 4 to 33 are omitted in the embodiment of FIG. 34.

Referring to the first drawing of FIG. 34, when receiving a command of turning off the display unit, the mobile terminal can display a first application 3410 on a predetermined area. In this case, it is assumed that the mobile terminal launches a plurality of applications in the AOD mode. For example, the mobile terminal may launch the first application 3410, a second application 3440, and a third application (now shown in the drawing) in the AOD mode.

In an embodiment of the present invention, the mobile terminal can display a delete icon 3420 on the bottom of the first application 3410 executed in the AOD mode. After sensing an input signal 3430 for selecting the delete icon 3420, the mobile terminal can terminate the AOD mode of the first application 3410.

Referring to the second drawing of FIG. 34, since there are plurality of applications executed in the AOD mode, the mobile terminal can display one of the remaining applications on the predetermined area although the mobile terminal terminates the AOD mode of the first application 3410 based on the input signal 3430.

That is, after sensing the input signal 3430, the mobile terminal can terminate the AOD mode of the first application 3410 and then display the second application 3440 running in the AOD mode on the predetermined area.

Figure 35:
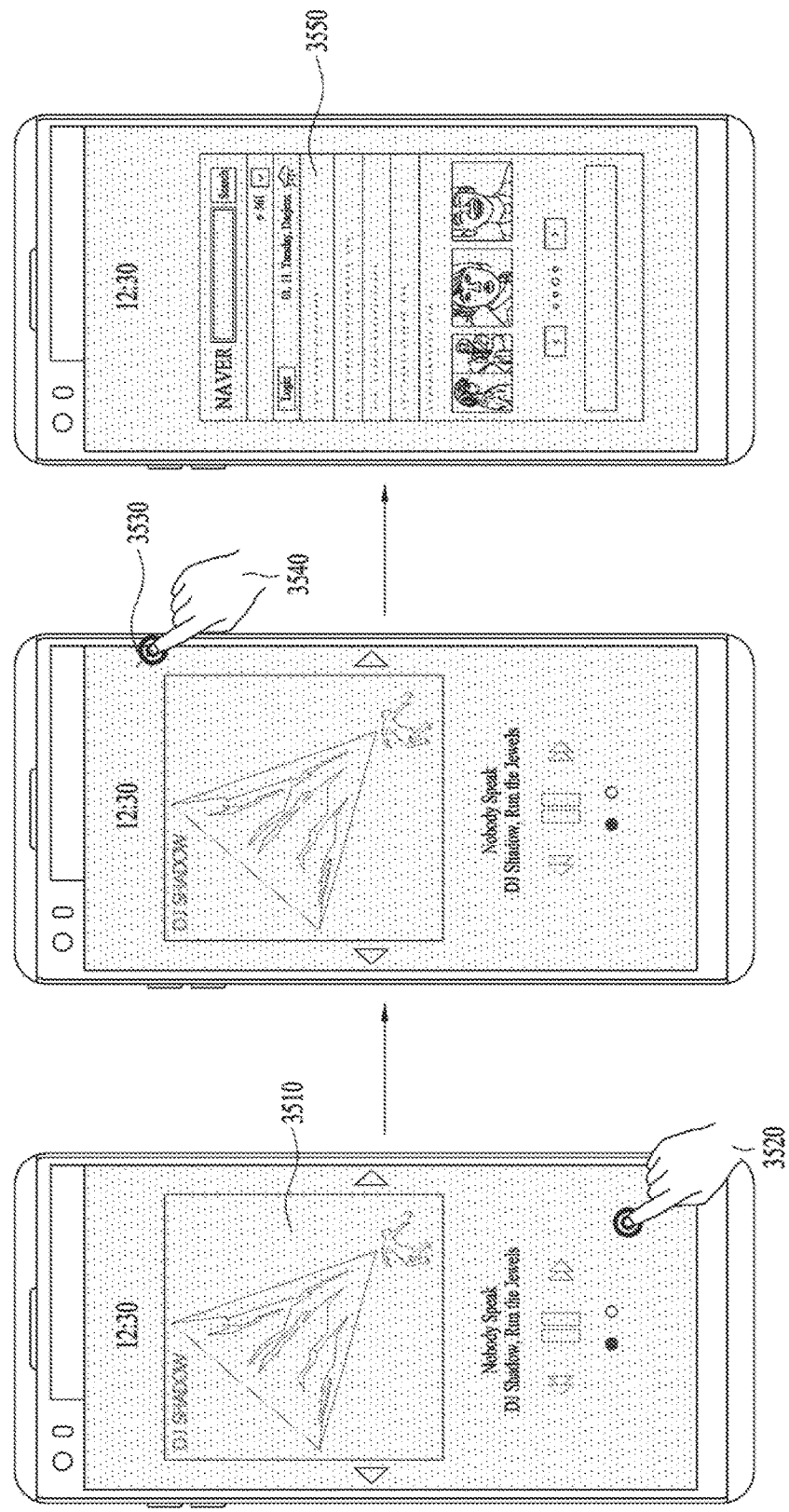
FIG. 35 is a diagram illustrating another example in which the mobile terminal terminates the AOD mode while executing the multi-AOD mode according to an embodiment of the present invention.

FIG. 35 is a diagram illustrating another example in which the mobile terminal terminates the AOD mode while executing the multi-AOD mode according to an embodiment of the present invention. To avoid redundant description, the features already mentioned in FIGS. 4 to 34 are omitted in the embodiment of FIG. 35.

Unlike FIG. 34, FIG. 35 shows an embodiment in which the mobile terminal displays a delete icon based on a predetermined input signal rather than displaying the delete icon as default. In addition, it is assumed in FIG. 35 that the mobile terminal launches a plurality of applications in the AOD mode.

Referring to the first drawing of FIG. 35, when the display unit is turned off, the mobile terminal can display a first application 3510 running in the AOD mode on a predetermined area.

In an embodiment of the present invention, the mobile terminal can sense a first input signal 3520 of touching a point of the display unit with pressure equal to or greater than predetermined pressure. In this case, the first input signal 3520 may be an input signal of touching a point in an area which is not used for displaying the first application 3510.

Referring to the second drawing of FIG. 35, after sensing the first input signal 3520, the mobile terminal can display an icon 3530 for terminating the first application 3510 running in the AOD mode.

In an embodiment of the present invention, the mobile terminal can sense a second input signal 3540 for selecting the icon 3530. After sensing the second input signal 3540, the mobile terminal can terminate the first application 3510 running in the AOD mode.

Referring to the third drawing of FIG. 35, after sensing the second input signal 3540, the mobile terminal can terminate the first application 3510 running in the AOD mode and then display a second application 3550 running in the AOD mode.

Figure 36:
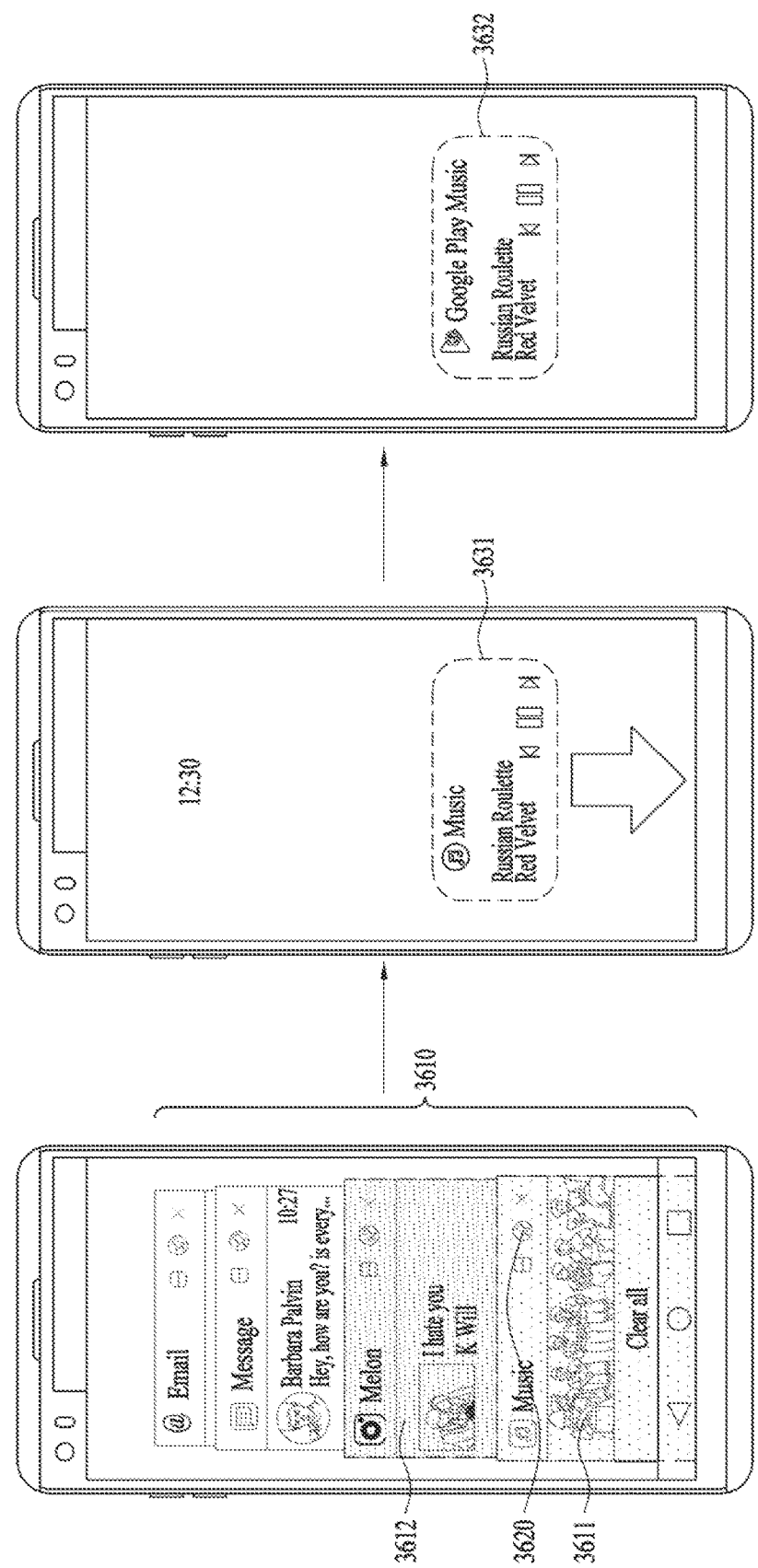
FIG. 36 is a diagram illustrating an example in which the mobile terminal displays a controller corresponding to an application in the AOD mode according to an embodiment of the present invention.

FIG. 36 is a diagram illustrating an example in which the mobile terminal displays a controller corresponding to an application in the AOD mode according to an embodiment of the present invention. To avoid redundant description, the features already mentioned in FIGS. 4 to 35 are omitted in the embodiment of FIG. 36.

The first drawing of FIG. 36 matches the third drawing of FIG. 26. That is, the mobile terminal can display a multitasking application list 3610 on the display unit.

In an embodiment of the present invention, the multitasking application list 3610 may include a multitasking window corresponding to a first application 3611 and a second application 3612, each of which is running in the background state. In this case, the mobile terminal can display an AOD icon 3620 on the multitasking window.

The AOD icon 3620 may be an icon for controlling the mobile terminal to launch an application, which is running in the background state, using the AOD mode when the mobile terminal executes the AOD mode.

For example, when the user selects the AOD icon 3620 displayed on the multitasking window corresponding to the first application 3611, the mobile terminal may execute the AOD mode and also execute the first application 3611 or a first controller 3631 corresponding to the first application 3611 using the AOD mode. Moreover, when the user selects the AOD icon 3620, the mobile terminal may display the AOD icon 3620 in a different way (not shown in the drawing).

Referring to the second drawing of FIG. 36, while running the first application 3611 and the second application 3612 in the background state, the mobile terminal can execute the AOD mode.

In an embodiment of the present invention, after executing the AOD mode, the mobile terminal can also execute the first application 3611 or the second application 3612 in the AOD mode. According to another embodiment of the present invention, after executing the AOD mode, the mobile terminal may display a first controller 3631 corresponding to the first application 3611 or a second controller 3632 corresponding to the second application 3612 in the AOD mode.

In detail, after executing the AOD mode, the mobile terminal may display the first controller 3631 corresponding to the first application 3611. In this case, the first application 3611 may correspond to the application where the AOD icon 3620 is selected as described above.

In an embodiment of the present invention, the mobile terminal may sense an input signal (not shown in the drawing) for selecting the first controller 3631 running in the AOD mode. In this case, the input signal may be an input signal of touching the first controller 3631 with predetermined pressure and dragging the touch in a predetermined direction. For example, the user may touch the first controller 3631 with a certain amount of pressure and then swipe the touch in the bottom direction.

Referring to the third drawing of FIG. 36, after sensing the input signal, the mobile terminal may display the second controller 3632 corresponding to the second application 3612. In this case, the second application 3612 may correspond to the application where the AOD icon 3620 is selected, similar to the application 3611.

In addition, in an embodiment of the present invention, the first application 3611 and the second application 3612 may belong to the same application group. In this case, the same application group may mean an application group consisting of the same type of applications. For example, there may be various application groups such as a music application group, a game application group, an SNS application group, a web browser application, a calendar application group, etc.

Moreover, the first controller 3631 and the second controller 3632 may have the same interface.

In detail, if the first application 3611 is a first music application 3611, the first controller 3631 may include icons for controlling the first music application 3611. For example, the first controller 3631 may include a playback icon, a next music playback icon, and a previous music playback icon.

In an embodiment of the present invention, if the second application 3612 is a second music application 3612, which belongs to the same application group as the first application 3611, the second controller 3631 may include the same playback icon, next music playback icon, and previous music playback icon as those included in the first controller 3631.

That is, when the first application 3611 and the second application 3612 belong to the same application group, the mobile terminal may allow the first controller 3631 and the second controller 3632 to have the same interface.

Figure 37:
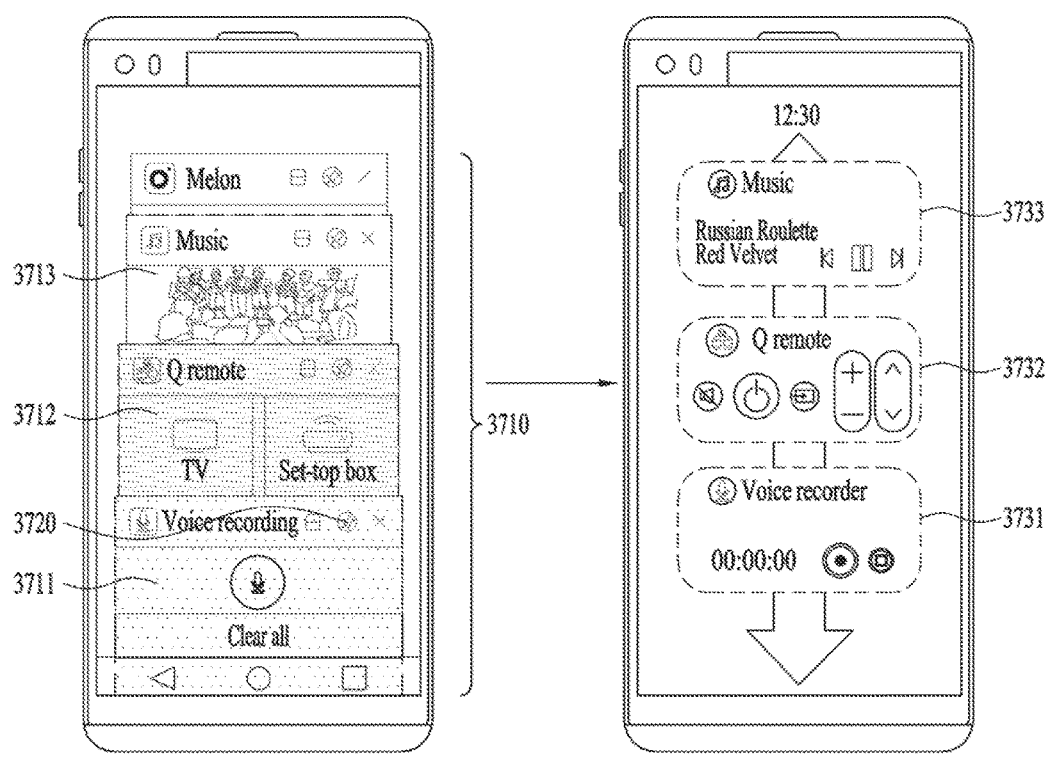
FIG. 37 is a diagram illustrating another example in which the mobile terminal displays a controller corresponding to an application in the AOD mode according to an embodiment of the present invention.

FIG. 37 is a diagram illustrating another example in which the mobile terminal displays a controller corresponding to an application in the AOD mode according to an embodiment of the present invention. To avoid redundant description, the features already mentioned in FIGS. 4 to 36 are omitted in the embodiment of FIG. 37.

The first drawing of FIG. 37 matches the third drawing of FIG. 26. That is, the mobile terminal can display a multitasking application list 3710 on the display unit.

In an embodiment of the present invention, the multitasking application list 3710 may include a multitasking window corresponding to a first application 3711, a second application 3712, and a third application 3713, each of which is running in the background state. In this case, the mobile terminal can display an AOD icon 3720 on the multitasking window.

Referring to the second drawing of FIG. 37, while running the first application 3711, the second application 3712, and the third application 3713 in the background state, the mobile terminal can execute the AOD mode.

In an embodiment of the present invention, after executing the AOD mode, the mobile terminal can also execute the first application 3711, the second application 3712, or the third application 3713 in the AOD mode. According to another embodiment of the present invention, after executing the AOD mode, the mobile terminal may display a first controller 3731 corresponding to the first application 3711, a second controller 3732 corresponding to the second application 3712, or a third controller 3733 corresponding to the third application 3713 in the AOD mode.

In detail, after executing the AOD mode, the mobile terminal may display the first controller 3731 corresponding to the first application 3711. In this case, the first application 3711 may correspond to the application where the AOD icon 3720 is selected as described above.

In an embodiment of the present invention, the mobile terminal may sense an input signal (not shown in the drawing) for selecting the first controller 3731 running in the AOD mode. In this case, the input signal may be an input signal of touching the first controller 3731 with predetermined pressure and dragging the touch in a predetermined direction. For example, the user may touch the first controller 3731 with a certain amount of pressure and then swipe the touch in the bottom direction.

In addition, in an embodiment of the present invention, after sensing the input signal, the mobile terminal may display the second controller 3732 corresponding to the second application 3712. In this case, the second application 3712 may correspond to the application where the AOD icon 3720 is selected, similar to the application 3711.

Moreover, in an embodiment of the present invention, the first application 3711 and the second application 3712 may belong to different application groups. In this case, different application groups may mean application groups having a different type of applications. For example, if the first application 3711 is a recording application, the second application 3712 may be a remote application.

In this case, the first controller 3731 and the second controller 3732 may have different interfaces.

In detail, if the first application 3711 is a recording application 3711, the first controller 3731 may include icons for controlling the recording application 3711. For example, the first controller 3731 may include a recording start icon, a recording stop icon, and a recording time indicator.

In an embodiment of the present invention, if the second application 3712 is a remote application 3712, which belongs to a different group than the first application 3711, the second controller 3731 may include a power icon, a muting icon, an external input icon, volume adjustment icon, and a channel switch icon different from those of the first controller 3731.

That is, when the first application 3711 and the second application 3712 belong to different application groups, the mobile terminal may allow the first controller 3731 and the second controller 3732 to have different interfaces.

Although the present embodiment is described as examples of the first application 3711 and the second application 3712, the embodiment can be applied to when either the first application 3711 or the second application 3712 and the third application 3713 belong to different application groups.

In an embodiment of the present invention, while displaying the first controller 3731 or the second controller 3732, the mobile terminal may display the third controller 3733 corresponding to the third application 3713 based on an input signal for selecting the third controller 3733. In this case, the third controller 3733 may have an interface different from that of the first controller 3731 or the second controller 3732.

Figure 38:
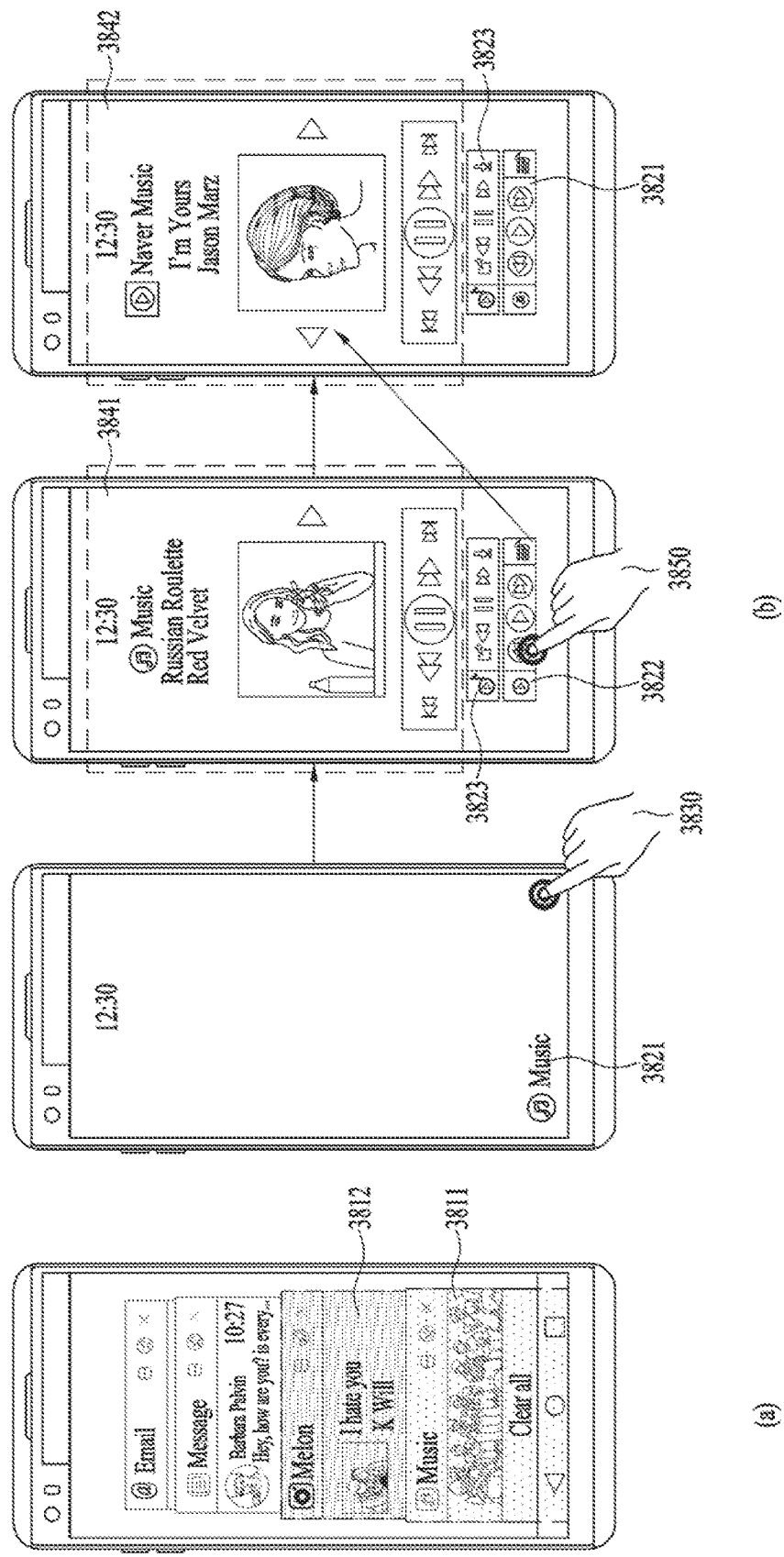
FIG. 38 is a diagram illustrating an example in which the mobile terminal controls a controller corresponding to an application according to an embodiment of the present invention.

FIG. 38 is a diagram illustrating an example in which the mobile terminal controls a controller corresponding to an application according to an embodiment of the present invention. To avoid redundant description, the features already mentioned in FIGS. 4 to 37 are omitted in the embodiment of FIG. 38.

FIG. 38 (a) matches the first drawing of FIG. 36. That is, the mobile terminal can run a first application 3811, a second application 3812, and a third application (not shown in the drawing), which belong to the same group, in the background state. Hereinafter, it is assumed that each of the first application 3811, the second application 3812, and the third application is a music application.

Referring to the first drawing of FIG. 38 (b), after executing the AOD mode, the mobile terminal can display a first controller 3821 corresponding to the first application 3811 in the AOD mode. In this case, the first controller 3821 may include an icon for controlling the most basic function of the first application 3811. For example, the first controller 3821 may include a playback icon only.

In an embodiment of the present invention, the mobile terminal can sense a first input signal 3830 for selecting the playback icon. In this case, the first input signal 3830 may be an input signal of touching the playback icon with predetermined pressure.

Referring to the second drawing of FIG. 38 (b), after sensing the first input signal 3830, the mobile terminal can display a first widget 3841 corresponding to the first application 3811 on a first area. In addition, after sensing the first input signal 3830, the mobile terminal may play music predetermined by the first application 3811.

In an embodiment of the present invention, after sensing the first input signal 3830, the mobile terminal can display not only the first widget 3841 on the first area but also a second controller 3822 and a third controller 3823 on a second area. In this case, the second controller 3822 may be a controller for controlling the second application 3812 and the third controller 3823 may be a controller for controlling the third application.

In addition, in an embodiment of the present invention, the mobile terminal can sense a second input signal 3850 for selecting an icon included in the second controller 3822. In this case, the second input signal 3850 may be an input signal of touching a previous music playback icon included in the second controller 3822 with predetermined pressure.

Referring to the third drawing of FIG. 38 (b), after sensing the second input signal 3850, the mobile terminal can display a second widget 3842 corresponding to the second application 3812 on the first area. In addition, after sensing the second input signal 3850, the mobile terminal may play music predetermined by the second application 3812.

In an embodiment of the present invention, after sensing the second input signal 3850, the mobile terminal can display not only the second widget 3842 on the first area but also the first controller 3821 and the third controller 3823 on the second area.

That is, after sensing the first input signal 3830, the mobile terminal can display one or more controllers corresponding to applications in the same group on the second area. After sensing the second input signal 3850, the mobile terminal may change an application displayed on the first area.

Moreover, the mobile terminal can display a controller for a different application, which belongs to the same group as the application displayed on the first area, on the second area in order to allow the user to easily control the different application.

Figure 39:
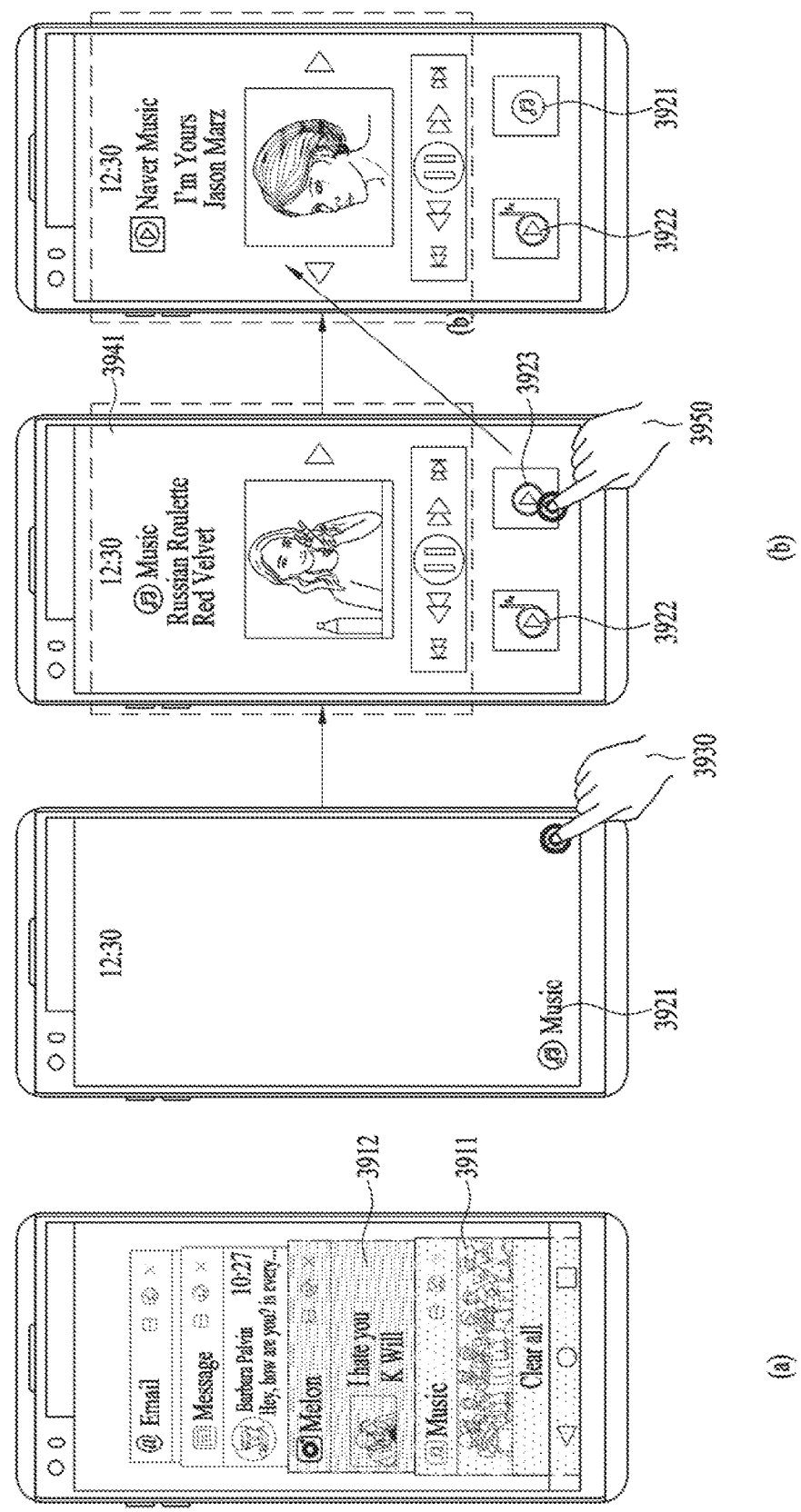
FIG. 39 is a diagram illustrating another example in which the mobile terminal controls a controller corresponding to an application according to an embodiment of the present invention.

FIG. 39 is a diagram illustrating another example in which the mobile terminal controls a controller corresponding to an application according to an embodiment of the present invention. To avoid redundant description, the features already mentioned in FIGS. 4 to 38 are omitted in the embodiment of FIG. 39.

Unlike FIG. 38, FIG. 39 shows an embodiment in which the mobile terminal displays an icon on a second area rather than a controller.

Referring to FIG. 39 (a), the mobile terminal can run a first application 3911, a second application 3912, and a third application (not shown in the drawing), which belong to the same group, in the background state. Hereinafter, it is assumed that each of the first application 3911, the second application 3912, and the third application is a music application.

Referring to the first drawing of FIG. 39 (b), after executing the AOD mode, the mobile terminal can display a first controller 3921 corresponding to the first application 3911 in the AOD mode. In this case, the first controller 3921 may include a playback icon for controlling the most basic function of the first application 3911. In an embodiment of the present invention, the mobile terminal can sense a first input signal 3930 for selecting the playback icon.

Referring to the second drawing of FIG. 39 (b), after sensing the first input signal 3930, the mobile terminal can display a first widget 3941 corresponding to the first application 3911 on a first area. In addition, after sensing the first input signal 3930, the mobile terminal may play music predetermined by the first application 3911.

In an embodiment of the present invention, after sensing the first input signal 3930, the mobile terminal can display not only the first widget 3941 on the first area but also a second icon 3922 and a third icon 3923 on a second area. In this case, the second icon 3922 may be an icon for running the second application 3912 and the third icon 3923 may be an icon for running the third application. In addition, in an embodiment of the present invention, the mobile terminal can sense a second input signal 3950 for selecting the third icon 3923.

Referring to the third drawing of FIG. 39 (b), after sensing the second input signal 3950, the mobile terminal can display a third widget 3943 corresponding to the third application on the first area. In addition, after sensing the second input signal 3950, the mobile terminal may play music predetermined by the third application.

In an embodiment of the present invention, after sensing the second input signal 3950, the mobile terminal can display not only the third widget 3943 on the first area but also a first icon 3921 and the second icon 3922 on the second area.

Figure 40:
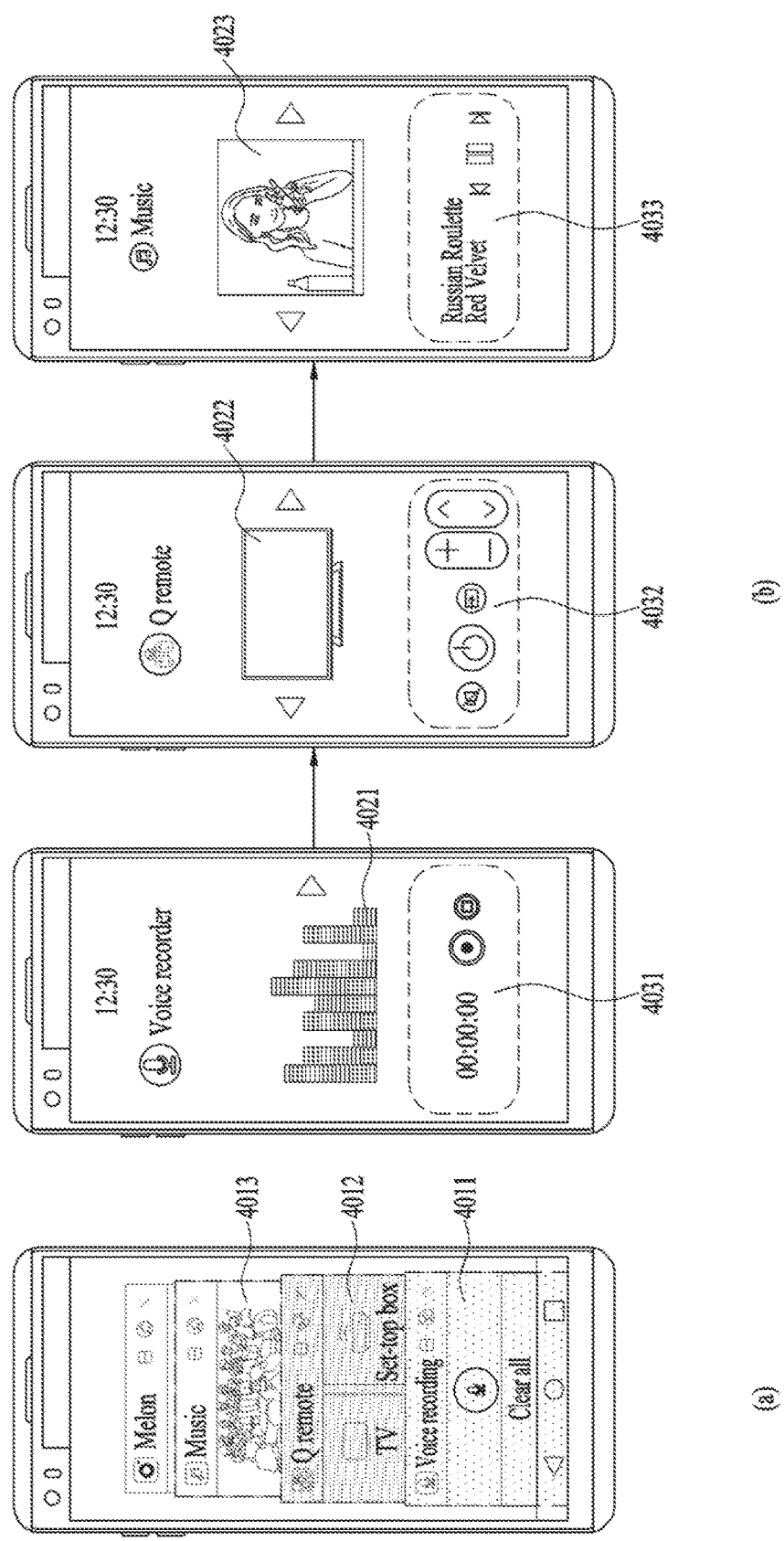
FIG. 40 is a diagram illustrating still another example in which the mobile terminal controls a controller corresponding to an application according to an embodiment of the present invention.

FIG. 40 is a diagram illustrating still another example in which the mobile terminal controls a controller corresponding to an application according to an embodiment of the present invention. To avoid redundant description, the features already mentioned in FIGS. 4 to 39 are omitted in the embodiment of FIG. 40.

FIG. 40 (a) matches the first drawing of FIG. 37. That is, the mobile terminal can run a first application 4011, a second application 4012, and a third application 4013, which belong to different groups, in the background state. Hereinafter, it is assumed that the first application, the second application, and the third application correspond to a recording application, a remote application, and a music application, respectively.

Referring to the first drawing of FIG. 40 (b), after executing the AOD mode, the mobile terminal can display a first widget 4021 and a first controller 4031, each of which corresponds to the first application 4011.

In detail, the mobile terminal can display the first widget 4021 on a first area and also display the first controller 4031 on a second area. Since the first application is assumed to be the recording application, the mobile terminal may display an equalizer bar as the first widget 4021 and include a recording start icon, a recording stop icon, and a recording time indicator in the first controller 4031.

In an embodiment of the present invention, the mobile terminal may change an application running in the AOD mode based on an input signal for selecting an icon. Details are the same as in FIG. 33

Referring to the second drawing of FIG. 40 (b), the mobile terminal can display a second widget 4022 and a second controller 4032, each of which corresponds to the second application 4012, based on an input signal (not shown in the drawing) for changing an application running in the AOD mode.

In detail, the mobile terminal may switch the first widget 4021 and the first controller 4031 to the second widget 4022 and the second controller 4032, respectively. In this case, since the second application 4012 is assumed to be the remote application, the mobile terminal may display a currently controlled product as the second widget 4022 and include a power icon a muting icon, an external input icon, volume adjustment icon, and a channel switch icon in the second controller 4032.

Moreover, as described above, the mobile terminal can sense an input signal for changing the second widget 4022 and the second controller 4032.

Referring to the third drawing of FIG. 40 (b), the mobile terminal can display a third widget 4023 and a third controller 4033, each of which corresponds to the third application 4013, based on the input signal for changing the second widget 4022 and the second controller 4032 running in the AOD mode.

In detail, the mobile terminal may switch the second widget 4022 and the second controller 4032 to the third widget 4023 and the third controller 4033, respectively. In this case, since the third application 4013 is assumed to be the music application, the mobile terminal may display an album of the currently playing music as the third widget 4023 and include a playback icon, a next music playback icon, and a previous music playback icon in the third controller 4033.

Figure 41:
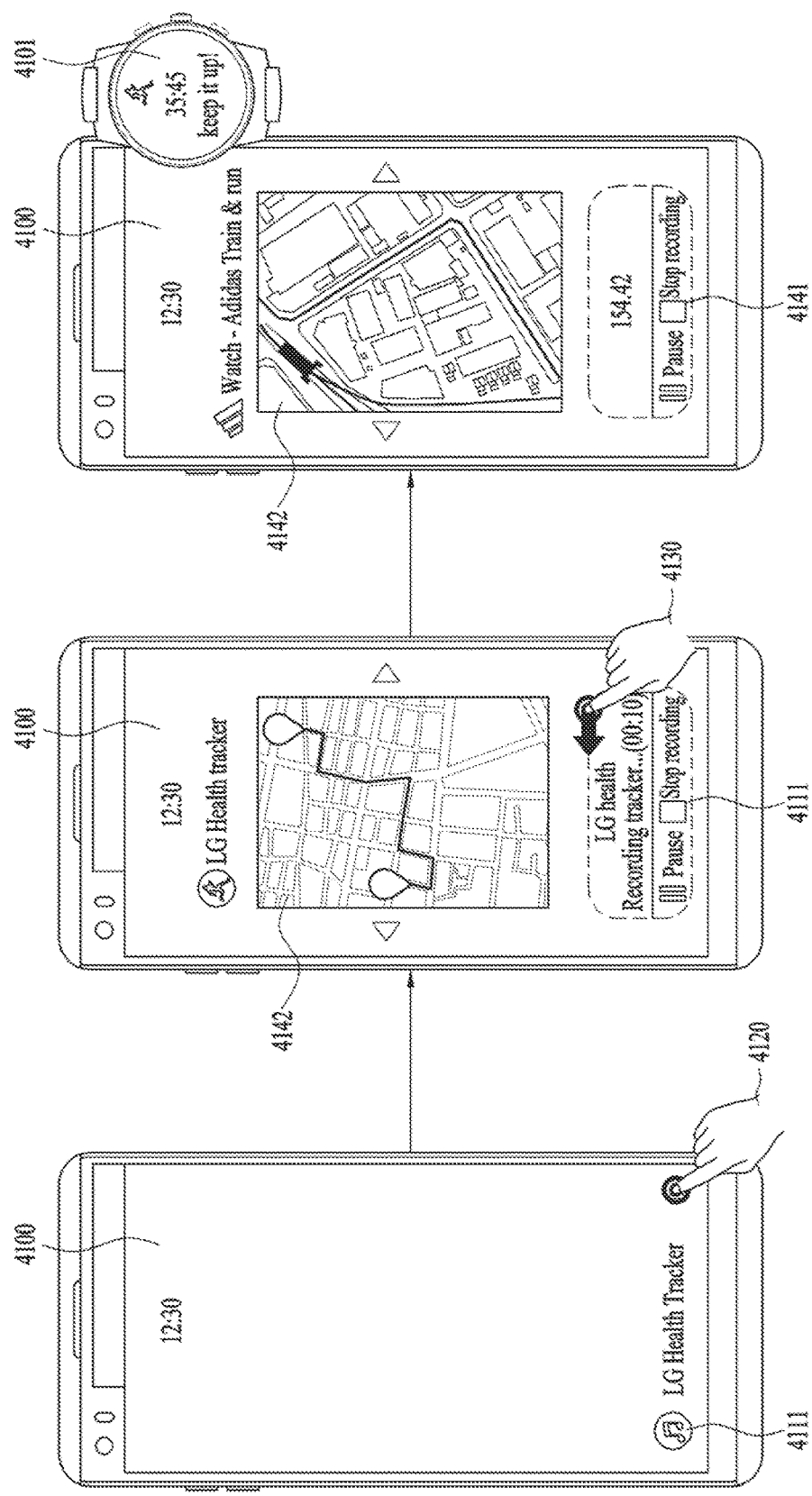
FIG. 41 is a diagram illustrating an example in which the mobile terminal executes an application interconnected to an external device in the AOD mode according to an embodiment of the present invention.

FIG. 41 is a diagram illustrating an example in which the mobile terminal executes an application interconnected to an external device in the AOD mode according to an embodiment of the present invention. To avoid redundant description, the features already mentioned in FIGS. 4 to 40 are omitted in the embodiment of FIG. 41.

Referring to the first drawing of FIG. 41, the mobile terminal 4100 can display a first controller 4111 corresponding to a first application in the AOD mode. In this case, the first controller 411 may include only an icon for controlling the most basic function of the first application.

In an embodiment of the present invention, the mobile terminal 4100 can sense a first input signal 4120 for selecting the icon included in the first controller 4111. In this case, the first application may be interconnected to an application installed in an external device 4101. Hereinafter, assume that the first application is a health application. In addition, the first input signal 4120 may be an input signal touched with predetermined pressure.

Referring to the second drawing of FIG. 41, after sensing the first input signal 4120, the mobile terminal 4100 can display a first widget 4112 corresponding to the first application in the AOD mode. In addition, after sensing the first input signal 4120, the mobile terminal 4100 may control the first application to be activated.

In detail, when the first application is the health application, the mobile terminal 4100 may activate a tracking function or a step counting function of the health application after sensing the first input signal 4120. For example, after sensing the first input signal 4120, the mobile terminal 4100 may display the moving distance or time of the user having the mobile terminal 4100 on the map of the health application. In addition, after sensing the first input signal 4120, the mobile terminal 4100 may count steps of the user having the mobile terminal 4100 through the health application.

In an embodiment of the present invention, the mobile terminal 4100 can sense a second input signal 4130 for selecting the first controller 4111. In this case, the first controller 4111 may include icons for controlling various functions of the first application. Moreover, the second input signal 4130 may be an input signal of touching the first controller 411 with the predetermined pressure and dragging the touch in a predetermined direction.

Referring to third drawing of FIG. 41, after sensing the second input signal 4130, the mobile terminal 4100 can display a second widget 4142 and a second controller 4141, each of which corresponds to a second application interconnected to the first application, in the AOD mode.

In detail, after sensing the second input signal 4130, the mobile terminal 4100 may switch the first widget 4112 and the first controller 4111 to the second widget 4142 and the second controller 4141, respectively. In this case, the second widget 4142 and the second controller 4141 may be a widget and a controller for the second application.

Moreover, the second application may be an application installed in the external device 4101. For example, if the first application is a health application installed in the mobile terminal 4100, the second application may be a health application installed in the wearable device 4101 interconnected to the mobile terminal 4100. In addition, the mobile terminal may display the second widget 4142 and the second controller 4141 each corresponding to the second application by receiving data from the external device 4101.

In an embodiment of the present invention, after sensing the second input signal 4130, the mobile terminal 4100 can control the second application installed in the external device 4101 to be activated. In this case, after sensing the second input signal 4130, the mobile terminal may transmit a control signal for activating the second application to the external device 4101. Having received the control signal from the mobile terminal 4100, the external device may activate the second application. Thereafter, through the second application, the external device 4101 may calculate moving distance or time of the user having the external device 4101 or count steps of the user having the external device 4101.

Thus, the mobile terminal 4100 may reflect information of the second application updated by the external device 4101 in the second widget 4142 and the second controller 4141 displayed in the AOD mode.

Although the invention is explained with reference to each of the accompanying drawings for convenience of description, it is possible to design new embodiment(s) by merging the embodiments shown in the accompanying drawings with each other.

Figure 42:
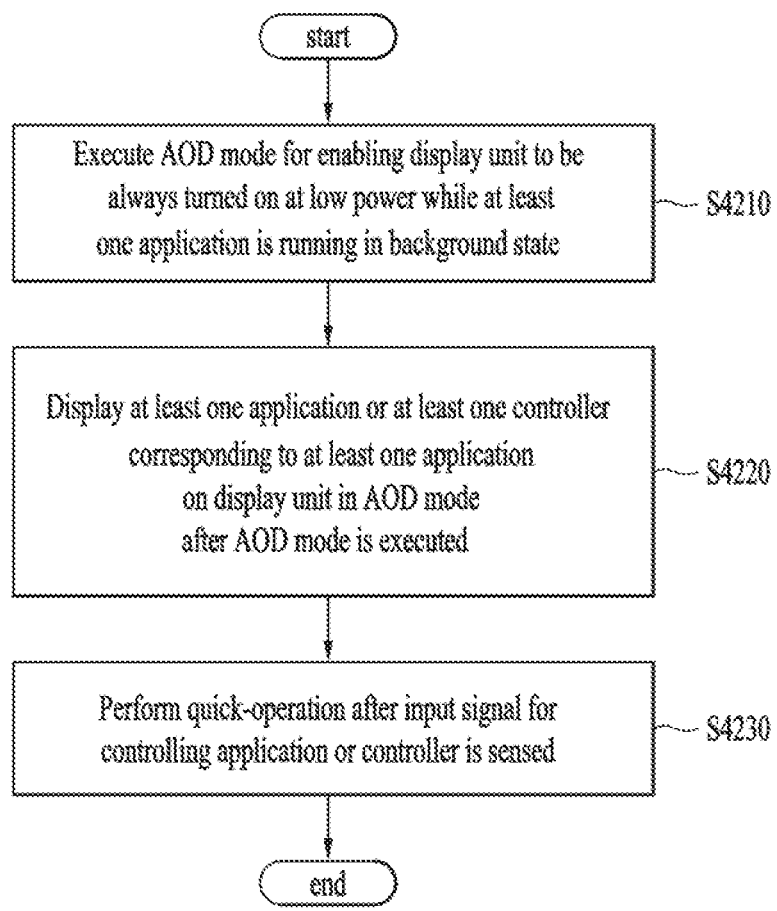
FIG. 42 is a flowchart illustrating an example in which the mobile terminal performs a quick-operation based on an input signal for controlling an application or a controller while displaying the application or the controller in the AOD mode according to an embodiment of the present invention.

FIG. 42 is a flowchart illustrating an example in which the mobile terminal performs a quick-operation based on an input signal for controlling an application or a controller while displaying the application or the controller in the AOD mode according to an embodiment of the present invention. Each step described below with reference to FIG. 42 may be controlled by the controller of FIG. 1A.

In step S4210, the mobile terminal can execute the Always on Display (AOD) mode for enabling the display unit to be always turned on at low power while running at least one application in the background state. In this case, if there are an application running in the background state, an application running in the foreground state, and an application running in the on-going state, the mobile terminal may display the applications or controllers using the AOD mode in predetermined order after switching to the AOD mode.

In step S4220, after executing the AOD mode, the mobile terminal may display the at least one application or at least one controller corresponding to the at least one application on the display unit in the AOD mode. In addition, the mobile terminal may sense a predetermined touch input signal to activate the displayed application or controller. Moreover, if widgets or controllers corresponding to a plurality of applications are executed in the AOD mode, the mobile terminal may switch the widgets or controllers corresponding to the applications after sensing the predetermined touch input signal.

In step S4230, after sensing an input signal for controlling the application or controller, the mobile terminal may perform a quick-operation. For example, the mobile terminal may perform the quick-operation based on such an input signal as a predetermined gesture, a predetermined slope, a GPS signal, brightness within a predetermined range from the mobile terminal, etc.

Further, it is apparent that the embodiments described with reference to FIGS. 5 to 41 can be implemented as the controlling method for the mobile terminal described in FIG. 42.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy disks, optical data storage devices, and the like for example and also include carrier-wave type implementations (e.g., transmission via Internet). Further, the computer may include the controller 180 of the terminal. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile terminal comprising:
  a sensing unit;
  a display unit; and
  a processor configured to:
    execute at least one application including a music playback application;
    execute an Always on Display (AOD) mode such that the display unit is always on at low power while the at least one application is running in a background state;
    cause the display unit to display at least one controller corresponding to the at least one application during the AOD mode, the at least one controller including at least one music playback related icon; and
    in response to an input signal generated in the AOD mode for selecting one of the at least one music playback related icon, perform a music playback related function corresponding to the selected music playback related icon while the AOD mode is maintained.

2. The mobile terminal of claim 1, wherein the processor is further configured to:
  execute a first application and a second application in the background state, wherein the first application and the second application belong to a same application group;
  display a first controller corresponding to the first application after executing the AOD mode; and
  change the first controller to a second controller corresponding to the second application after receiving a first input signal for selecting the first controller, wherein the first controller and the second controller have a same interface.

3. The mobile terminal of claim 2, wherein the processor is further configured to:
  receive a fourth input signal for selecting a first icon included in the first controller; and
  cause the display unit to display the first application corresponding to the first controller in the AOD mode.

4. The mobile terminal of claim 3, wherein the processor is further configured to change the first controller to the second controller in response to the fourth input signal.

5. The mobile terminal of claim 3, wherein the processor is further configured to:
receive a fifth input signal for selecting a second icon included in the second controller; and
cause the display unit to display the second application corresponding to the second controller in the AOD mode.

6. The mobile terminal of claim 1, wherein the processor is further configured to:
execute a third application and a fourth application in the background state, wherein the third application and the fourth application belong to different application groups;
display a third controller corresponding to the third application after executing the AOD mode; and
change the third controller to a fourth controller corresponding to the fourth application after receiving a second input signal for selecting the third controller, wherein the third controller and the fourth controller have different interfaces.

7. The mobile terminal of claim 1, wherein the processor is further configured to cause the display unit to display a fifth controller corresponding to a fifth application after executing the AOD mode, and wherein the fifth application is an application that is most recently changed to the background state among the at least one application running in the background state.

8. The mobile terminal of claim 1, wherein the processor is further configured to cause the display unit to display a sixth controller corresponding to a sixth application after executing the AOD mode, and wherein the sixth application is an application that was displayed on the display unit before the AOD mode is executed.

9. The mobile terminal of claim 1, wherein the processor is further configured to cause the display unit to display a seventh controller corresponding to a seventh application after executing the AOD mode, and wherein the seventh application is an application running in the background state and an on-going state.

10. The mobile terminal of claim 1, wherein the processor is further configured to cause the display unit to display a multitasking application list, and wherein the multitasking application list comprises at least one multitasking window corresponding to the at least one application running in the background state.

11. The mobile terminal of claim 10, wherein the processor is further configured to:
receive a third input signal for selecting an AOD icon displayed on a first multitasking window corresponding to an eighth application;
identify the AOD icon after receiving the third input signal; and
cause the display unit to display an eighth controller corresponding to the eighth application after executing the AOD mode.

12. The mobile terminal of claim 1, further comprising a communication unit configured to transmit and receive data with an external device,
wherein the processor is further configured to:
cause the display unit to display a ninth controller corresponding to a ninth application after executing the AOD mode, wherein the ninth application is an application interconnected to a tenth application installed in the external device; and
change the ninth controller to a tenth controller corresponding to the tenth application after receiving a sixth input signal for selecting the ninth controller.

13. The mobile terminal of claim 12, wherein the processor is further configured to:
cause the communication unit to transmit, to the external device, a signal for controlling the external device to activate the tenth application when the tenth controller is displayed.

14. The mobile terminal of claim 1, wherein the processor is further configured to:
receive an input signal for executing the AOD mode while an eleventh application is displayed on the display unit; and
execute the eleventh application in the AOD mode comprising at least one detail mode.

15. The mobile terminal of claim 14, further comprising an audio output unit,
wherein the processor is further configured to:
control the audio output unit to output sound through the eleventh application when the eleventh application is executed in a first AOD mode; and
change an area of the display unit on which the eleventh application is displayed to an area for sensing a touch input signal when the eleventh application is executed in a second AOD mode.

16. The mobile terminal of claim 15, wherein the processor is further configured to determine the at least one detail mode based on a predetermined touch input signal.

17. The mobile terminal of claim 1, wherein the processor is further configured to sense a predetermined touch input signal for activating the displayed at least one controller.

18. The mobile terminal of claim 1, further comprising:
a global positioning system (GPS) sensor; and
an illumination sensor,
wherein the input signal comprises one of a predetermined gesture, a GPS signal, and brightness around the mobile terminal.

19. The mobile terminal of claim 1, wherein the processor is further configured to:
receive an input signal for maximizing brightness of the display unit while a twelfth application is executed in the AOD mode; and
terminate the AOD mode of the twelfth application.

20. A method of controlling a mobile terminal with a display unit, the method comprising:
executing at least one application including a music playback application;
executing an Always on Display (AOD) mode such that the display unit is always on at low power while the at least one application is running in a background state;
displaying at least one controller corresponding to the at least one application during the AOD mode, the at least one controller including at least one music playback related icon; and
in response to an input signal generated in the AOD mode for selecting one of the at least one music playback related icon, performing a music playback related function corresponding to the selected music playback related icon while the AOD mode is maintained.

* * * * *